United States Patent
Liu et al.

(10) Patent No.: US 10,687,079 B2
(45) Date of Patent: Jun. 16, 2020

(54) CONSTRAINED DEPTH INTRA MODE CODING FOR 3D VIDEO CODING

(71) Applicants: QUALCOMM Incorporated, San Diego, CA (US); Hongbin Liu, Beijing (CN); Ying Chen, San Diego, CA (US)

(72) Inventors: Hongbin Liu, Beijing (CN); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 15/125,549

(22) PCT Filed: Mar. 13, 2014

(86) PCT No.: PCT/CN2014/073346
§ 371 (c)(1),
(2) Date: Sep. 12, 2016

(87) PCT Pub. No.: WO2015/135169
PCT Pub. Date: Sep. 17, 2015

(65) Prior Publication Data
US 2017/0006309 A1    Jan. 5, 2017

(51) Int. Cl.
*H04N 19/597* (2014.01)
*H04N 19/11* (2014.01)
(Continued)

(52) U.S. Cl.
CPC ......... *H04N 19/597* (2014.11); *H04N 19/119* (2014.11); *H04N 19/159* (2014.11);
(Continued)

(58) Field of Classification Search
CPC .... H04N 19/11; H04N 19/119; H04N 19/176; H04N 19/593; H04N 19/597; H04N 19/70; H04N 19/96
See application file for complete search history.

(56) References Cited

U.S. PATENT DOCUMENTS 7,925,103 B2   4/2011   Lee et al.
8,842,927 B2 *  9/2014   Cheon ............... H04N 19/13
                                              382/238
(Continued)

FOREIGN PATENT DOCUMENTS

CN    1681330 A    10/2005
CN   103262541 A    8/2013
(Continued)

OTHER PUBLICATIONS

ITU-T H.263, "Series H: Audiovisual and Multimedia Systems, Infrastructure of audiovisual services—Coding of moving video, Video coding for low bit rate communication," The International Telecommunication Union. Jan. 2005, 226 pp.
(Continued)

*Primary Examiner* — Jamie J Atala
*Assistant Examiner* — Joon Kwon
(74) *Attorney, Agent, or Firm* — Shumaker & Sieffert, P.A.

(57) ABSTRACT

Techniques include constraining depth intra mode coding in a three-dimensional (3D) video coding process, such as 3D-High Efficiency Video Coding (3D-HEVC). In some examples, the techniques for constraining depth intra mode coding may prevent transform tree nodes from being split into sub-transform tree nodes when a depth prediction unit that corresponds to the transform tree node is predicted according to a depth modeling mode (DMM). In further examples, the techniques for constraining depth intra mode coding may prevent the DMM mode from being used when the maximum transform unit size that corresponds to a depth prediction unit is greater than the size of the depth prediction unit. The techniques for constraining depth intra mode coding may prevent characteristics of the DMM prediction modes used in 3D-HEVC and characteristics of the transform tree subdivision used in 3D-HEVC from interfering with each other.

36 Claims, 22 Drawing Sheets

(51) Int. Cl.
*H04N 19/176* (2014.01)
*H04N 19/119* (2014.01)
*H04N 19/70* (2014.01)
*H04N 19/96* (2014.01)
*H04N 19/593* (2014.01)
*H04N 19/159* (2014.01)

(52) U.S. Cl.
CPC ......... *H04N 19/176* (2014.11); *H04N 19/593* (2014.11); *H04N 19/70* (2014.11); *H04N 19/96* (2014.11); *H04N 19/11* (2014.11)

(56) References Cited

U.S. PATENT DOCUMENTS

| | | | |
|---|---|---|---|
| 9,111,376 B2 | 8/2015 | Lee et al. | |
| 9,544,595 B2 | 1/2017 | Kim et al. | |
| 9,641,853 B2* | 5/2017 | Zheng | H04N 19/597 |
| 2011/0038415 A1* | 2/2011 | Min | H04N 19/115 375/240.12 |
| 2012/0230411 A1* | 9/2012 | Liu | H04N 19/176 375/240.16 |
| 2012/0281928 A1* | 11/2012 | Cohen | G06T 9/40 382/240 |
| 2013/0003855 A1* | 1/2013 | Park | H04N 19/119 375/240.18 |
| 2013/0176390 A1* | 7/2013 | Chen | H04N 19/597 348/43 |
| 2013/0177079 A1* | 7/2013 | Kim | H04N 19/593 375/240.12 |
| 2013/0188731 A1* | 7/2013 | Kim | H04N 19/70 375/240.18 |
| 2013/0272381 A1 | 10/2013 | Guo et al. | |
| 2013/0315300 A1* | 11/2013 | Lee | H04N 19/176 375/240.02 |
| 2014/0037014 A1 | 2/2014 | Murata et al. | |
| 2014/0072215 A1* | 3/2014 | Terada | G06T 9/007 382/166 |
| 2014/0226719 A1* | 8/2014 | Yamamoto | H04N 19/463 375/240.12 |
| 2014/0269928 A1* | 9/2014 | Piao | H04N 19/91 375/240.18 |
| 2015/0049807 A1* | 2/2015 | Gu | H04N 19/20 375/240.15 |
| 2015/0110174 A1* | 4/2015 | Gu | H04N 19/105 375/240.03 |
| 2015/0245064 A1 | 8/2015 | Li et al. | |
| 2016/0255371 A1* | 9/2016 | Heo | H04N 19/597 375/240.13 |
| 2017/0078697 A1* | 3/2017 | Lee | H04N 19/119 |

FOREIGN PATENT DOCUMENTS

| | | |
|---|---|---|
| CN | 103636198 A | 3/2014 |
| EP | 1574996 A2 | 9/2005 |
| JP | 2015534379 A | 11/2015 |
| WO | 2012140839 A1 | 10/2012 |
| WO | 2013068567 A1 | 5/2013 |
| WO | 2013182124 A1 | 12/2013 |
| WO | 2014005248 A1 | 1/2014 |
| WO | 2014008951 A1 | 1/2014 |

OTHER PUBLICATIONS

ITU-T H.264, "Series H: Audiovisual and Multimedia Systems, Infrastructure of audiovisual services—Coding of moving video, Advanced video coding for generic audiovisual services," The International Telecommunication Union. Jun. 2011, 674 pp.
ITU-T H.265, "Series H: Audiovisual and Multimedia Systems, Infrastructure of audiovisual services—Coding of moving video, High efficiency video coding," The International Telecommunication Union. Apr. 2015, 634 pp.
ITU-T H.261, "Line Transmission on Non-Telephone Signals, Video Codec for Audiovisual Services," The International Telecommunication Union. 1990, 32 pp.
ITU-T H.262, "Transmission of Non-Telephone Signals, Information Technology—Generic Coding of Moving Pictures and Associated Audio Information: Video," The International Telecommunication Union. Jul. 1995, 211 pp.
Bross et al., "High Efficiency Video Coding (HEVC) Text Specification Draft 10 (for FDIS & Last Call)," Joint Collaborative Team on Video Coding (JCT-VC), JCTVC-L1003_v34, Jan. 2013, 310 pp.
Bossen et al., "HM Software Manual," Joint Collaborative Team on Video Coding (JCT-VC), JCTVC-Software Manual, May 28, 2013, 18 pp.
Sole Rojals, "Cross-check of RIM's multi-level significant maps for large transform units (JCTVC-G644)," Joint Collaborative Team on Video Coding (JCT-VC), JCTVC-G1001, 2 pp.
International Search Report and Written Opinion issued in international application No. PCT/CN2014/073346 dated Dec. 26, 2014, 12 pp.
International Preliminary Report on Patentability issued in international application No. PCT/CN2014/073346 dated Sep. 22, 2016, 7 pp.
Bross B., et al., "High Efficiency Video Coding (HEVC) Text Specification Draft 10 (for FDIS & Last Call)," 12th Meeting: Geneva, CH, Jan. 14-23, 2013, Joint Collaborative Team on Video Coding (JCT-VC) of ITU-T SG 16 WP 3 and ISO/IEC JTC 1/SC 29/WG 11, Document: JCTVC-L1003_v34, Mar. 19, 2013, 310 pages.
Li W., et al., "CE5-Related: Implicit Split Process for Intra SDC", Joint Collaborative Team on 3D Video Coding Extensions of ITU-T SG16WP3 and ISO/IEC JTC1/SC 29/WG11 7th Meeting: San Jose, US, Jan. 11-17, 2014, JCT3V-G0111, Jan. 16, 2014, 11 pages.
Liu H., et al., "Constraints for Depth Modeling Modes" Joint Collaborative Team on 3D Video Coding Extensions of ITU-T SG16WP3 and ISO/IEC JTC1/SC29/WG11 8th Meeting: Valencia, ES, Mar. 29-Apr. 4, 2014, JCT3V-H0136, Mar. 10, 2014, 6 pages.
Tech, et al., "3D-HEVC Draft Text 3," Jan. 9-17, 2014; (Joint Collaborative Team on 3D Video Coding Extensions Development of ITU-T SG 16 WP3 and ISO/IEC JTC 1/SC 29/WG 11); No. JCT3V-G1001_v2, Mar. 10, 2014; 102 pp.
Zhang L., et al., "Test Model 7 of 3D-HEVC and MV-HEVC", 7th Meeting, Jan. 11 through 17, 2014, San Jose, USA, Joint Collaborative Team on 3D Video Coding Extension Development of ITU-T SG 16 WP 3 and ISO/IEC JTC 1/SC 29/WG 11, JCT3V-G1005, Feb. 14, 2014, 56 pp.
Merkle P., et al., "The Effects of Multiview Depth Video Compression on Multiview Rendering", Signal Processing: Image Communication, Elsevier Science Publishers, Jan. 1, 2009, vol. 24, No. 1-2, XP025884346, ISSN: 0923-5965, DOI: 10.1016/J.IMAGE.2008.10.010 [retrieved on Nov. 5, 2008], pp. 73-88.
Supplementary European Search Report—EP14885275—Search Authority—Berlin—dated Oct. 6, 2017.
Tech G., et al., "3D-HEVC Draft Text 3", Joint Collaborative Team on 3D Video Coding Extension Development of ITU-T SG16 WP3 and ISO/IEC JTC1/SC29/WG11/JCT3V-G1001-V3, Mar. 1, 2014, XP055358694, pp. 1-94.
Tech, et al., "3D-HEVC Test Model 3", JCT-3V Meeting; MPEG Meeting; Jan. 17-20, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C1005, XP030130664, 52 pp.
Li H., et al., "3D-CE6.h Related: Early Termination of PU Prediction in Depth Intra Coding", Joint Collaborative Team on 3D Video Coding Extension Development of ITU-T SG 16 WP 3 and ISO/IEC JTC 1/SC 29/WG 11, 2nd Meeting: Shanghai, CN, Oct. 2012, pp. 1-2, JCT3V-B0042.

* cited by examiner

PART_NxN

PART_Nx2N

PART_2NxN

PART_2Nx2N

PART_nRx2N

PART_nLx2N

PART_2NxnD

PART_2NxnU

CONSTRAINED DEPTH INTRA MODE CODING FOR 3D VIDEO CODING

This application is a national stage entry under 35 U.S.C. § 371 of International Application No. PCT/CN2014/073346, filed Mar. 13, 2014, the entire contents of which are incorporated herein by reference.

TECHNICAL FIELD

This disclosure relates to video coding, and more particularly, to depth Intra mode coding in a three-dimensional (3D) video coding process.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Digital video devices implement video compression techniques, such as those described in standards defined by MPEG-2, MPEG-4, ITU-T H.263, ITU-T H.264/MPEG-4, Part 10, Advanced Video Coding (AVC), the High Efficiency Video Coding (HEVC), and extensions of such standards.

An encoder-decoder (codec) applies video compression techniques to perform spatial (intra-picture) prediction and/or temporal (inter-picture) prediction to reduce or remove redundancy in video sequences. For block-based video coding, a video slice may be partitioned into video blocks, which may also be referred to as coded treeblocks (CTBs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized.

A multi-view coding bitstream may be generated by encoding views, e.g., from multiple perspectives. Multi-view coding may allow a decoder to select different views, or possibly render multiple views. In addition, some three-dimensional (3D) video techniques and standards that have been developed, or are under development, make use of multiview coding aspects. For example, in some 3D video coding processes, different views may be used to transmit left and right eye views to support 3D video. Other 3D video coding processes may use multiview-plus-depth coding. In a multiview-plus-depth coding process, such as a process defined by the 3D-HEVC extension to HEVC, a 3D video bitstream may contain multiple views. Each of the views may include a texture view component and a depth view components. For example, a given view may comprise a texture view component and a depth view component. The texture view and depth view components may be used to construct 3D video data.

SUMMARY

This disclosure describes techniques for constraining depth intra mode coding in a three-dimensional (3D) video coding process, such as 3D-High Efficiency Video Coding (3D-HEVC). In some examples, the techniques for constraining depth intra mode coding may prevent transform tree nodes from being split into sub-transform tree nodes when a depth prediction unit that corresponds to the transform tree node is predicted according to a depth modeling mode (DMM). In further examples, the techniques for constraining depth intra mode coding may prevent the DMM mode from being used when the maximum transform unit size that corresponds to a depth prediction unit is greater than the size of the depth prediction unit. The techniques for constraining depth intra mode coding may prevent characteristics of the DMM prediction modes used in 3D-HEVC and characteristics of the transform tree subdivision used in 3D-HEVC from interfering with each other.

In one example, the disclosure describes a method of video decoding that includes selectively splitting or not splitting a transform tree node of an encoded video bitstream into a plurality of sub-transform tree nodes based at least in part on whether a depth prediction unit that corresponds to the transform tree node is predicted according to a DMM. The method further includes decoding the transform tree node based at least in part on whether the transform tree node is split into the plurality of sub-transform tree nodes.

In another example, the disclosure describes a method of video encoding that includes selectively splitting or not splitting a transform tree node into a plurality of sub-transform tree nodes based at least in part on whether a depth prediction unit that corresponds to the transform tree node is predicted according to a DMM. The method further includes encoding the transform tree node based at least in part on whether the transform tree node is split into the plurality of sub-transform tree nodes. The method further includes generating the encoded video bitstream such that the encoded video bitstream includes the coded transform tree node.

In another example, the disclosure describes a method of video decoding that includes selectively predicting a depth prediction unit according to a DMM prediction mode or a non-DMM prediction mode based at least in part on whether a size of the depth prediction unit is greater than a maximum transform block size specified for the depth prediction unit. The method further includes decoding the depth prediction unit based at least in part on the predicted depth prediction unit.

In another example, the disclosure describes a method of video encoding that includes selectively predicting a depth prediction unit according to a DMM prediction mode or a non-DMM prediction mode based at least in part on whether a size of the depth prediction unit is greater than a maximum transform block size specified for the depth prediction unit. The method further includes encoding the depth prediction unit based at least in part on the predicted depth prediction unit. The method further includes generating the encoded video bitstream such that the encoded video bitstream includes the coded depth prediction unit.

In another example, the disclosure describes a method of video decoding that includes determining whether to predict a depth prediction unit according to a DMM. The depth prediction unit includes one or more transform units. The method further includes predicting and reconstructing each of the transform units of the depth prediction unit at a transform unit level and in a coding order when the depth prediction unit is not to be predicted according to the DMM. The method further includes predicting all samples of the depth prediction unit at a prediction unit level when the depth prediction unit is to be predicted according to the DMM.

In another example, the disclosure describes a method of video encoding that includes determining whether to predict a depth prediction unit according to a DMM. The depth prediction unit includes one or more transform units. The method further includes predicting and reconstructing each of the transform units of the depth prediction unit at a transform unit level and in a coding order when the depth prediction unit is not to be predicted according to the DMM. The method further includes predicting all samples of the depth prediction unit at a prediction unit level when the depth prediction unit is to be predicted according to the DMM.

In other examples, the disclosure describes a video coding apparatus including a video coder that include one or more processors configured to perform one or more of the methods described above. In additional examples, the disclosure describes a computer-readable medium having stored thereon instructions that, upon execution, cause one or more processors to perform one or more of the methods described above. In further examples, the disclosure describes a video coding apparatus comprising means for performing one or more of the methods described above.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
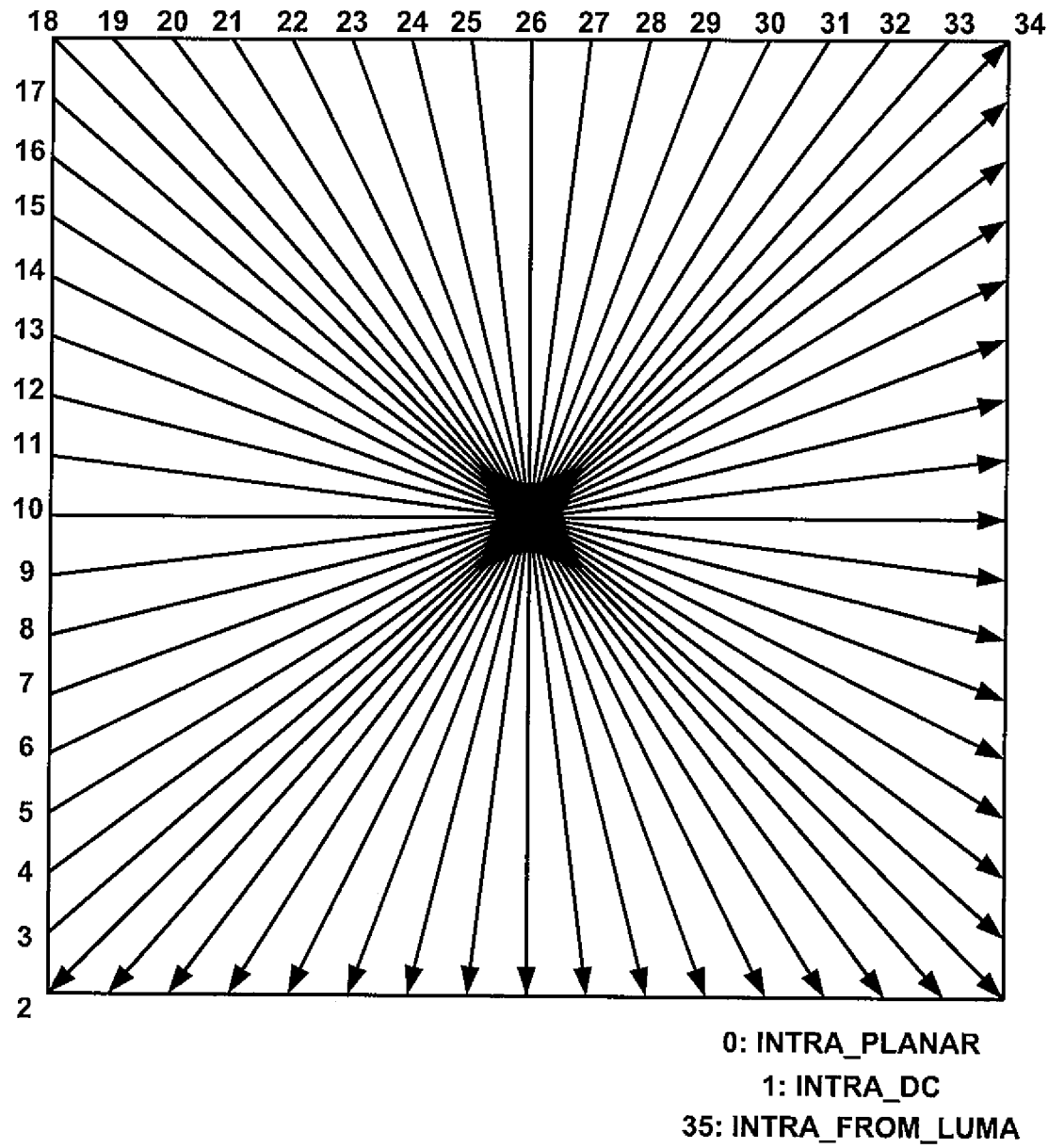
FIG. 1 is a conceptual diagram illustrating intra prediction modes used in high efficiency video coding (HEVC).

This disclosure describes techniques for constraining depth intra mode coding in a three-dimensional (3D) video coding process, such as 3D-High Efficiency Video Coding (3D-HEVC). In some examples, the techniques for constraining depth intra mode coding may prevent transform tree nodes from being split into sub-transform tree nodes when a depth prediction unit that corresponds to the transform tree node is predicted according to a depth modeling mode (DMM). In further examples, the techniques for constraining depth intra mode coding may prevent the DMM mode from being used when the maximum transform unit size that corresponds to a depth prediction unit is greater than the size of the depth prediction unit. The techniques for constraining depth intra mode coding may prevent characteristics of the DMM prediction modes used in 3D-HEVC and characteristics of the transform tree subdivision used in 3D-HEVC from interfering with each other.

In general, this disclosure is related to multi-view video coding (e.g., encoding or decoding) based on advanced codecs, including the coding of two or more views with the 3D-HEVC codec. More specifically, the techniques are related to the depth Intra mode coding in 3D-HEVC.

This disclosure describes techniques for constraining depth Intra mode coding in a 3D video coding process, such as 3D-HEVC. In some examples, the techniques for constraining depth Intra mode coding may prevent transform units and/or transform trees from being subdivided in cases where such subdivision would interfere with the intra coding of depth prediction units according to a depth modeling mode (DMM).

In further examples, the techniques for constraining depth Intra mode coding may be used to ensure that an entire prediction unit is coded according to the same wedgelet pattern when intra coding depth components according to a DMM. In additional examples, the techniques for constraining depth Intra mode coding may ensure that a prediction unit is split into two regions rather than more than two regions when intra coding depth components according to a DMM.

Issues related to DMM coding with the current version of 3D-HEVC will now be described. For a coding unit (CU) coded with an intra prediction mode, if segment-wise DC coding (SDC) (e.g., segment-wise direct current (DC)) does not apply, one transform tree (if available) is coded to represent the residual of the CU and each PU corresponds to a transform tree node. There is no depth constraint on the associated transform tree node of a DMM coded PU. In other words, a transform unit (TU) within such a transform tree node may take a size from the PU size down to the smallest allowable TU size (e.g., 4×4). However, when the depth of such a transform tree node is greater than 0 and TU size is less than PU size, two issues may arise.

Currently in 3D-HEVC, a prediction unit is defined such that the same prediction process is used for the entire prediction unit. A transform unit associated with a prediction unit may be partitioned into a plurality of smaller transform units. The DMM coding modes may use a wedgelet pattern to code each of the transform units. The wedgelet pattern that is used for coding each of the transform units may be determined by a decoder based on a wedgelet pattern index and the size of the transform unit to be coded. In some cases, the transform units that form a single prediction unit may be different sizes. In such cases, if DMM coding is used, different transform units may be coded according to different wedgelet patterns. This may cause the prediction process used for predicting a prediction unit to be different for different parts of the prediction unit, which may result in a prediction unit that does not conform to the current 3D-HEVC definition for a prediction unit.

In some examples, the techniques of this disclosure may constrain the subdivision of transform units such that a transform tree node (e.g., a transform unit) that corresponds to a prediction unit which is coded using a DMM coding mode is not partitioned into smaller transform units. For example, when a prediction unit (PU) associated with a transform tree node is coded with one of the DMM modes (e.g., DMM mode 1 or DMM mode 4), the split_transform_flag of the transform tree node may be set to 0.

In some examples, an encoder may select a value for a split_transform_flag that corresponds to a transform tree node based on whether a prediction unit that corresponds to the transform tree node is coded using a DMM coding mode. If the prediction unit that corresponds to the transform tree node is coded using a DMM coding mode, then the encoder may select a value for the split_transform_flag that indicates that the corresponding transform tree node is not to be partitioned further. If the prediction unit that corresponds to the transform tree node is not coded using a DMM coding mode, then the encoder may select a value for the split_transform_flag based on one or more other split_transform_flag selection techniques that allows the corresponding transform tree node to be partitioned further. The split_transform_flag may indicate whether a transform tree node (e.g., a transform tree, a transform unit, a transform block) is to be split, subdivided, and/or partitioned into a plurality of smaller transform tree nodes. In further examples, a decoder may decode a bitstream that is encoded according to the previous example.

In additional examples, an encoder may selectively include a split_transform_flag that corresponds to a transform tree node in an encoded bitstream for the transform tree node based on whether a prediction unit that corresponds to the transform tree node is coded using a DMM coding mode. If the prediction unit that corresponds to the transform tree node is coded using a DMM coding mode, then the encoder may not include the split_transform_flag in the bitstream, which may cause a decoder to infer that the value of the split_transform_flag is zero. If the prediction unit that corresponds to the transform tree node is not coded using a DMM coding mode, then the encoder may include the split_transform_flag in the bitstream and/or determine whether to include the split_transform_flag in the bitstream based on other criteria. In further examples, a decoder may decode a bitstream that is encoded according to the previous example.

In some examples, a decoder may determine whether to parse, extract, and/or decode a split_transform_flag from an encoded bitstream for a transform tree node based on whether a prediction unit that corresponds to the transform tree node is coded using a DMM coding mode. For example, if the prediction unit that corresponds to the transform tree node is coded using a DMM coding mode, then the decoder may not parse the split_transform_flag from the encoded bitstream. In this example, if the prediction unit that corresponds to the transform tree node is not coded using the DMM coding mode, then the decoder may parse (e.g., extract) the split_transform_flag from the encoded bitstream and/or determine whether to parse the split_transform_flag from the encoded bitstream based on other criteria that allow for parsing the split_transform_flag from the bitstream in certain circumstances. In some examples, when the decoder does not parse the split_transform_flag from the encoded bitstream, the decoder may infer the value of the split_transform_flag to be equal to a predetermined inferred value (e.g., zero).

Currently in 3D-HEVC, DMM modes 1 or 4 specify that a PU is to be partitioned into two regions. When a PU is coded with DMM mode 1 or DMM mode 4, each of the TUs within the PU is partitioned into two regions. Therefore, a PU may contain more than two regions when it contains multiple TUs.

In some examples, the techniques of this disclosure may ensure that a prediction unit is split into no more than two regions, rather than more than two regions, when intra coding depth components according to a DMM. For example, the techniques of this disclosure may disallow the DMM coding mode to be used when the PU size is greater than the maximum transform block size.

In some examples, an encoder may select a value for a dim_not_present_flag that corresponds to a prediction unit (PU) based on whether the size of the PU is greater than the maximum transform block size that corresponds to the PU. If the size of the PU is greater than the maximum transform block size that corresponds to the PU, then the encoder may select a value for the dim_not_present_flag that indicates that the DMM mode is not used for coding the PU. If the size of the PU is not greater than the maximum transform block size that corresponds to the PU, then the encoder may select a value for the dim_not_present_flag based on one or more other dim_not_present_flag selection techniques that allows the DMM mode to be used for coding the PU. The dim_not_present_flag may indicate whether one of the DMM modes is to be used for coding the corresponding prediction unit. In further examples, a decoder may decode a bitstream that is encoded according to the previous example.

In additional examples, an encoder may selectively include a dim_not_present_flag that corresponds to a prediction unit based on whether the size of the PU is greater than the maximum transform block size that corresponds to the PU. If the size of the PU is greater than the maximum transform block size that corresponds to the PU, then the encoder may not include the dim_not_present_flag in the bitstream, which may cause a decoder to infer that the value of the dim_not_present_flag is one. If the size of the PU is not greater than the maximum transform block size that corresponds to the PU, then the encoder may include the dim_not_present_flag in the bitstream and/or determine whether to include the dim_not_present_flag in the bitstream based on other criteria. In further examples, a decoder may decode a bitstream that is encoded according to the previous example.

In some examples, a decoder may determine whether to parse, extract, and/or decode a dim_not_present_flag from an encoded bitstream for a prediction unit (PU) based on whether the size of the PU is greater than the maximum transform block size that corresponds to the PU. For example, if the size of the PU is greater than the maximum transform block size that corresponds to the PU, then the decoder may not parse the dim_not_present_flag from the encoded bitstream. In this example, if the size of the PU is not greater than the maximum transform block size that corresponds to the PU, then the decoder may parse (e.g., extract) the dim_not_present_flag from the encoded bitstream and/or determine whether to parse the dim_not_present_flag from the encoded bitstream based on other criteria that allow for parsing the dim_not_present_flag from the bitstream in certain circumstances. In some examples, when the decoder does not parse the dim_not_present_flag from the encoded bitstream, the decoder may infer the value of the dim_not_present_flag to be equal to a predetermined inferred value (e.g., one).

In further examples, when a PU is coded with one of the DMM modes, instead of predicting and reconstructing TUs within the PU one by one in decoding order, the entire PU may be predicted using the same way as 3D-HEVC does before reconstructing any TU within it. Afterwards, the reconstruction samples of the PU may be derived by adding residual represented by the associated transform tree node of the PU to prediction samples of the PU.

In some examples, a video encoder may be configured to perform any of the techniques for constrained depth Intra coding and/or constrained DMM coding described in this disclosure. For example, a video encoder may use techniques that constrain a split_transform_flag to be equal to zero (e.g., to indicate that a transform tree node is not to be split into a plurality of smaller transform tree nodes) when a corresponding depth prediction unit is coded according to a depth modeling mode (DMM). As another example, a video encoder may use techniques that constrain a dim_not_present_flag to be equal to one (e.g., to indicate that a DMM coding mode is not used for a depth prediction unit) when a size of the depth prediction unit is greater than a maximum transform block size that corresponds to the depth prediction unit.

As a further example, a video encoder may use techniques that selectively signal a split_transform_flag based on whether a corresponding depth prediction unit is coded according to a DMM. As an additional example, a video encoder may use techniques that selectively signal a dim_not_present_flag based on whether a size of a corresponding depth prediction unit is greater than a maximum transform block size that corresponds to the depth prediction unit. In some examples, one or more of the above-described techniques may prevent transform units and/or transform trees from being subdivided in cases where such subdivision would interfere with the intra coding of depth prediction units according to a depth modeling mode (DMM).

In further examples, a video decoder may be configured to perform any of the techniques for constrained depth Intra coding and/or constrained DMM coding described in this disclosure. For example, a video decoder may use techniques that decode an encoded bitstream which satisfies a constraint that specifies that a split_transform_flag be equal to zero (e.g., to indicate that a transform tree node is not to be split into a plurality of smaller transform tree nodes) when a corresponding depth prediction unit is coded according to a depth modeling mode (DMM). As another example, a video decoder may use techniques that decode an encoded bitstream which satisfies a constraint that specifies that a dim_not_present_flag be equal to one (e.g., to indicate that a DMM coding mode is not used for a depth prediction unit) when a size of the depth prediction unit is greater than a maximum transform block size that corresponds to the depth prediction unit.

As a further example, a video decoder may use techniques that selectively decode a split_transform_flag based on whether a corresponding depth prediction unit is coded according to a DMM. As an additional example, a video decoder may use techniques that selectively decode a dim_not_present_flag based on whether a size of a corresponding depth prediction unit is greater than a maximum transform block size that corresponds to the depth prediction unit. In some examples, one or more of the above-described techniques may prevent transform units and/or transform trees from being subdivided in cases where such subdivision would interfere with the intra coding of depth prediction units according to a depth modeling mode (DMM).

Video coding standards and HEVC techniques related to this disclosure will now be reviewed. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a new video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of the HEVC standard, JCTVC-L1003, Benjamin Bross, Woo-Jin Han, Jens-Ranier Ohm, Gary Sullivan, Ye-Kui Wang, Thomas Wiegand, "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013 ("HEVC WD 10" or, alternatively, "HEVC"), is incorporated herein by reference in its entirety, and is available from the following link: http://phenix.it-sudparis.eu/jct/doc_end_user/documents/12_Geneva/wg11/JCTVC-L1003-v34.zip FIG. 1 is a diagram illustrating intra prediction modes used in HEVC. The intra prediction modes defined by HEVC and illustrated in FIG. 1 may be referred to as regular HEVC intra prediction modes, particularly in relation to the use of such intra prediction modes in HEVC extensions such as 3D-HEVC, where such regular HEVC intra prediction modes and other intra prediction modes, such as DMM and SDC modes, may be used.

FIG. 1 generally illustrates the prediction directions associated with various directional intra-prediction modes available for intra-coding in HEVC. In the current HEVC, e.g., as described in HEVC WD 10, for the luma component of each Prediction Unit (PU), an intra prediction method is utilized with 33 directional (angular) prediction modes (indexed from 2 to 34), DC mode (indexed with 1) and Planar mode (indexed with 0), as shown in FIG. 1.

In the Planar mode (indexed with 0), prediction is performed using a so-called "plane" function to determine predictor values for each of the pixels within a block of video data, e.g., PU. According to the DC mode (indexed with 1), prediction is performed using an averaging of pixel values within the block to determine predictor values for each of the pixels within the block. According to a directional prediction mode, prediction is performed based on a neighboring block's reconstructed pixels along a particular direction (as indicated by the mode). In general, the tail end of each of the arrows shown in FIG. 1 represents a relative set of one or more neighboring pixels from which one or more values are retrieved, while the head of each of the arrows represents the direction in which the retrieved values (or a combination of the retrieved values) are propagated to form a predictive block.

For HEVC intra prediction modes, a video encoder and/or video decoder generates a pixel-specific predictor value for each pixel in the PU using the various modes discussed above, e.g., by using neighboring samples of the PU for modes 2 to 34. A video encoder determines residual values for the video block based on the differences between the actual depth values and the predictor values for the pixels of the block, and provides the residual values to a video decoder.

According to HEVC WD 10, a video encoder transforms the residual values to generate transform coefficients, and quantizes the transform coefficients. The video encoder may also entropy encode the quantized transform coefficients. A video decoder (e.g., after entropy decoding, inverse quantizing, and inverse transforming) determines reconstructed values for the pixels of the block by adding the residual values to the predictor values. Further details regarding HEVC intra prediction modes are specified in HEVC WD 10.

The entropy coding process used in HEVC will now be described, including the context adaptive binary arithmetic coding (CABAC) parsing process that may be used in HEVC. The main steps for the CABAC coding process include:
1. Binarization
2. Context modeling
3. Binary arithmetic coding For binarization, a CABAC entropy coder maps a non-binary valued syntax element to a binary sequence, referred to as a bin string. If the syntax element is already binary valued, binarization is not necessary and can be bypassed. Each bin in the bin string represents a binary decision. The CABAC entropy coder then codes each bin in the bin string, either using a regular coding engine of the CABAC coder, where a context model is selected, or a bypass coding engine of the CABAC coder, where context model selection is not required.

In the regular (i.e., context-adaptive) coding mode, the CABAC entropy coder includes a context modeler that performs context modeling prior to the arithmetic coding process for each bin. The regular coding engine of the CABAC entropy coder performs context modeling, by which a probability model is selected for each bin. The probability model may be selected in the CABAC entropy coder such that the context selection depends on previously coded binary syntax elements or bins of syntax elements.

After context model selection, the regular coding engine of the CABAC entropy coder receives the bin and probability model selected for the bin. The CABAC regular coding engine then applies binary arithmetic coding to the pertinent bin using the context model, and subsequently updates the context model. In particular, the bin value may be fed back to the context modeler to update the context model. Before starting a CABAC encoding/decoding (referred to generally as coding, where coding may comprise encoding or decoding), an entropy coding (e.g., entropy encoding or decoding) unit assigns an initialized probability state to each context.

As an alternative to context-adaptive coding, the entropy coder selects a bypass coding mode for entropy coding selected bins. A bypass coding engine of the CABAC entropy coder uses a simplified arithmetic coder, without the use of explicitly assigned context models, to code bins. The bypass coding engine is not context-adaptive. That is, in the bypass coding engine, bins are not context coded using an estimated probability obtained from a context model. Instead, bypass coded bins may be coded with a fixed probability model.

For example, the bypass coding engine may assume an equal probability of 0.5, and does not require selection of a context for coding. Hence, some bins may be coded using the regular binary arithmetic coding engine with the use of context models (i.e., contexts coded in the regular coding engine), while other bins may be coded using a bypass coding without the use of context models (i.e., bypass coded in the bypass coding engine).

The regular coding engine or bypass coding engine of a CABAC entropy encoder, as applicable, arithmetically codes the bins for a syntax element to generate coded bits that form a bitstream. The regular coding engine or bypass coding engine of a CABAC entropy decoder, as applicable, decodes bits in the bitstream to generate bins, and decodes one or more bins to generate syntax element. In some examples, bypass coding may provide increased throughput, and may allow multiple bins to be coded in the same cycle. Accordingly, use of the CABAC bypass coding engine may be desirable for increased computational throughput, whereas use of the CABAC regular coding engine may be desirable for high coding efficiency.

In JCT-3V, two HEVC extensions, the multiview extension (MV-HEVC) and 3D video extension (3D-HEVC) are being developed. A recent version of the reference software, "3D-HTM version 10.0rc1," for 3D-HEVC is incorporated herein by reference in its entirety, and can be downloaded from the following link:
[3D-HTM version 10.0rc1]:
https://hevc.hhi.fraunhofer.de/svn/svn_3DVCSoftware/tags/HTM-10.0rc1/

A recent working draft of 3D-HEVC is presented in JCTVC-G1001, Gerhard Tech, Krzysztof Wegner, Ying Chen, and Sehoon Yea, "3D-HEVC Draft Text 3," Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013 (referred to hereinafter as "G1001" or "3D-HEVC WD"), is incorporated herein by reference in its entirety, and is available from the following link: http://phenix.it-sudparis.eu/jct2/doc_end_user/documents/7_San%20Jose/wg11/JCT3V-G1001-v1.zip In 3D-HEVC, as defined in the 3D-HEVC WD referenced above, each access unit contains multiple pictures, and each of the pictures in each view has a unique view identification (id), or view order index. However, the depth picture and texture picture of the same view may have different layer ids.

Depth coding in 3D video coding will now be described. 3D video data is represented using the multiview video plus depth format, in which captured views (texture) are associated with corresponding depth maps. In 3D video coding, textures and depth maps are coded and multiplexed into a 3D video bitstream. Depth maps are coded as grayscale video where the luma samples represent the depth values, and conventional intra-coding and inter-coding methods can be applied for depth map coding.

Depth maps may be characterized by sharp edges and constant areas. Due to the different statistics of depth map samples, different coding schemes are designed for depth maps based on a 2D video codec. In a multiview plus depth coding process, a view may include a texture component and a depth component. Depth coding units (CU's) in the depth component may be inter-coded or intra-coded. The depth CU's may be divided into one or more PU's, and the PU's may be divided into one or more partitions. In 3D-HEVC, the same definition of Intra prediction modes is utilized as for HEVC. Depth Modeling Modes (DMMs) are introduced in 3D-HEVC together with the HEVC Intra prediction modes to code an Intra prediction unit of a depth slice.

Figure 2:
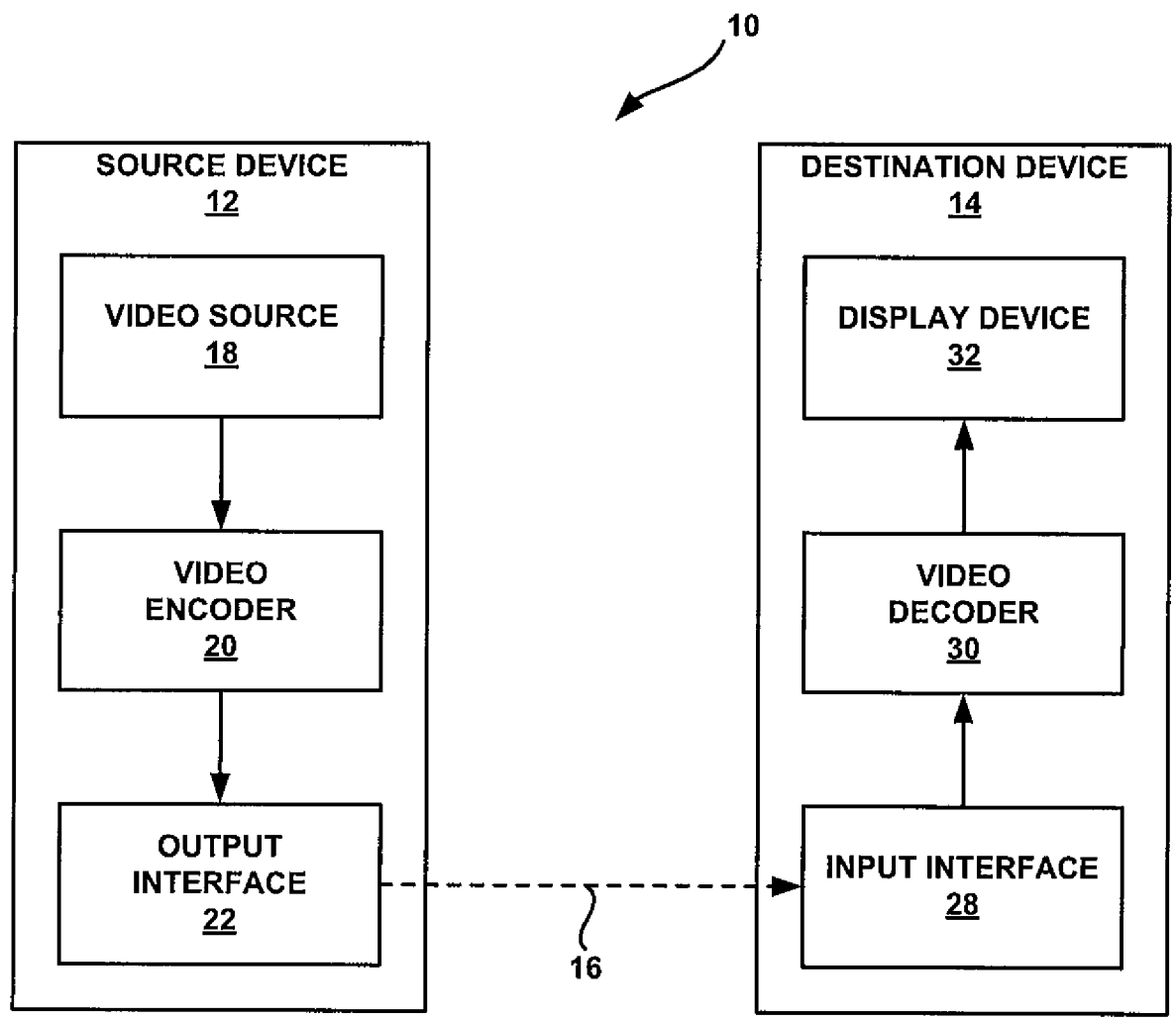
FIG. 2 is a block diagram illustrating an example video coding system that may utilize the techniques of this disclosure.

FIG. 2 is a block diagram illustrating an example video encoding and decoding system 10 that may be configured to utilize various techniques of this disclosure, such as the constrained depth Intra coding techniques and/or constrained DMM coding techniques described in this disclosure. As shown in FIG. 2, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium, such as a transmission channel, to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a computer-readable storage medium, such as a non-transitory computer-readable storage medium, i.e., a data storage device. Similarly, encoded data may be accessed from the storage device by input interface. The storage device may include any of a variety of distributed or locally accessed non-transitory data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of wired or wireless multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 2, source device 12 includes video source 18, video encoder 20, and output interface 22. Destination device 14 includes input interface 28, video decoder 30, and display device 32. In accordance with this disclosure, video encoder 20 of source device 12 may be configured to apply techniques for constraining depth Intra coding and/or DMM coding in a 3D video coding process, such as 3D-HEVC. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 2 is merely one example. Techniques described in this disclosure may be performed by a digital video encoding and/or decoding device. Although generally the techniques of this disclosure are performed by a video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called smart phones, tablet computers or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or data storage media (that is, non-transitory storage media). In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers or in payloads of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

In some examples, a syntax element may be signaled by including the syntax element in the bitstream. In further examples, a syntax element may be signaled by not including the syntax element in the bitstream, but by including other syntax elements in the bitstream from which the value of the original syntax element may be inferred.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, a projection device, or another type of display device.

Although not shown in FIG. 2, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, as one example, or other protocols such as the user datagram protocol (UDP).

Video encoder 20 and video decoder 30 each may be implemented as any of a variety of suitable encoder or decoder circuitry, as applicable, such as one or more processors. Examples of various processors include microprocessors, digital signal processors (DSPs), application specific integrated circuits (ASICs), field programmable gate arrays (FPGAs), discrete logic circuitry, which may be accompanied by software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard and, more particularly, the 3D-HEVC extension of the HEVC standard, as referenced in this disclosure, e.g., by the 3D-HEVC WD. HEVC presumes several additional capabilities of video coding devices relative to devices configured to perform coding according to other processes, such as, e.g., ITU-T H.264/AVC. For example, whereas H.264 provides nine intra-prediction encoding modes, the HM may provide as many as thirty-five intra-prediction encoding modes, as shown in and discussed above with reference to FIG. 1.

Some basic aspects of HEVC will now be discussed. In general, HEVC specifies that a video picture (or "frame") may be divided into a sequence of largest coding units referred to as coding tree units (CTUs). A CTU includes corresponding luma and chroma components, referred to as coded tree blocks (CTB), e.g., luma CTB and chroma CTBs, including luma and chroma samples, respectively. Syntax data within a bitstream may define a size for the CTU, which is a largest coding unit in terms of the number of pixels. A slice may be a coded portion of a picture, and may include a number of consecutive CTBs in coding order. A picture may be partitioned into one or more slices. Each CTU may be split into coding units (CUs) according to a quadtree partitioning structure. In general, a quadtree data structure includes one node per CU, with a root node corresponding to the CTB. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. Four sub-CUs of a leaf-CU may also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a similar purpose as a macroblock of the H.264 standard, except that a CU does not have a size distinction. For example, a CTB may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTB may be split, referred to as a maximum CU depth, and may also define a minimum size of the coding nodes. Accordingly, in some examples, a bitstream may also define a smallest coding unit.

A CU includes a coding node and prediction units (PUs) and transform units (TUs) associated with the coding node. This disclosure may use the term "block" to refer to any of a CU, prediction unit (PU), transform unit (TU), coding block, prediction block, transform block, or partition thereof, in the context of HEVC, or similar data structures in the context of other standards. A size of the CU corresponds to a size of the coding node. The size of the CU may range from 8×8 pixels up to the size of the CTB with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape, or include partitions that are non-rectangular in shape, in the case of depth coding as described in this disclosure. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTB, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving reference samples for the PU. The reference samples may be pixels from a reference block. In some examples, the reference samples may be obtained from a reference block, or generated, e.g., by interpolation or other techniques. A PU also includes data related to prediction. For example, when the PU is intra-mode encoded, data for the PU may be included in a residual quadtree (RQT), which may include data describing an intra-prediction mode for a TU corresponding to the PU.

As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList 0, RefPicList 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. In some examples, for intra coding, all the leaf-TUs belonging to a leaf-CU share the same intra prediction mode. In such examples, the same intra prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTB. TUs of the RQT that are not split are referred to as leaf-TUs. In general, this disclosure uses the terms CU and TU to refer to a leaf-CU and leaf-TU, respectively, unless noted otherwise.

A video sequence typically includes a series of pictures. As described herein, "picture" and "frame" may be used interchangeably. That is, a picture containing video data may be referred to as a video frame, or simply a "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra prediction in PU sizes of 2N×2N or N×N, and inter prediction in symmetric PU sizes of 2N×2N, 2N×N, N×2N, or N×N. A PU having a size of 2N×2N represents an undivided CU, as it is the same size as the CU in which it resides. In other words, a 2N×2N PU is the same size as its CU. HEVC supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom. For depth coding, the 3D-HEVC WD further supports partitioning of PU's according to depth modeling modes (DMMs), including non-rectangular partitions, as will be described.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Further details regarding the CU structure in HEVC will now be described. In HEVC, the largest coding unit in a slice is called a coding tree block (CTB). A CTB contains a quad-tree, the nodes of which are coding units.

The size of a CTB may range from 16×16 to 64×64 in the HEVC main profile (although 8×8 CTB sizes may be supported). A coding unit (CU) may be the same size as the size of a CTB and may be as small as 8×8. Each coding unit may, in some examples, be coded with one mode. When a CU is inter-coded, the CU may be further partitioned into 2 or 4 prediction units (PUs) or, if partitioning does not apply, the CU may correspond to one PU. When two PUs are present in one CU, they may be half-size rectangles or two rectangle size with ¼ or ¾ size of the CU.

When a CU is inter-coded, one set of motion information is present for each PU. In addition, each PU is coded with a unique inter-prediction mode to derive the set of motion information.

Further details regarding the Prediction unit (PU) structure will now be described. The prediction unit (PU) is a region, defined by partitioning the CU, on which the same prediction is applied. In general, the PU is not restricted to being square in shape, in order to facilitate partitioning which matches the boundaries of real objects in the picture.

Figure 3:
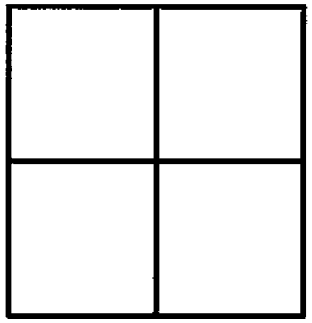
FIG. 3 is a conceptual diagram illustrating example partition modes for use in partitioning a coding unit.
Figure 3:
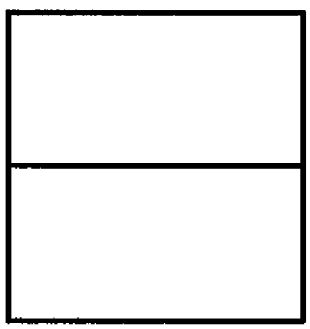
Figure 3:
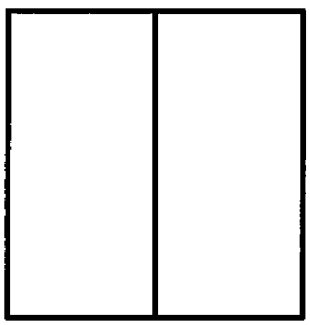
Figure 3:
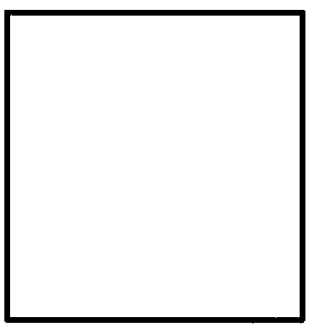
Figure 3:
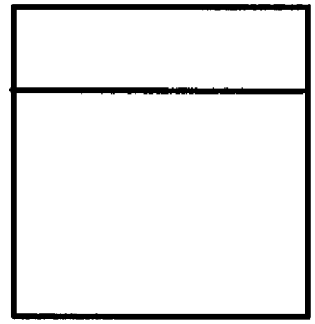
Figure 3:
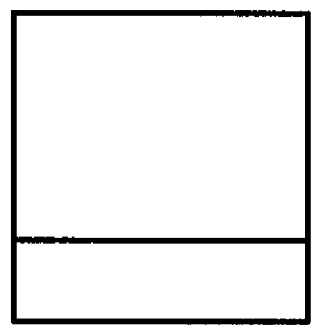
Figure 3:
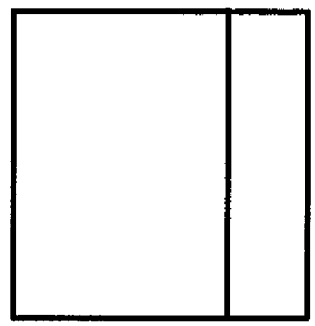
Figure 3:
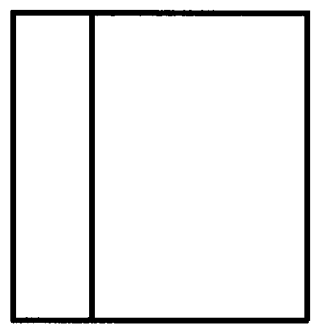

FIG. 3 is a conceptual diagram illustrating example partition modes for use in partitioning a coding unit. Each CU contains one, two or four PUs depending on the partition mode. In FIG. 3, eight partition modes are illustrated that may be used to define the PUs for an inter-coded CU. The PART_2N×2N and PART_N×N partition modes are used to partition an intra-coded CU. The partition mode PART_N×N is allowed only when the corresponding CU size is equal to the minimum CU size.

For an intra-coded CU, the partition modes may be limited, in some examples, to the PART_2N×2N partition mode and the PART_N×N. The partitions resulting from partitioning an intra-coded CU may be referred to as prediction units (PUs). For example, if an intra-coded CU is partitioned according to the PART_2N×2N partition mode, the intra-coded CU may be partitioned into one PU that has the same size as the intra-coded CU. As another example, if an intra-coded CU is partitioned according to the PART_N×N partition mode, the intra-coded CU may be partitioned into four PUs, each of which is one quarter of the size of the intra-coded CU.

Further details regarding the Transform unit (TU) and transform tree structure will now be described. Each CU corresponds to one transform tree, which is a quad-tree, the leaf of which is a transform unit. The transform unit (TU) is a square region, defined by quadtree partitioning of the CU, which shares the same transform and quantization processes.

Figure 4:
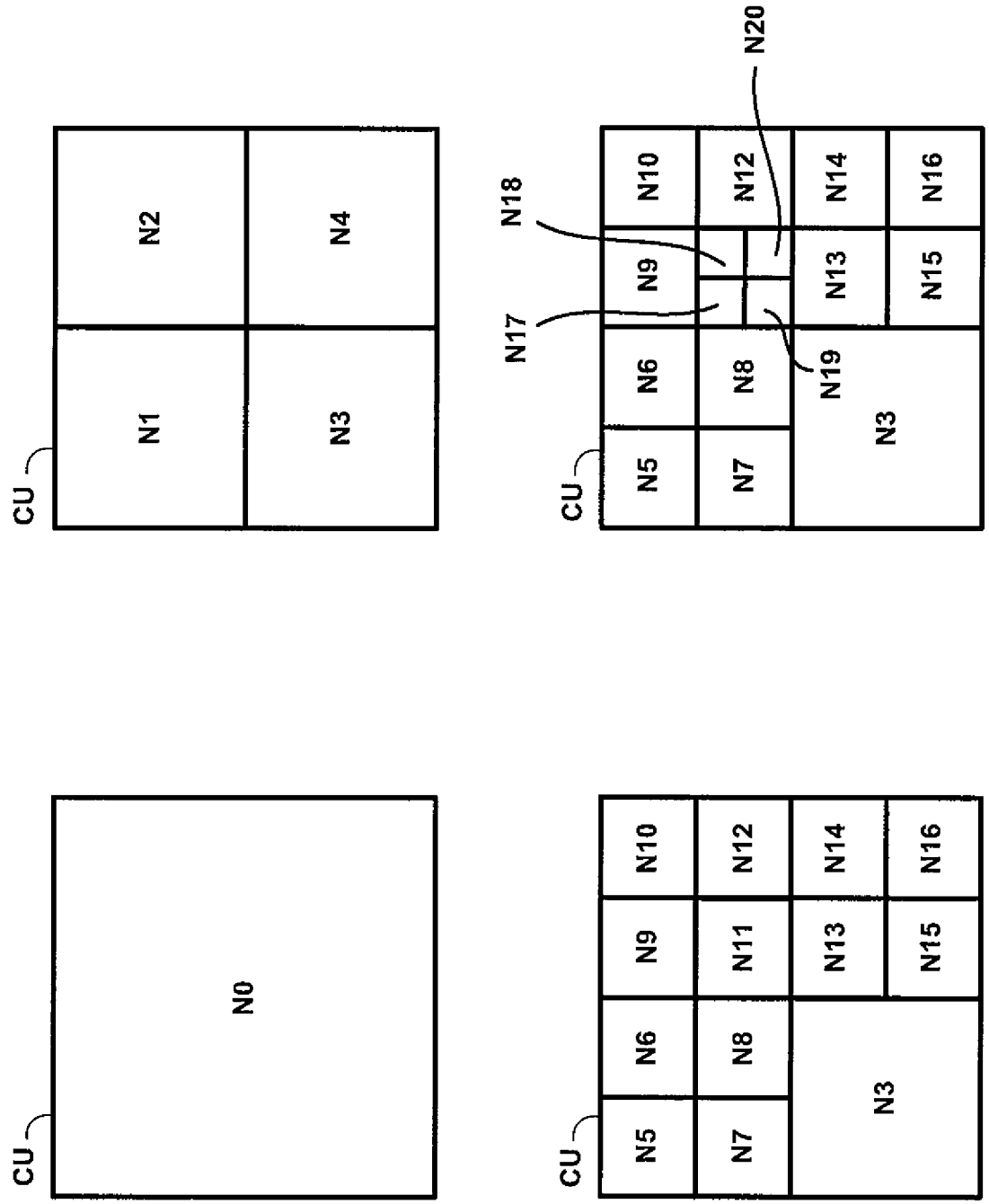
FIG. 4 is a conceptual diagram illustrating an example transform tree structure within a coding unit.

FIG. 4 is a conceptual diagram illustrating an example transform tree structure within a CU. As shown in FIG. 4, the CU corresponds to a root node (N0) of the transform tree structure. The root node (N0) the transform tree structure corresponds to a parent node for the transform tree structure, and is split (e.g., partitioned or subdivided) into four child nodes (N1, N2, N3, N4). The node N1 is split into four child nodes (N5, N6, N7, N8), the node N2 is split into four child nodes (N9, N10, N11, N12), the node N4 is split into four child nodes (N13, N14, N15, N16), and the node N11 is split into four child nodes (N17, N18, N19, N20).

Each of the nodes in the transform tree structure of FIG. 4 may be referred to as a transform tree node. A transform tree node that is not further split into smaller transform tree nodes may be referred to as a leaf node. A transform tree node that is further spilt into smaller transform tree nodes may be referred to as a non-leaf node. Each of the leaf nodes of a transform tree structure may correspond to a respective transform unit. Each of the transform units may correspond to a respective transform block for one or more components of a picture (e.g. a transform block for a depth view component of a picture). Each transform unit and/or transform block may correspond to the fundamental block unit at which a block-based transform is applied and/or a block-based quantization is applied.

In the example of FIG. 4, nodes N3, N5, N6, N7, N8, N9, N10, N12, N13, N14, N15, N16, N17, N18, N19, and N20 are leaf nodes, and nodes N0, N1, N2, N4 and N11 are non-leaf nodes. Each of the leaf nodes N3, N5, N6, N7, N8, N9, N10, N12, N13, N14, N15, N16, N17, N18, N19, and N20 may correspond to a respective transform unit. Each of the transform units may correspond to a respective transform block for one or more components of a picture (e.g. a transform block for a depth view component of a picture).

If a node of a transform tree structure is split into a plurality of sub-nodes, the node that was split may be referred to as a parent node with respect to the sub-nodes, and the sub-nodes may be referred to child nodes with respect to the parent nodes. Each of the nodes in a transform tree structure may correspond to a subdivision level. If a parent node is split into a plurality of child nodes, the child nodes will have a subdivision level that is one level greater than the parent node.

In the example of FIG. 4, the root node (N0) may have a subdivision level (e.g., trafoDepth) of zero, nodes N1, N2, N3, and N4 may have a subdivision level of one. Further, nodes N5, N6, N7, N8, N9, N10, N11, N12, N13, N14, N15, and N16 may have a subdivision level of two, and nodes N17, N18, N19, and N20 may have a subdivision level of three.

In some examples, a syntax element may be coded for each of the transform tree nodes. The syntax element for a respective transform tree node may indicate whether the respective transform tree node is to be split into a plurality of sub-transform tree nodes (i.e., child nodes). For each of the non-leaf nodes, the corresponding syntax element may indicate that the non-leaf node is to be split into a plurality of sub-transform tree nodes. For each of the leaf nodes, the corresponding syntax element may indicate that the leaf node is not to be split into a plurality of sub-transform tree nodes. In some examples, syntax element may be included in the coded bitstream and/or inferred from the coded bitstream.

In HEVC and 3D-HEVC, the syntax element that indicates whether a transform tree node is to be split into a plurality of sub-transform tree nodes may be a split_transform_flag syntax element. A split_transform_flag having a value of one specifies that the transform tree node is to be split into a plurality of sub-transform tree nodes. A split_transform_flag having a value of zero specifies that the transform tree node is not to be split into a plurality of sub-transform tree nodes.

In the example of FIG. 4, nodes leaf nodes N3, N5, N6, N7, N8, N9, N10, N12, N13, N14, N15, N16, N17, N18, N19, and N20 may have a split_transform_flag equal to zero. Similarly, non-leaf N0, N1, N2, N4 and N11 may have a split_transform_flag equal to one.

As discussed above, an intra-coded CU may be partitioned into one or more PUs according to a PART_2N×2N partition mode or a PART_N×N partition mode. If the CU is partitioned according to the a PART_2N×2N partition mode, then the CU may be partitioned into a single PU that has the same size as root node N0 and that has samples (e.g., pixels) that correspond to the samples in root node N0.

If the CU is partitioned according to the PART_N×N partition mode, then the CU may be partitioned into four PUs that have the same size as nodes N1, N2, N3 and N4. A first PU may have samples that correspond to the samples in node N1, a second PU may have samples that correspond to the samples in node N2, a third PU may have samples that correspond to the samples in node N3, and a fourth PU may have samples that correspond to the samples in node N4.

The quadtree structure of multiple TUs within a CU is illustrated in FIG. 4. In the example of FIG. 4, the TU shape is always square and it may take a size from 32×32 down to 4×4 samples. The maximum transform block size and quadtree depth is adjustable and is specified in the sequence parameter set. For an inter-CU, the TU can be larger than PU, i.e. the TU may contain PU boundaries. However, the TU may not cross PU boundaries for an intra CU. For example, in Intra prediction mode, when the partition mode of a CU is PART_N×N, the transform tree depth (if available) of the CU should be greater than 0.

Figure 5:
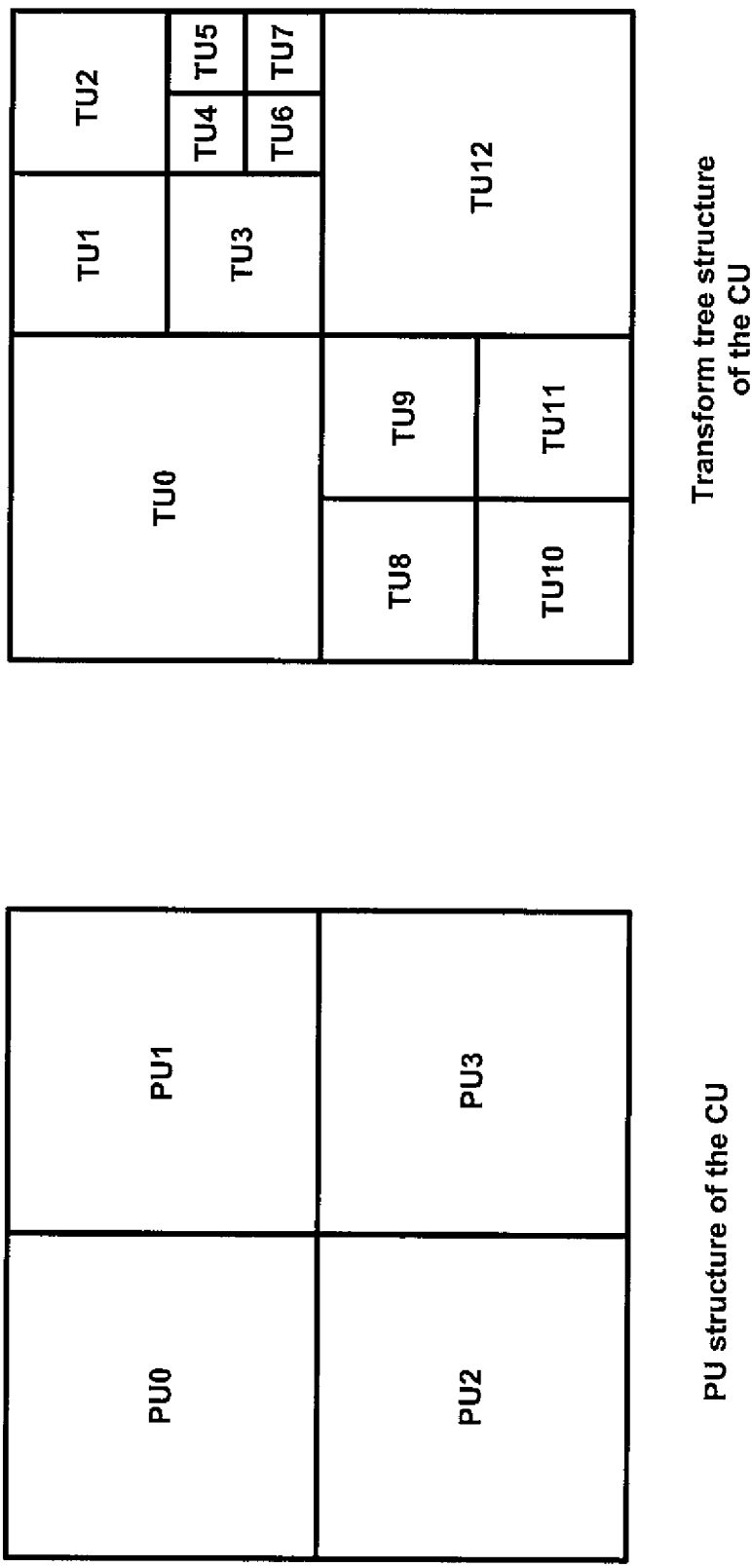
FIG. 5 is a conceptual diagram illustrating an example of a transform tree structure within an intra-coded coding unit that is partitioned with a PART_N×N partition mode.

FIG. 5 is a conceptual diagram illustrating an example of a transform tree structure within an intra-coded coding unit that is partitioned with a PART_N×N partition mode. As shown in FIG. 5, a CU may correspond to a prediction tree structure (left-hand side) and a transform tree structure (right-hand side), where the CU corresponds to the root node for both the prediction tree structure and the transform tree structure.

As shown on the left-hand side of FIG. 5, the CU (i.e. the root node of the prediction tree structure) is split into four nodes (i.e., prediction tree nodes) and each PU corresponds to one of the nodes. As shown on the right-hand side of FIG. 5, the CU (i.e. the root node of the transform tree structure) into transform unit TU0, TU1, TU2, TU3, TU4, TU5, TU6, TU7, TU8, TU9, TU10, TU11, and TU12.

In some examples, the syntax element rqt_root_cbf may signal whether a transform_tree syntax structure is present for a particular coding unit. For example, setting rqt_root_cbf equal to 1 specifies that the transform_tree syntax structure is present for the current coding unit, and setting rqt_root_cbf equal to 0 specifies that the transform_tree syntax structure is not present for the current coding unit. When rqt_root_cbf is not present, its value is inferred to be equal to 1.

When rqt_root_cbf is equal to 0, the transform tree may, in some examples, only contains one node, meaning it is not further split and the split_transform_flag is equal to 0. In such examples, the size of the transform unit corresponding to a coding unit may be equal to the size of the coding unit. In addition, some nodes corresponding to a CU may not be transformed. For a node inside of a transform tree, if it has a split_transform_flag equal to 1, then the node is further split into four nodes. A leaf of a transform tree has a split_transform_flag equal to 0.

For simplicity, if a transform unit or transform tree corresponds to a block which does not have a transform, such a transform unit or transform tree may still be considered to be a transform tree or transform unit, because the hierarchy of the transform itself still exists. A transform skipped block may correspond to and/or be within a transform unit.

The cbf of transform unit will now be described in further detail. A cbf for a transform unit that equals 1 specifies that the transform unit contains one or more transform coefficient levels not equal to 0. A cbf for a transform unit that equals 0 specifies that all transform coefficient levels of the transform unit are 0. The cbf may be set for each component of the transform unit, e.g., cbf is set for luma, cb and cr component respectively.

Figure 6:
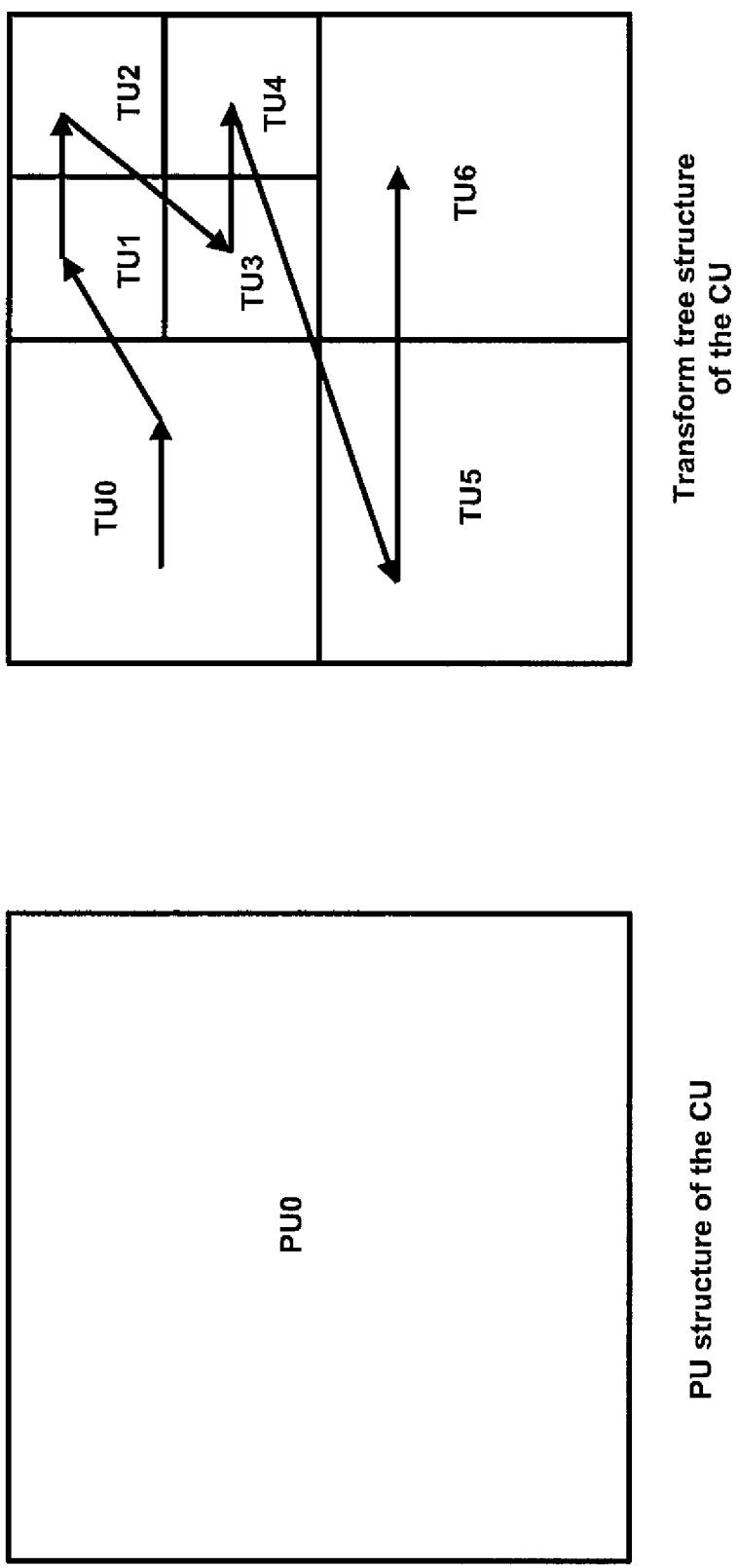
FIG. 6 illustrates an example transform unit processing order for an example transform tree structure.

Intra prediction at the TU level will now be described in further detail. FIG. 6 illustrates an example transform unit processing order for an example transform tree structure. In HEVC, sample prediction and reconstruction of Intra coded CU is performed at TU level, and TUs are predicted and reconstructed in decoding order, as illustrated in FIG. 6. After reconstructing one TU, its reconstruction samples are used to predict the following TUs. When a PU contains multiple TUs, for the first TU, it is predicted using neighboring samples of the PU, while for other TUs, they are predicted using neighboring samples of the PU and/or neighboring samples in the preceding TUs.

Note that, for the regular intra-prediction modes, the same intra-prediction modes (including 33 angle Intra prediction modes, and DC mode and Planar mode) apply for different block sizes, i.e., 4×4, 8×8, 16×16, 32×32 and 64×64. Even when a PU contains multiple TUs with different block sizes, these TUs can be predicted using the same intra-prediction mode.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. For depth coding, the 3D-HEVC WD further supports segment-wise DC coding of residual data and DMM coding, where delta DC values represent residual values for PU partitions. Unlike regular HEVC residual values, delta DC residual values may not be transformed or quantized.

Following quantization, video encoder 20 may scan the quantized transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive binary arithmetic coding (CABAC), as used in HEVC. Examples of other entropy coding processes include context-adaptive variable length coding (CAVLC), syntax-based context-adaptive binary arithmetic coding (SBAC), and Probability Interval Partitioning Entropy (PIPE) coding. Again, in HEVC and 3D-HEVC, CABAC may be used. Video encoder 20 may also entropy encode syntax elements associated with encoded video data for use by video decoder 30 in decoding video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and/or video decoder 30 may perform intra-picture prediction coding of depth data and inter-prediction coding of depth data. In some examples, video encoder 20 and/or video decoder 30 may use SDC to code residual data resulting from depth intra prediction coding of video data and/or depth inter prediction coding of video data. In further examples, video encoder 20 and/or video decoder 30 may use DMM, with or without SDC, to generate residual data resulting from depth intra prediction. DMM may yield a partition-specific predictor for the pixels in a partition. Residual data may be generated for each of the pixels in the partition. Alternatively, if SDC is used with DMM, a single DC residual value may be generated that applies to the pixels in the partition.

In HEVC, assuming that the size of a coding unit (CU) is 2N×2N, video encoder 20 and video decoder 30 may support various prediction unit (PU) sizes of 2N×2N or N×N for intra-prediction, and symmetric PU sizes of 2N×2N, 2N×N, N×2N, N×N, or similar sizes for inter-prediction. A video encoder and video decoder may also support asymmetric partitioning for PU sizes of 2N×nU, 2N×nD, nL×2N, and nR×2N for inter-prediction. For depth coding as provided in 3D-HEVC, a video encoder and video decoder may be configured to support a variety of different depth coding modes for intra prediction and/or inter prediction, including various depth modeling modes (DMMs), as described in this disclosure.

Video data coded using 3D video coding techniques may be rendered and displayed to produce a three-dimensional effect. As one example, two images of different views (i.e., corresponding to two camera perspectives having slightly different horizontal positions) may be displayed substantially simultaneously such that one image is seen by a viewer's left eye, and the other image is seen by the viewer's right eye.

A 3D effect may be achieved using, for example, stereoscopic displays or autostereoscopic displays. Stereoscopic displays may be used in conjunction with eyewear that filters the two images accordingly. For example, passive glasses may filter the images using polarized lenses, or different colored lenses, or other optical filtering techniques, to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to techniques for coding 3D video data by coding depth data to support 3D video. In general, the term "texture" is used to describe luminance (that is, brightness or "luma") values of an image and chrominance (that is, color or "chroma") values of the image. In some examples, a texture image may include one set of luminance data (Y) and two sets of chrominance data for blue hues (Cb) and red hues (Cr). For example, a CTU may include luma and chroma CTBs. In certain formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels (or depth values) that each describes depth, e.g., in a depth component of a view, for corresponding texture data, e.g., in a texture component of the view. Each pixel may have one or more texture values (e.g., luminance and chrominance), and may also have one or more depth values. A texture picture and a depth map may, but need not, have the same spatial resolution. For instance, the depth map may include more or fewer pixels than the corresponding texture picture. The depth data may be used to determine horizontal disparity for the corresponding texture data, and in some cases, vertical disparity may also be used.

A device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change.

Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture components and corresponding depth components.

A picture generally corresponds to a particular temporal instance. Video data may be represented using a sequence of access units, where each access unit includes all data corresponding to a particular temporal instance. Thus, for example, for multiview video data plus depth coding, texture images from each view for a common temporal instance, plus the depth maps for each of the texture images, may all be included within a particular access unit. Hence, an access unit may include multiple views, where each view may include data for a texture component, corresponding to a texture image, and data for a depth component, corresponding to a depth map.

Each access unit may contain multiple view components or pictures. The view components for a particular view are associated with a unique view id or view order index, such that view components of different views are associated with different view ids or view order indices. A view component may include a texture view component as well as a depth view component. The texture and depth view components in the same view may have different layer ids. A texture view component may be coded as one or more texture slices, while the depth view component may be coded as one or more depth slices. Multiview-plus-depth creates a variety of coding possibilities, such as intra-picture, inter-picture, intra-view, inter-view, motion prediction, and the like.

In this manner, with depth map coding in 3D video coding, 3D video data may be represented using a multiview video plus depth format, in which captured or generated views include texture components associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values.

In general, a block of depth data (a block of samples of a depth map, e.g., corresponding to pixels) may be referred to as a depth block. A depth value may be referred to as a luma value associated with a depth sample. That is, a depth map may generally be treated as a monochrome texture picture, i.e., a texture picture including luminance values and no chrominance values. In any case, conventional intra- and inter-coding methods may be applied for depth map coding.

In 3D-HEVC, as mentioned above, the same definition of intra prediction modes is utilized as in HEVC. That is, the intra modes used in 3D-HEVC include the regular intra modes of HEVC. Also, in 3D-HEVC, Depth Modeling Modes (DMMs) are introduced together with the HEVC intra prediction modes to code an intra-prediction unit of a depth slice.

For better representations of sharp edges in depth maps, the current HTM (3D-HTM version 10.0rc1) applies a DMM method for intra coding of the depth map. A depth block is partitioned into two regions specified by a DMM pattern, where each region is represented by a constant value. The DMM pattern can be either explicitly signaled (DMM mode 1), or predicted by a co-located texture block (DMM mode 4).

Figure 7:
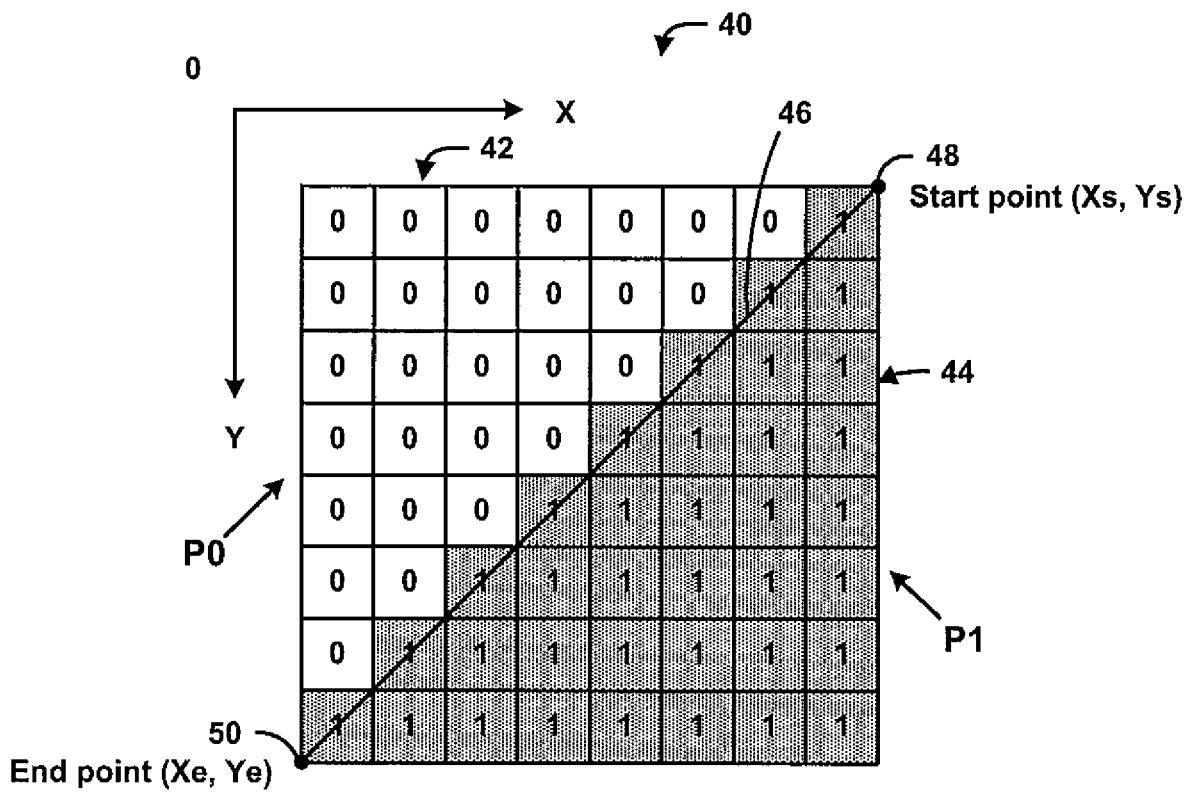
FIG. 7 is a conceptual diagram illustrating an example of one wedgelet partition pattern for use in coding an 8×8 block of pixel samples.
Figure 8:
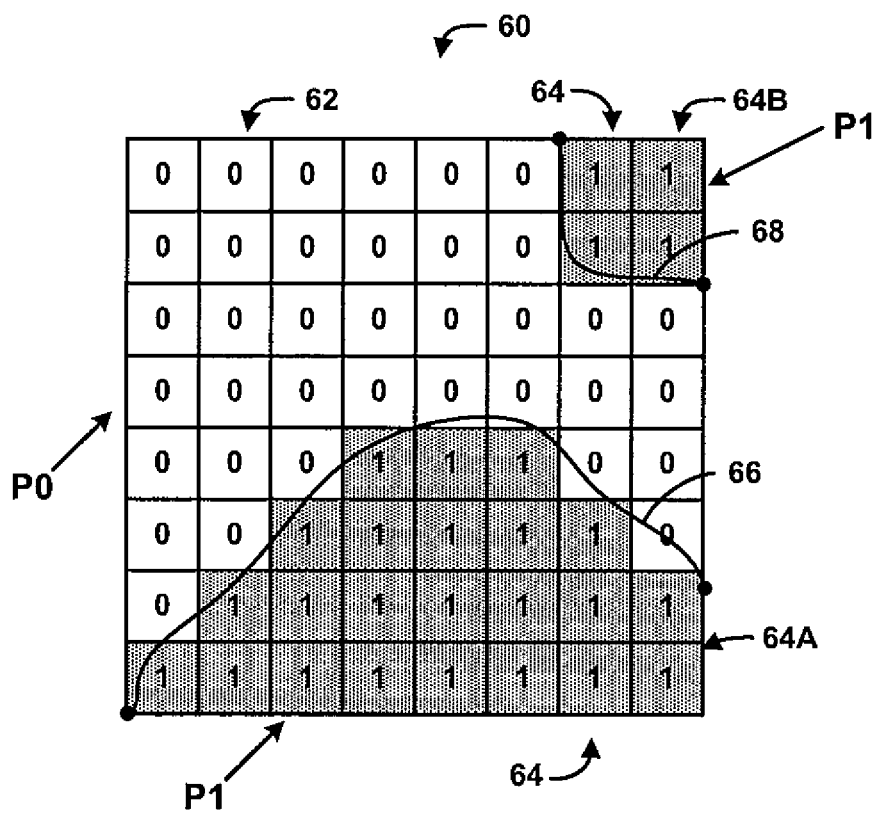
FIG. 8 is a conceptual diagram illustrating an example of one contour partition pattern for use in coding an 8×8 block of pixel samples.

There are two types of partitioning models defined in DMM, including Wedgelet partitioning and the Contour partitioning. FIG. 7 is a diagram illustrating an example of a Wedgelet partition pattern for use in coding a block of pixel samples. FIG. 8 is a diagram illustrating an example of a contour partition pattern for use in coding a block of pixel samples.

For a Wedgelet partition, as shown in FIG. 7, a depth block is partitioned into two regions by a straight line, where the two regions are labeled with P0 and P1. To indicate which wedgelet pattern is used, a wedgelet pattern index (wedge_full_tab_idx) is signaled in general prediction unit parameters at PU and/or CU level. Note that for DMM mode 1, different wedgelet patterns apply for different block sizes.

For Contour partitioning, as shown in FIG. 8, a depth block may be partitioned into two irregular regions. Contour partitioning is more flexible than the Wedgelet partitioning, but difficult to be explicitly signaled. In DMM mode 4, in the case of 3D-HEVC, the contour partitioning pattern is implicitly derived using reconstructed luma samples of the co-located texture block.

To indicate whether DMM modes apply for a PU, a flag, namely dim_not_present_flag, is signaled in coding unit parameters. More specifically, the dim_not_present_flag may be signaled in intra mode extension syntax table, at the PU level. When the dim_not_present_flag is equal to 1, the HEVC Intra prediction modes are used for current PU. Otherwise, when the dim_not_present_flag is equal to 0, DMM modes (DMM mode 1 or DMM mode 4) are used for current PU.

As one example, FIG. 7 provides an illustration of a Wedgelet pattern for an 8×8 block 40. For a Wedgelet partition, a depth block, e.g., PU, is partitioned into two regions 42, 44 by a straight line 46, with a start point 48 located at (Xs, Ys) and an end point 50 located at (Xe, Ye), as illustrated in FIG. 7, where the two regions 42, 44 are also labeled with P0 and P1, respectively. Each pattern in block 40 consists of an array of size uB×vB binary digit labeling whether the corresponding sample belongs to region P0 or P1 where uB and vB represents the horizontal and vertical size of the current PU respectively. The regions P0 and P1 are represented in FIG. 7 by white and shaded samples, respectively. The Wedgelet patterns are initialized at the beginning of both encoding and decoding.

As shown in the example of FIG. 8, a depth block, such as depth block 60, can be partitioned into two irregularly-shaped regions 62, 64 using contour partitioning, where region 62 is labeled as P0 and the two regions 64A and 64B are co-labeled as P1, respectively. Region 64 is formed from two sub-regions 64A and 64B. Sub-regions 64A and 64B are represented by contour lines 66 and 68, respectively.

Although pixels in region 64A are not immediately adjacent to pixels in region 64B, regions 64A and 64B may be defined to form one single region (region "64"), for the purposes of predicting a PU of depth block 60. Thus, depth block 60 may be said to be partitioned into two irregularly-shaped regions 62 and 64 where region 64 includes two non-contiguous sub-regions 64A and 64B.

With reference to FIGS. 7 and 8, each individual square within N×N depth blocks 40 and 60 represents a respective individual pixel of depth blocks 40 and 60, respectively. Numeric values within the squares represent whether the corresponding pixel belongs to region 42 (value "0" in the example of FIG. 7) or region 44 (value "1" in the example of FIG. 7). Shading is also used in FIG. 7 to indicate whether a pixel belongs to region 42 (white squares) or region 44 (grey shaded squares).

As discussed above, each pattern (that is, both Wedgelet and Contour) may be defined by an array of size uB×vB binary digit labeling of whether the corresponding sample (that is, pixel) belongs to region P0 or P1 (where P0 corresponds to region 42 in FIG. 7 and region 62 in FIG. 8, and P1 corresponds to region 44 in FIG. 7 and regions 64A, 64B in FIG. 8), where uB and vB represent the horizontal and vertical size of the current PU, respectively. In the examples of FIG. 7 and FIG. 8, the PU corresponds to blocks 40 and 60, respectively.

For HEVC intra prediction modes, a pixel specific intra predictor value is generated for each pixel in the PU by using neighboring samples of the PU, as specified in sub-clause 8.4.2 in HEVC WD 10.

For other depth intra prediction modes, such as DMM, a partition specific DC predictor is calculated for each partition within the PU by using up to two neighboring samples of the PU. Let bPattern[x][y] be the partition pattern of the PU, where x=0 . . . N−1, y=0 . . . N−1 and N is the width of the PU. bPattern[x][y] indicates which partition pixel (x, y) belongs to and bPattern[x][y] can be equal to 0 or 1. Let BitDepth be the bit depth of depth samples and let RecSample[x][y] be the reconstructed neighboring samples of the PU, with x=−1 and y=0 . . . N−1 (corresponds to left neighboring pixels of the PU) or y=−1, x=0 . . . N−1 (corresponds to above neighboring pixels of the PU). Then, the DC predictor of partition X, namely DCPred[X], with X=0 or 1 is derived as follows:

Set bT=(bPattern[0][0] !=bPattern[N−1][0])? 1:0
Set bL=(bPattern[0][0] !=bPattern[0][N−1])? 1:0
If bT equals bL
 DCPred[X]=(RecSample[−1][0]+RecSample[0][−1])>>1
 DCPred[1−X]=bL ? (RecSample[−1][N−1]+RecSample[N−1][−1])>>1:$2^{BitDepth-1}$
Otherwise
 DCPred[X]=bL ? RecSample[(N−1)>>1][−1]:RecSample[−1][(N−1)>>1]
 DCPred[1−X]=bL ? RecSample[−1][N−1]:RecSample[N−1][−1]

A Depth Lookup Table (DLT) maps depth indexes to depth values. The DLT can be constructed by analyzing the frames within the first intra period before encoding the full video sequence. In the current design of 3D-HEVC, all of the valid depth values are sorted in ascending order and inserted to the DLT with increasing indexes.

The DLT is an optional coding tool. In the current HTM (3D-HTM version 9.0), video encoder 20 will not use DLT if more than half of the values from 0 to MAX_DEPTH_VALUE (e.g., 255 for 8-bit depth samples) appear in the original depth map at the analysis step. Otherwise, the DLT will be coded in a sequence parameter set (SPS) and/or video parameter set (VPS). In order for encoder 20 to code DLT, the number of valid depth values is coded with an Exp-Golomb code first. Then, each valid depth value is also coded with an Exp-Golomb code.

Video encoder 20 reads a pre-defined number of frames from the input video sequence to be coded and scans all samples for available depth map values. During this process, encoder 20 generates a mapping table that maps depth values to valid depth values based on the original uncompressed depth map.

Video encoder 20 and/or video decoder 30 derive the Depth Lookup Table Idx2Depth(.), the Index Lookup TableDepth2Idx(.), the Depth Mapping Table M(.) and the number of valid depth values $d_{valid}$ using the following algorithm that analyzes the depth map $D_t$:

1. Initialization
 boolean vector B(d)=FALSE for all depth values d
 index counter i=0
2. Process each pixel position p in $D_t$ for multiple time instances t:
 Set (B($D_t$(p))=TRUE to mark valid depth values
3. Count number of TRUE values in B(d)→$d_{valid}$
4. For each d with B(d)==TRUE:
 Set Idx2Depth(i)=d
 Set M(d)=d
 Set Depth2Idx(d)=i
 i=i+1
5. For each d with B(d)==FALSE:
 Find d'=arg min|d−d'| and B(d')==TRUE
 Set M(d)=d'
 Set Depth2Idx(d)=Depth2Idx(d').

Mapping from an index Idx back to a depth value d is as follows: d=Idx2Depth [Idx]. Mapping from a depth value d to an index Idx is as follows: Idx=Depth2Idx [d].

Segment-wise DC coding (SDC) has been introduced in 3D-HEVC. In SDC, one DC residual value is signaled for each partition of the PU, and no transform or quantization is applied. In HEVC intra prediction modes, the entire PU is considered one partition. SDC can be applied for all depth Intra prediction modes, including the regular HEVC intra prediction modes and the DMM modes, to code an intra PU of a depth slice. In the current 3D-HEVC, SDC is only applied for a 2N×2N PU partition size.

To signal the residual value of each partition, two methods can be applied:

1. Directly code the DC residual value of each partition which is calculated by subtracting the predictor, denoted by Pred, generated by neighboring samples from the DC value (i.e., average value, denoted by Aver) of the current partition in the current PU.
2. When DLTs are transmitted, instead of coding the DC residual value, the index difference of the Aver and Pred mapped from the Index Lookup Table is coded. The index difference is calculated by subtracting the index of Pred from the index of Aver. At the decoder side, the sum of decoded index difference and the index of Pred is mapped back to depth values based on the DLT.

Figure 9:
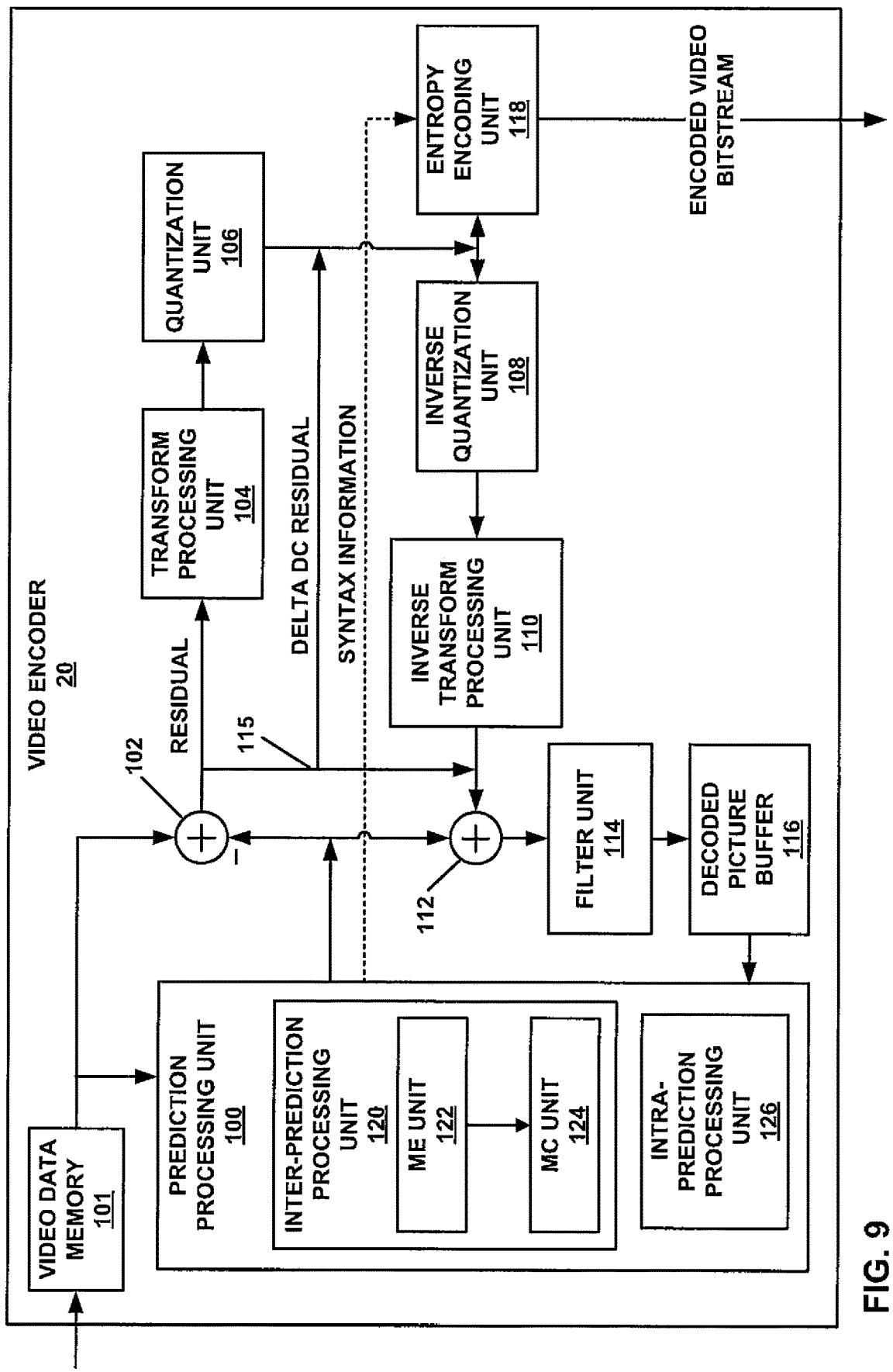
FIG. 9 is a block diagram illustrating an example video encoder that may implement the techniques of this disclosure.

FIG. 9 is a block diagram illustrating an example video encoder 20 that may be configured to implement the techniques of this disclosure. This disclosure describes video encoder 20 in the context of HEVC coding and, more particularly, 3D-HEVC coding, e.g., as described in 3D-HEVC WD and as further modified as described in this disclosure. However, the techniques of this disclosure may be applicable to other coding standards or methods. Accordingly, FIG. 9 is provided for purposes of explanation and should not be considered limiting of the techniques as broadly exemplified and described in this disclosure.

Video encoder 20 may be configured to perform any of the techniques for constrained depth Intra coding and/or constrained DMM coding described in this disclosure. For example, video encoder 20 may use techniques that constrain a split_transform_flag to be equal to zero (e.g., to indicate that a transform tree node is not to be split into a plurality of smaller transform tree nodes) when a corresponding depth prediction unit is coded according to a depth modeling mode (DMM). As another example, video encoder 20 may use techniques that constrain a dim_not_present_flag to be equal to one (e.g., to indicate that a DMM coding mode is not used for a depth prediction unit) when a size of the depth prediction unit is greater than a maximum transform block size that corresponds to the depth prediction unit.

As a further example, video encoder 20 may use techniques that selectively signal a split_transform_flag based on whether a corresponding depth prediction unit is coded according to a DMM. As an additional example, video encoder 20 may use techniques that selectively signal a dim_not_present_flag based on whether a size of a corresponding depth prediction unit is greater than a maximum transform block size that corresponds to the depth prediction unit. In some examples, one or more of the above-described techniques may prevent transform units and/or transform trees from being subdivided in cases where such subdivision would interfere with the intra coding of depth prediction units according to a depth modeling mode (DMM).

In the example of FIG. 9, video encoder 20 includes prediction processing unit 100, video data memory 101, residual generation unit 102, transform processing unit 104, quantization unit 106, inverse quantization unit 108, inverse transform processing unit 110, reconstruction unit 112, filter unit 114, decoded picture buffer 116, and entropy encoding unit 118. Prediction processing unit 100 includes an inter-prediction processing unit 120 and an intra-prediction processing unit 126. Inter-prediction processing unit 120 includes a motion estimation (ME) unit 122 and a motion compensation (MC) unit 124.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices.

The components of prediction processing unit 100 are described as performing both texture encoding and depth encoding. In some examples, texture and depth encoding may be performed by the same components of prediction processing unit 100 or different components within prediction processing unit 100. For example, separate texture and depth encoders may be provided in some implementations. Also, multiple texture and depth encoders may be provided to encode multiple views, e.g., for multiview plus depth coding.

In either case, prediction processing unit 100 may be configured to intra- or inter-encode texture data and depth data as part of a 3D coding process, such as a 3D-HEVC process. In particular, in some modes, prediction processing unit 100 may use regular HEVC Intra coding modes or DMM modes to code an Intra prediction unit of a depth slice. In addition, prediction processing unit 100 may use non-SDC residual coding or SDC coding. In the case of SDC or DMM coding, prediction processing unit 100 may generate a delta DC residual value for an intra- or inter-coded depth PU, wherein the delta DC residual value represents a difference between an average value of pixels in a PU or partition of the coded PU and an average value of predicted samples in an intra- or inter-predicted PU partition. A PU may have a single partition or multiple partitions, depending on the coding mode. HEVC intra, HEVC inter modes, DMM's or other modes may be used to code a depth PU.

In some examples, prediction processing unit 100 may operate substantially in accordance with 3D-HEVC, e.g., as described in the 3D-HEVC WD, subject to modifications and/or additions described in this disclosure, such as those relating to constrained depth Intra mode coding and/or constrained DMM coding. In some examples, video encoder 20 may include more, fewer, or different functional components than shown in FIG. 9. Prediction processing unit 100 may provide syntax information to entropy encoding unit 118. The syntax information may indicate, for example, which prediction modes were used and information relating to such modes, such as a motion vector, prediction direction, and reference picture index, in the case of inter-prediction.

Video encoder 20 receives video data to be encoded. Video encoder 20 may encode each of a plurality of coding tree units (CTU) in a slice of a picture of the video data. In 3D-HEVC, video encoder 20 may encode CTU's of texture and depth views. Each of the texture CTUs may have luma and chroma components, and may be associated with equally-sized luma coding tree blocks (CTBs) and corresponding chroma CTBs of the picture. A depth CTU may include a single depth component. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTB to generate encoded representations of the CUs (i.e., coded CUs). As part of encoding a CU, prediction processing unit 100 may partition the coding blocks associated with the CU among one or more PUs of the CU. Thus, each PU in a texture slice may be associated with a luma component prediction block and corresponding chroma component prediction blocks. Each PU in a depth slice may have a single component.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 120 may generate predictive data for a PU by performing inter prediction on each PU of a CU. The predictive data for the PU may include predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation (ME) unit 122 may search the reference pictures in a list of reference pictures (e.g., "RefPicList0") for a reference region for the PU. The reference pictures may be stored in decoded picture buffer 116. The reference region for the PU may be a region, within a reference picture, that contains sample blocks that most closely corresponds to the sample blocks of the PU. Motion estimation (ME) unit 122 may generate a reference index that indicates a position in RefPicList0 of the reference picture containing the reference region for the PU.

In addition, for inter-coding, motion estimation (ME) unit 122 may generate a motion vector (MV) that indicates a spatial displacement between a coding block of the PU and a reference location associated with the reference region. For instance, the MV may be a two-dimensional vector that provides an offset from the coordinates in the current decoded picture to coordinates in a reference picture. Motion estimation (ME) unit 122 may output the reference index and the MV as the motion information of the PU. Motion compensation (MC) unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation (ME) unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation (MC) unit 124 may generate the predictive sample blocks of the PU based at least in part on actual or interpolated samples at the reference region indicated by the motion vector of the PU.

To perform bi-directional inter-prediction for a PU, motion estimation unit 122 may search the reference pictures in RefPicList0 for a reference region for the PU and may also search the reference pictures in RefPicList1 for another reference region for the PU. Motion estimation (ME) unit 122 may generate reference picture indexes that indicate positions in RefPicList0 and RefPicList1 of the reference pictures that contain the reference regions. In addition, motion estimation (ME) unit 122 may generate MVs that indicate spatial displacements between the reference location associated with the reference regions and a sample block of the PU. The motion information of the PU may include the reference indexes and the MVs of the PU. Motion compensation (MC) unit 124 may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The intra-predictive data for the PU may include predictive sample blocks for the PU and various syntax elements. Intra-prediction processing unit 126 may perform intra prediction on PUs in I slices, P slices, and B slices. To perform intra prediction on a PU, intra-prediction processing unit 126 may use multiple intra prediction modes to generate multiple sets of predictive data for the PU, and then select one of the intra-prediction modes that yields acceptable or optimal coding performance, e.g., using rate-distortion optimization techniques.

To use an intra prediction mode to generate a set of predictive data for the PU, intra-prediction processing unit 126 may extend samples from sample blocks of spatially neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes, as shown in FIG. 1. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate a luma, Cb and Cr residual blocks of a CU based on the luma, Cb and Cr coding blocks of a CU and the selected inter- or intra-predictive luma, Cb and Cr blocks of the PUs of the CU. For instance, residual generation unit 102 may generate the residual blocks of the CU such that each sample in the residual blocks has a value equal to a difference between a sample in a coding block of the CU and a corresponding sample, i.e., in luma or chroma pixel value, as applicable, in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks, in the case of a texture view. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

For HEVC intra modes, HEVC inter modes and other modes, such as DMM modes, delta DC coding may be used to generate a delta DC residual value, also referred to as a DC residual value, for a predicted PU or PU partition. For SDC, or for DMM with SDC, residual generation unit 102 may generate a single delta DC value for each depth PU or PU partition, where the single delta DC value represents a difference between an average value of pixels in the PU or PU partition, and an average value of predicted samples in an intra- or inter-predicted PU or PU partition. For DMM, without SDC, residual generation unit 102 may generate a delta DC value and a regular residual tree. The delta DC residual value is not transformed or quantized and may be provided by residual generation unit 102 to entropy coding unit 118 as indicated by line 115.

Reconstruction unit 112 may reconstruct a depth CU based on DC residual values for partitions of PU's of the CU and corresponding predicted partitions of the PU's of the CU. For example, the delta DC residual value for each depth CU partition may be added to the pixels values in a corresponding predicted partition to reconstruct the depth PU partition, wherein the DC residual value may represent a difference between an average value of the pixels of the depth PU partition and the average value of the predicted samples of the predicted partition. For SDC, including DMM with SDC, only the DC residual value is used. For DMM, without SDC, the DC residual value and a residual tree may be used. In some examples, information representing the DC residual value, such as one or more syntax elements representing delta DC values, may be generated by prediction processing unit 100, received by entropy encoding unit 118, and used by reconstruction unit 112 without inverse quantization or inverse transform processing, e.g., as indicated by line 115.

Filter unit 114 may perform one or more deblocking operations to reduce blocking artifacts in the coding blocks associated with a reconstructed CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from various functional components of video encoder 20. For example, entropy encoding unit 118 may receive coefficient blocks from quantization unit 106 and may receive syntax elements from prediction processing unit 100. In addition, entropy encoding unit 118 may receive delta DC residual values from residual generation unit 102. Entropy encoding unit 118 may perform one or more entropy encoding operations on the data to generate entropy-encoded data. For example, entropy encoding unit 118 may perform a CABAC operation. Video encoder 20 may output an encoded video bitstream that includes CABAC entropy-encoded data generated by entropy encoding unit 118. For instance, the bitstream may include bits that represent bins of binary syntax elements or binarized syntax elements.

Video encoder 20 is an example of a video encoder configured to perform any of the techniques described in this disclosure. Additional 3D processing components may also be included within video encoder 20. In accordance with one or more techniques of this disclosure, one or more units within video encoder 20 may perform the techniques described herein as part of a video encoding process. Similarly, video encoder 20 may perform a video decoding process to reconstruct video data used as reference data for prediction of subsequently coded video data.

For example, Video encoder 20 may be configured to use techniques that constrain one or more syntax elements or selectively signal one or more syntax elements for depth Intra coding and/or DMM coding, as described in this disclosure. The techniques may prevent transform units and/or transform trees from being subdivided in cases where such subdivision would interfere with the intra coding of depth prediction units according to a depth modeling mode (DMM).

Figure 10:
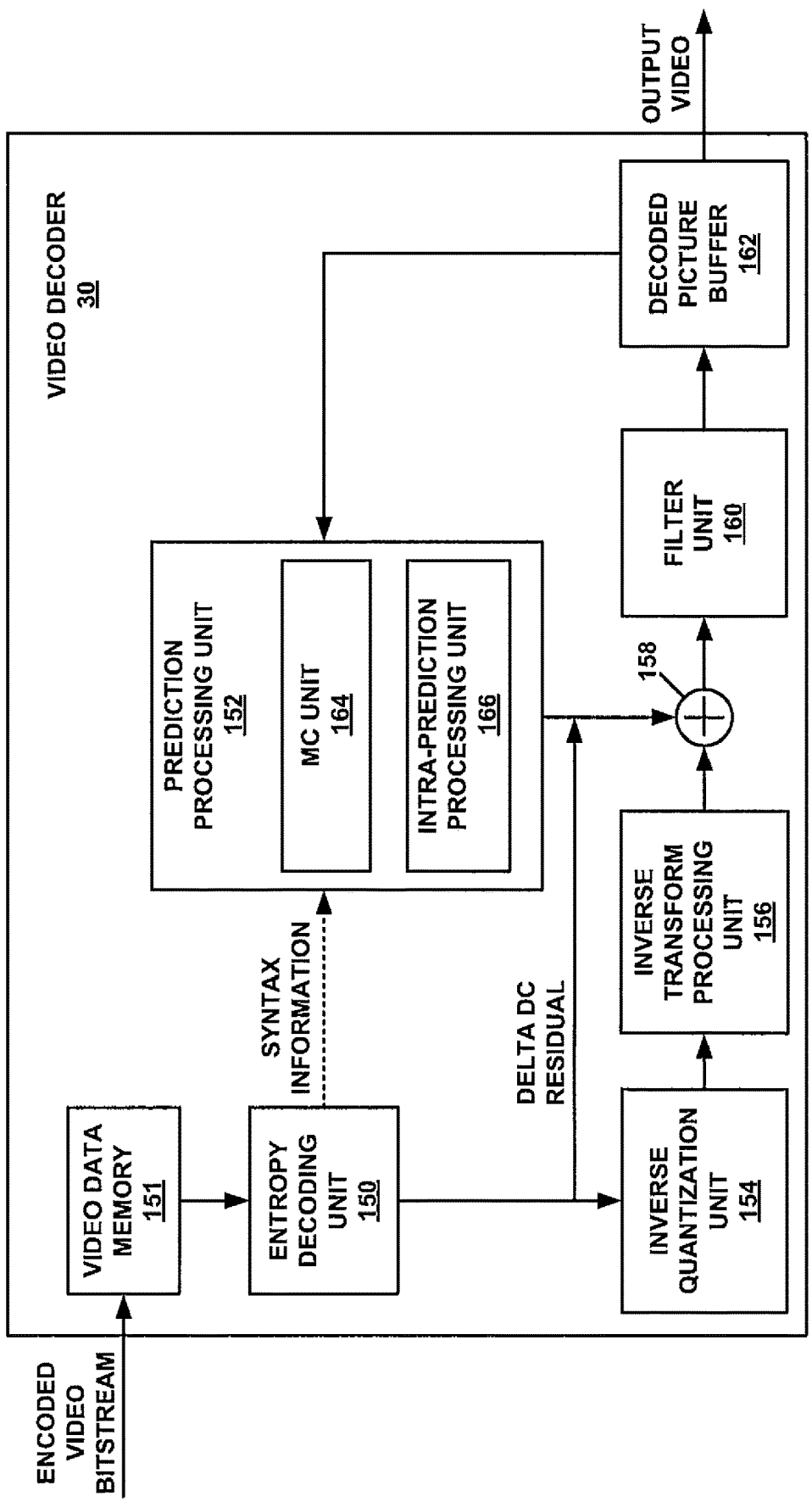
FIG. 10 is a block diagram illustrating an example video decoder that may implement the techniques of this disclosure.

FIG. 10 is a block diagram illustrating an example video decoder 30 that is configured to perform the techniques of this disclosure. FIG. 10 is provided for purposes of illustration and should not be considered limiting of the techniques as broadly exemplified and described in this disclosure. This disclosure describes video decoder 30 in the context of HEVC coding and, in particular, 3D-HEVC coding. However, the techniques of this disclosure may be applicable to other 3D video coding standards or methods.

Video decoder 30 may be configured to perform any of the techniques for constrained depth Intra coding and/or constrained DMM coding described in this disclosure. For example, video decoder 30 may use techniques that decode an encoded bitstream which satisfies a constraint that specifies that a split_transform_flag be equal to zero (e.g., to indicate that a transform tree node is not to be split into a plurality of smaller transform tree nodes) when a corresponding depth prediction unit is coded according to a depth modeling mode (DMM). As another example, video decoder 30 may use techniques that decode an encoded bitstream which satisfies a constraint that specifies that a dim_not_present_flag be equal to one (e.g., to indicate that a DMM coding mode is not used for a depth prediction unit) when a size of the depth prediction unit is greater than a maximum transform block size that corresponds to the depth prediction unit.

As a further example, video decoder 30 may use techniques that selectively decode a split_transform_flag based on whether a corresponding depth prediction unit is coded according to a DMM. As an additional example, video decoder 30 may use techniques that selectively decode a dim_not_present_flag based on whether a size of a corresponding depth prediction unit is greater than a maximum transform block size that corresponds to the depth prediction unit. In some examples, one or more of the above-described techniques may prevent transform units and/or transform trees from being subdivided in cases where such subdivision would interfere with the intra coding of depth prediction units according to a depth modeling mode (DMM).

In the example of FIG. 10, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 may include a motion compensation (MC) unit 164 for inter-prediction and an intra-prediction processing unit 166.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices.

For ease of illustration, the components of prediction processing unit 152 are described as performing both texture decoding and depth decoding. In some examples, texture and depth decoding may be performed by the same components of prediction processing unit 152 or different components within prediction processing unit 152. For example, separate texture and depth decoders may be provided in some implementations. Also, multiple texture and depth decoders may be provided to decode multiple views, e.g., for multiview plus depth coding. In either case, prediction processing unit 152 may be configured to intra- or inter-decode texture data and depth data as part of a 3D coding process, such as a 3D-HEVC process.

Accordingly, prediction processing unit 152 may operate substantially in accordance with 3D-HEVC, subject to modifications and/or additions described in this disclosure, such as those relating to constrained depth Intra mode coding and/or constrained DMM coding. Prediction processing unit 152 may obtain residual data from the encoded video bitstream for intra-decoded or inter-decoded depth data using SDC or non-SDC residual coding techniques, via entropy decoding unit 150, and reconstruct CU's using intra-predicted or inter-predicted depth data and the residual data. In some examples, the residual data may be a delta DC residual value, which may be generated, for example, by SDC or DMM coding. Video decoder 30 may include more, fewer, or different functional components than shown in FIG. 10.

Video decoder 30 receives an encoded video bitstream. Entropy decoding unit 150 parses the bitstream to decode entropy-encoded syntax elements from the bitstream. Prediction processing unit 152, inverse quantization unit 154, inverse transform processing unit 156, reconstruction unit 158, and filter unit 160 may generate decoded video data based on the syntax elements extracted from the bitstream. The bitstream may comprise a series of NAL units. The NAL units of the bitstream may include coded slice NAL units. As part of decoding the bitstream, entropy decoding unit 150 may extract and entropy decode syntax elements from the coded slice NAL units.

Each of the coded slices may include a slice header and slice data. The slice header may contain syntax elements pertaining to a slice. The syntax elements in the slice header may include a syntax element that identifies a PPS associated with a picture that contains the slice. The PPS may refer to an SPS, which may in turn refer to a VPS. Entropy decoding unit 150 may also entropy decode other elements that may include syntax information, such as SEI messages. Decoded syntax elements in any of the slice header, parameter sets, or SEI messages may include information described herein as being signaled in accordance with example techniques described in this disclosure. Such syntax information may be provided to prediction processing unit 152 for decoding and reconstruction of texture or depth blocks.

Video decoder 30 may perform a reconstruction operation on a non-partitioned CU's and PUs. To perform the reconstruction operation, for non-SDC coding, video decoder 30 may perform a reconstruction operation on each TU of the CU. By performing the reconstruction operation for each TU of the CU, video decoder 30 may reconstruct blocks of the CU. As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra-prediction, intra-prediction processing unit 166 may perform intra prediction to generate predictive blocks for the PU. Intra-prediction processing unit 166 may use an intra prediction mode to generate the predictive luma, Cb and Cr blocks for the PU for texture slices based on the prediction blocks of spatially-neighboring PUs. Intra-prediction processing unit 166 may use an intra prediction mode to generate depth blocks for a depth slice. Intra-prediction processing unit 166 may determine the intra prediction mode for the PU based on one or more syntax elements decoded from the bitstream.

If a PU is encoded using inter-prediction, MC unit 164 may perform intra prediction to generate an inter-predictive block for the PU. MC unit 164 may use an inter prediction mode to generate the predictive luma, Cb and Cr blocks for the texture PU and/or predictive depth blocks based on the prediction blocks of PUs in other pictures or views. MC unit 164 may determine the inter prediction mode for the PU based on one or more syntax elements decoded from the bitstream, and may receive motion information such as motion vectors, prediction direction, and reference picture indexes.

For inter-prediction, MC unit 164 may construct a first reference picture list (RefPicList0) and a second reference picture list (RefPicList1) based on syntax elements extracted from the bitstream. If a PU is encoded using inter prediction, entropy decoding unit 150 may extract motion information for the PU. MC unit 164 may determine, based on the motion information of the PU, one or more reference blocks for the PU. Motion compensation (MC) unit 164 may generate, based on samples in blocks at the one or more reference blocks for the PU, predictive luma, Cb and Cr blocks for a texture PU and a predictive depth block for a depth PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add residual samples of the luma, Cb and Cr transform blocks to corresponding samples of the predictive luma, Cb and Cr blocks to reconstruct the luma, Cb and Cr coding blocks of the CU. Similarly, reconstruction unit 158 may use intra-prediction data or inter-prediction data to reconstruct depth blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 2. For instance, video decoder 30 may perform, based on the luma, Cb and Cr blocks in decoded picture buffer 162, intra prediction or inter prediction operations on PUs of other CUs.

In some examples, video decoder 30 may use modified binarization and/or context modeling processes to reduce the complexity of entropy coding of one or more syntax elements used to represent delta DC residual values, as described herein. In further examples, one or more units within video decoder 30 may perform one or more techniques described herein as part of a video decoding process. Additional 3D coding components may also be included within video decoder 30.

Prediction processing unit 152 and, more particularly, intra-prediction processing unit 166 and motion compensation (MC) unit 164, may determine, based on received syntax information, whether to perform SDC or DMM in depth intra-prediction modes and depth inter-prediction modes, as applicable, of a 3D video coding process, such as 3D-HEVC. When SDC or DMM is used, for example, entropy decoding unit 150 may entropy decode one or more delta DC residual values for PU's or PU partitions of a depth CU, as well as associated syntax information.

For SDC, entropy decoding unit 150 may provide SDC syntax information for the block to prediction processing unit 152, as indicated in FIG. 10. Entropy decoding unit 150 may provide delta DC residual value to reconstruction unit 158. The delta DC residual values received by video decoder 30 are not transformed and quantized. In particular, the delta DC residual value(s) need not be first provided to inverse quantization unit 154 and inverse transform processing unit 156 for inverse quantization and inverse transformation. Instead, entropy decoding unit 150 may decode, from bits in the bitstream, bins for a syntax element representing a delta DC residual value, and provide information representing the delta DC residual value to reconstruction unit 158 for use in reconstructing a coded PU or partition. Reconstruction unit 158 may receive an intra- or inter-predicted PU or PU partition of a depth CU from prediction processing unit 152 and add the delta DC residual value to each of the samples of the predicted PU or PU partition to reconstruct the coded PU or PU partition.

In this manner, when SDC or DMM is used, for example, reconstruction unit 158 may reconstruct a depth CU based on delta DC residual values for partitions of PU's of the CU and corresponding predicted PUs or PU partitions of the CU. Again, the delta DC residual value may represent a difference between an average value of the pixels of the depth PU or PU partition and the average value of the predicted samples of the predicted PU or PU partition. When DMM is used without SDC, a regular residual coding tree may be used in addition to the delta DC value. Likewise, when HEVC intra modes are used, a regular residual coding tree may be used.

In accordance with various examples of this disclosure, video encoder 20 and/or video decoder 30 may be configured to perform techniques for depth Intra coding described in this disclosure, including the techniques for DMM coding. In some examples, the techniques for depth Intra mode coding may prevent transform units and/or transform trees from being subdivided in cases where such subdivision would interfere with the intra coding of depth prediction units according to a DMM prediction mode, e.g., DMM mode 1 or DMM mode 4.

In further examples, the techniques for depth Intra mode coding may be used to ensure that an entire prediction unit is encoded according to the same wedgelet pattern when intra coding depth components according to a depth modeling mode (DMM). In additional examples, the techniques for depth Intra mode coding may ensure that a prediction unit is split into two regions rather than more than two regions when intra coding depth components according to a DMM.

The techniques of this disclosure, in some examples, may overcome one or more of the following issues related to the current DMM coding of 3D-HEVC. For a coding unit (CU) coded with an intra prediction mode, if segment-wise DC coding (SDC) does not apply, one transform tree (if available) is coded to represent the residual of the CU and each PU corresponds to a transform tree node. There is no depth constraint on the associated transform tree node of a DMM coded PU. In other words, a transform unit (TU) within such transform tree node may take a size from the PU size down to the smallest allowable TU size (e.g., 4×4). However, when the depth of such a transform tree node is greater than 0 and TU size is less than PU size, two issues may arise:

The first issue may arise when using DMM mode 1 and will now be described. Assume that the same PU structure and TU structure as illustrated in FIG. 6 are used for a CU coded with the Intra prediction mode, and that the PU0 in FIG. 6 is predicted with DMM mode 1. All TUs within PU0 should use same wedgelet pattern index signaled at PU level. However, because different wedgelet patterns apply for different block sizes, the same wedgelet pattern index may correspond to different wedgelet patterns for different TU sizes. Therefore, TUs within one PU may use different intra prediction modes, which may break the concept of a PU. Furthermore, the signaled wedgelet pattern index may be even invalid for some TU sizes, which may make the wedgelet pattern unknown for such TU sizes.

The second issue may arise when using DMM mode 1 and/or DMM mode 4 and will now be described. When a PU is coded with DMM mode 1 or DMM mode 4, each TU within the PU is partitioned into two regions. Therefore, the PU may contain more than two regions when it contains multiple TUs. This may break the concept of DMM modes (both DMM mode 1 and DMM mode 4) which expect to split a PU into two regions.

The techniques of this disclosure may, in some examples, provide solutions to one or both of the above mentioned problems in depth modeling mode (DMM) coding. In some examples, one or more of the following techniques may be used when performing depth modeling mode (DMM) coding.

According to a first technique, when the prediction unit (PU) associated with a transform tree node is coded with one of the DMM modes (e.g., DMM mode 1 or DMM mode 4), the split_transform_flag of the transform tree node shall be 0. When using the first technique, the transform tree structure used in 3D-HEVC may be kept unchanged, and thus may be the same as that in HEVC. However, the split_transform_flag may, in some examples, be constrained to be 0 for the transform tree node whose associated PU is coded with DMM modes. In further examples, for a transform tree node whose associated PU is coded with DMM modes, the split_transform_flag is not signaled and inferred to be 0.

According to a second technique, when the PU size is greater than the maximum transform block size, the DMM modes do not apply. In other words, an encoder may not be allowed to use the DMM modes when the PU size is greater than the maximum transform block size. When using the second technique, the intra mode extension syntax table may, in some examples, not be changed but the flag dim_not_present_flag (indicating whether DMM modes are used) may be constrained to be 1 for a PU whose size is greater than the maximum transform block size. In other examples, when using the second technique, the dim_not_present_flag (indicating whether DMM modes are used) is not signaled for PU whose size is greater than the maximum transform block size and is inferred to be 1 by a decoder.

According to a third technique, when the PU size of a PU is greater than the maximum transform block size and the residual of the PU is not coded with SDC (i.e., a transform tree shall be coded for the PU), then the DMM modes do not apply. In other words, an encoder may not be allowed to use the DMM modes when a transform tree is used to code the residual of a PU and the size of the PU is greater than the maximum transform block size. When using the third technique, the intra mode extension syntax table may, in some examples, not be changed but the flag dim_not_present_flag (indicating whether DMM modes are used) may be constrained to be 1 for a PU if the residuals of the PU are not coded with SDC and the size of the PU is greater than the maximum transform block size. In other examples, when using the second technique, the dim_not_present_flag (indicating whether DMM modes are used) is not signaled for PU if the residuals of the PU are not coded with SDC and the size of the PU is greater than the maximum transform block size. In such examples, the dim_not_present_flag may be inferred to be 1 by a decoder.

According to a fourth technique, when a PU is coded with one of the DMM modes, instead of predicting and reconstructing TUs within the PU one by one in decoding order, the entire PU is predicted using the same way as 3D-HEVC does before reconstructing any TU within it. Afterwards, the reconstruction samples of the PU are derived by adding residual represented by the associated transform tree node of the PU to prediction samples of the PU.

An example implementation of the first and second techniques will now be described. The example implementation may be implemented on top of the working draft of 3D-HEVC.

The syntax or semantics change of the working draft are indicated as follows. The newly added parts are italicized.

In a first embodiment, the syntax of 3D-HEVC is not changed. The split_transform_flag is constrained to be 0 for a transform tree node whose associated PU is coded with DMM modes, and the dim_not_present_flag is constrained to be 0 for a PU that has a size which is greater than the maximum transform block size. Example semantics for the first embodiment are provided below:

7.4.9.8 Transform Tree Semantics split_transform_flag[ x0 ][ y0 ][ trafoDepth ] specifies whether a block is split into four blocks with half horizontal and half vertical size for the purpose of transform coding. The array indices x0, y0 specify the location (x0, y0) of the top-left luma sample of the considered block relative to the top-left luma sample of the picture. The array index trafoDepth specifies the current subdivision level of a coding block into blocks for the purpose of transform coding. trafoDepth is equal to 0 for blocks that correspond to coding blocks.

When dim_not_present_flag[ x0 ][ y0 ] is equal to 0, the value of split_transform_flag[ x0 ][ y0 ][ trafoDepth ] is constrained as follows:

When PartMode is equal to PART_2N×2N, the value of split_transform_flag[ x0 ][ y0 ][ 0 ] shall be equal to 0.

When PartMode is equal to PART_N×N, the value of split_transform_flag[x0][y0][1], when present, shall be equal to 0.

The variable interSplitFlag is derived as follows:

If max_transform_hierarchy_depth_inter is equal to 0 and CuPredMode[x0][y0] is equal to MODE_INTER and PartMode is not equal to PART_2N×2N and trafoDepth is equal to 0, interSplitFlag is set equal to 1.

Otherwise, interSplitFlag is set equal to 0.

When split_transform_flag[x0][y0][trafoDepth] is not present, it is inferred as follows:

If one or more of the following conditions are true, the value of split_transform_flag[x0][y0][trafoDepth] is inferred to be equal to 1:

log 2TrafoSize is greater than Log 2MaxTrafoSize

IntraSplitFlag is equal to 1 and trafoDepth is equal to 0 interSplitFlag is equal to 1

Otherwise, the value of split_transform_flag[x0][y0][trafoDepth] is inferred to be equal to 0.

. . . .

1.7.4.9.5.1 Intra Mode Extension Semantics

The variable Log 2MaxDmmCbSize is set equal to 5.

dim_not_present_flag[x0][y0] equal to 1 specifies that the depth_intra_mode_flag syntax element is not present and that intra modes with intraPredMode in the range of 0 to 34 is used for the current prediction unit. dim_not_present_flag[x0][y0] equal to 0 specifies that that the depth_intra_mode_flag syntax element might be present. When not present, the value of dim_not_present_flag[x0][y0] is inferred to be equal to 1.

When log 2CbSize is greater than Log 2MaxTrafoSize, the value of dim_not_present_flag[x0][y0] shall be equal to 1.

The variable DmmFlag[x0][y0] is derived as specified in the following:

DmmFlag[x0][y0]=!dim_not_present_flag[x0][y0] I-29)

. . . .

In above-described embodiment, both the split_transform_flag constraint and the dim_not_present_flag constraint may be implemented by an ecoder and/or a decoder. However, in other examples, one of the constraints may be implemented by an ecoder and/or a decoder, but not the other constraint. For example, the split_transform_flag constraint may be implemented by an ecoder and/or a decoder, but not the dim_not_present_flag constraint. As another example, the dim_not_present_flag constraint may be implemented by an ecoder and/or a decoder, but not the split_transform_flag constraint.

In a second embodiment, the dim_not_present_flag is constrained to be 0 for cases where both the size of the PU is greater than the maximum transform block size and the SDC flag that corresponds to the PU is equal to 0. In some examples, the dim_not_present_flag constraint of this embodiment may be used with the split_transform_flag constraint of the first embodiment. Example semantics for the second embodiment are provided below:

1.7.4.9.5.1 Intra Mode Extension Semantics

The variable Log 2MaxDmmCbSize is set equal to 5.

dim_not_present_flag[x0][y0] equal to 1 specifies that the depth_intra_mode_flag syntax element is not present and that intra modes with intraPredMode in the range of 0 to 34 is used for the current prediction unit. dim_not_present_flag[x0][y0] equal to 0 specifies that that the depth_intra_mode_flag syntax element might be present. When not present, the value of dim_not_present_flag[x0][y0] is inferred to be equal to 1.

When log 2CbSize is greater than Log 2MaxTrafoSize and sdc_flag[x0][y0] is equal to 0, the value of dim_not_present_flag[x0][y0] shall be equal to 1.

The variable DmmFlag[x0][y0] is derived as specified in the following:

DmmFlag[x0][y0]=!dim_not_present_flag[x0][y0] (I-29)

. . . .

In a third embodiment, the split_transform_flag is not signaled for a transform tree node whose associated PU is coded with DMM modes. When the split_transform_flag is not signaled, the split_transform_flag is inferred to be 0. Also in the third embodiment, the dim_not_present_flag[x0][y0] is not signaled for PU that has a size which is greater than the maximum transform block size. When the dim_not_present_flag is not signaled, the flag is inferred to be 1. Example syntax for the third embodiment is provided below:

7.3.8.8 Transform Tree Syntax

| | Descriptor |
|---|---|
| transform_tree( x0, y0, xBase, yBase, log2TrafoSize, trafoDepth, blkIdx ) { | |
|   if( log2TrafoSize <= Log2MaxTrafoSize && | |
|     log2TrafoSize > Log2MinTrafoSize && | |
|     trafoDepth < MaxTrafoDepth && !( IntraSplitFlag && ( trafoDepth = = 0 ) ) && | |
|     !( ( !dim_not_present_flag[ x0 ][ y0 ] && ( PartMode = = PART_2Nx2N ) ) \|\| | |
|       ( !dim_not_present_flag[ x0 ][ y0 ] && ( PartMode = = PART_NxN ) && | |
|       ( trafoDepth > 0 ) ) ) ) | |
|     split_transform_flag[ x0 ][ y0 ][ trafoDepth ] | ae(v) |
|   if( log2TrafoSize > 2 ) { | |
|     if( trafoDepth = = 0 \|\| cbf_cb[ xBase ][ yBase ][ trafoDepth − 1 ] ) | |
|       cbf_cb[ x0 ][ y0 ][ trafoDepth ] | ae(v) |
|     if( trafoDepth = = 0 \|\| cbf_cr[ xBase ][ yBase ][ trafoDepth − 1 ] ) | |
|       cbf_cr[ x0 ][ y0 ][ trafoDepth ] | ae(v) |
|   } | |
|   if( split_transform_flag[ x0 ][ y0 ][ trafoDepth ] ) { | |
|     x1 = x0 + ( 1 << ( log2TrafoSize − 1 ) ) | |
|     y1 = y0 + ( 1 << ( log2TrafoSize − 1 ) ) | |
|     transform_tree( x0, y0, x0, y0, log2TrafoSize − 1, trafoDepth + 1, 0 ) | |
|     transform_tree( x1, y0, x0, y0, log2TrafoSize − 1, trafoDepth + 1, 1 ) | |
|     transform_tree( x0, y1, x0, y0, log2TrafoSize − 1, trafoDepth + 1, 2 ) | |
|     transform_tree( x1, y1, x0, y0, log2TrafoSize − 1, trafoDepth + 1, 3 ) | |
|   } else { | |

| | Descriptor |
|---|---|
| if( CuPredMode[ x0 ][ y0 ] = = MODE_INTRA | | trafoDepth != 0 | |<br>    cbf_cb[ x0 ][ y0 ][ trafoDepth ] | | cbf_cr[ x0 ][ y0 ][ trafoDepth ] )<br>  cbf_luma[ x0 ][ y0 ][ trafoDepth ]<br>  transform_unit( x0, y0, xBase, yBase, log2TrafoSize, trafoDepth, blkIdx )<br>  }<br>} | ae(v) |

1.7.3.8.5.1 Intra Mode Extension Syntax

| | Descriptor |
|---|---|
| intra_mode_ext( x0 , y0 , log2CbSize ) {<br>  if( log2CbSize < 6 && *log2CbSize < =*<br>    *Log2MaxTrafoSize* )<br>    dim_not_present_flag[ x0 ][ y0 ]<br>  if ( !dim_not_present_flag[ x0 ][ y0 ] )<br>    depth_intra_mode_flag[ x0 ][ y0 ]<br>  if( DepthIntraMode[ x0 ][ y0 ] = =<br>    INTRA_DEP_DMM_WFULL )<br>    wedge_full_tab_idx[ x0 ][ y0 ]<br>} | <br><br><br>ae(v)<br><br>ae(v)<br><br><br>ae(v) |

In above-described embodiment, both the split_transform_flag signalling conditions and the dim_not_present_flag signalling conditions may be implemented by an ecoder and/or a decoder. However, in other examples, one of the signalling conditions may be implemented by an ecoder and/or a decoder, but not the other signalling condition. For example, the split_transform_flag signalling condition may be implemented by an ecoder and/or a decoder, but not the dim_not_present_flag signalling condition. As another example, the dim_not_present_flag signalling condition may be implemented by an ecoder and/or a decoder, but not the split_transform_flag signalling condition.

In a fourth embodiment, the dim_not_present_flag[x0][y0] is not signaled for cases where both the size of the PU is greater than the maximum transform block size and the SDC flag that corresponds to the PU is equal to 0. When the dim_not_present_flag is not signaled, the flag is inferred to be 1. In some examples, the dim_not_present_flag signaling condition of this embodiment may be used with the split_transform_flag signaling condition of the third embodiment. Example syntax for the fourth embodiment is provided below:

1.7.3.8.5.1 Intra Mode Extension Syntax

| | Descriptor |
|---|---|
| intra_mode_ext( x0 , y0 , log2CbSize ) {<br>  if( log2CbSize < 6 && *!( log2CbSize > Log2MaxTrafoSize*<br>    *&& ! sdc_flag[ x0 ][ y0 ]* ) )<br>    dim_not_present_flag[ x0 ][ y0 ]<br>  if ( !dim_not_present_flag[ x0 ][ y0 ] )<br>    depth_intra_mode_flag[ x0 ][ y0 ]<br>  if( DepthIntraMode[ x0 ][ y0 ] = =<br>    INTRA_DEP_DMM_WFULL )<br>    wedge_full_tab_idx[ x0 ][ y0 ]<br>} | <br><br><br>ae(v)<br><br>ae(v)<br><br><br>ae(v) |

Figure 11:
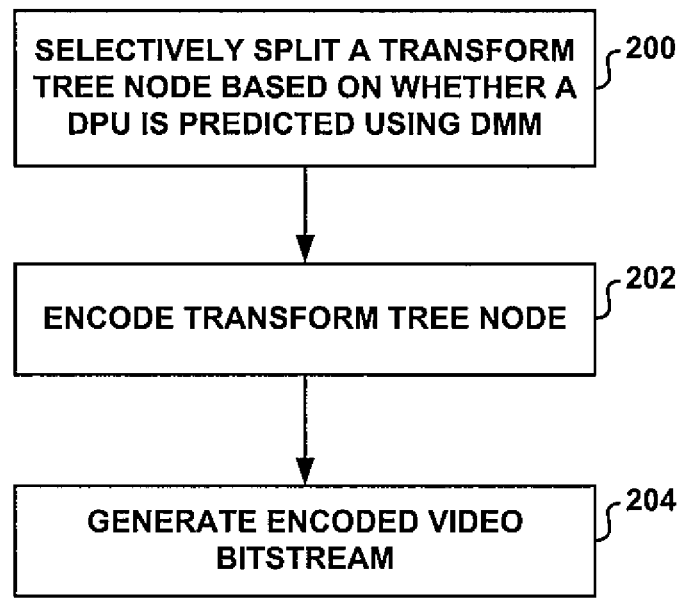
FIG. 11 is a flow diagram illustrating an example technique for performing constrained video encoding according to this disclosure.

FIG. 11 is a flow diagram illustrating an example technique for performing constrained video encoding according to this disclosure. As shown in FIG. 11, video encoder 20 selectively splits or not splits a transform tree node into a plurality of sub-transform tree nodes based at least in part on whether a depth prediction unit (DPU) that corresponds to the transform tree node is predicted according to a depth modeling mode (DMM) (200). A coding unit (CU) may comprise both the DPU that corresponds to the transform tree node and the transform tree node. That is, it should be understood that the transform tree node is generally included in the same CU as the DPU, and not to a different CU (such as, for example, a texture CU). Thus, a DPU may be said to correspond to a transform tree node when the DPU and the transform tree node are included in and/or derived from the same CU (e.g., a depth CU).

Video encoder 20 encodes the transform tree node based on whether the transform tree node is split into the plurality of sub-transform tree nodes (202). In some examples, to encode the transform tree node, video encoder 20 may encode a transform unit corresponding to the transform tree node if the transform tree node is not split into the plurality of sub-transform tree nodes. In such examples, video encoder 20 may not encode the transform unit corresponding to the transform tree node if the transform tree node is split into the plurality of sub-transform tree nodes, and encode transform units corresponding to respective leaf nodes of a transform tree structure that includes the transform tree node if the transform tree node is split into the plurality of sub-transform tree nodes. Video encoder 20 generates the encoded video bitstream such that the encoded video bitstream includes the coded transform tree node (204).

A DMM mode may refer to a prediction mode where a depth prediction unit is partitioned into two sub-regions, and for each of the sub-regions, all of the samples (e.g., pixels) in the respective sub-region are predicted with the same predictor value. In other words, when predicting according to a DMM mode, the predicted values for all samples (e.g., pixels) within the same DMM-partitioned sub-region of the depth prediction unit may be equal to each other. However, the predicted values for samples in different sub-regions may be different from each other. In some examples, the DMM mode may correspond to one or both of a wedgelet partitioning DMM mode and a contour partitioning DMM mode.

A depth prediction unit may refer to a video block that is predicted according to the same intra-prediction mode. The samples of a depth prediction unit may correspond to depth values of a depth map and/or values indicative of depth values of a depth map.

In some examples, to selectively split or not split the transform tree node, video encoder 20 may determine whether the depth prediction unit that corresponds to the transform tree node is predicted according to the DMM, and not split the transform tree node into a plurality of sub-transform tree nodes in response to determining that the depth prediction unit is predicted according to the DMM. In such examples, in response to determining that the depth prediction unit is not predicted according to the DMM, video encoder 20 may, in some examples, split the transform tree node into a plurality of sub-transform tree nodes, or use other techniques to determine whether to split the transform tree node into a plurality of sub-transform tree nodes.

In some examples, to generate the encoded video bitstream comprises, video encoder 20 may select a value of a syntax element for the transform tree node based on whether the depth prediction unit that corresponds to the transform tree node is predicted according to the DMM, and generate the encoded video bitstream such that the encoded video bitstream signals the value of the syntax element. The value of the syntax element may indicate whether the transform tree node is to be split into the plurality of sub-transform tree nodes. In some examples, the encoded video bitstream may be a 3D-HEVC encoded video bitstream, and the syntax element may be a split_transform_flag syntax element.

In some examples, to select the value of the syntax element, video encoder 20 may select a value that indicates that the transform tree node is not to be split into the plurality of sub-transform tree nodes when the depth prediction unit that corresponds to the transform tree node is predicted according to the DMM. In such examples, when the depth prediction unit that corresponds to the transform tree node is not predicted according to the DMM, video encoder 20 may, in some examples, select a value that indicates that the transform tree node is to be split into the plurality of sub-transform tree nodes, and/or select a value based on another technique.

In some examples, to generate the encoded video bitstream comprises, video encoder 20 may generate the encoded video bitstream such that the encoded video bitstream includes the syntax element. In further examples, to generate the encoded video bitstream, video encoder 20 may generate the encoded video bitstream such that the encoded video bitstream does not include the syntax element when the depth prediction unit that corresponds to the transform tree node is predicted according to the DMM. In such examples, video encoder 20 may, in some examples, generate the encoded video bitstream such that the encoded video bitstream does include the syntax element when the depth prediction unit that corresponds to the transform tree node is not predicted according to the DMM.

In some examples, the encoded video bitstream may satisfy a constraint that specifies that the syntax element must indicate that the transform tree node is not to be split into a plurality of sub-transform tree nodes when the depth prediction unit that corresponds to the transform tree node is predicted according to the DMM. In this way, having different sizes of transform units associated with a single depth prediction unit may be avoided when predicting depth prediction units according to a DMM prediction mode.

Figure 12:
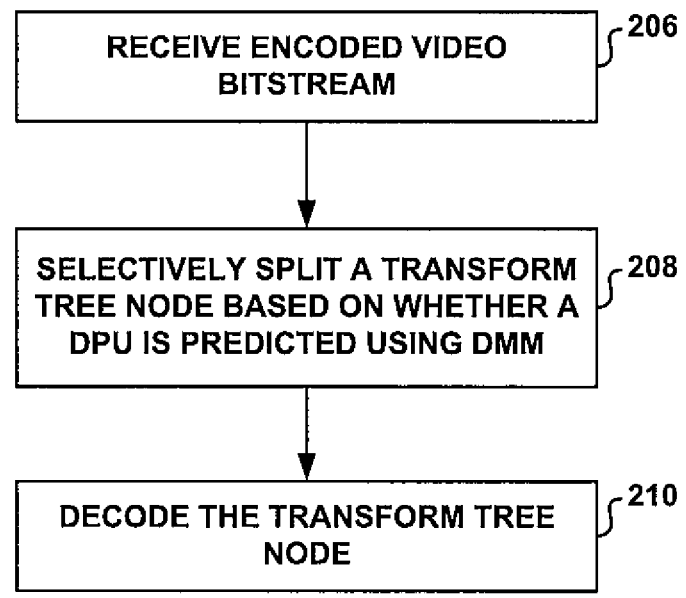
FIG. 12 is a flow diagram illustrating an example technique for performing constrained video decoding according to this disclosure.

FIG. 12 is a flow diagram illustrating an example technique for performing constrained video decoding according to this disclosure. As shown in FIG. 12, video decoder 30 receives an encoded video bitstream (206). Video decoder 30 selectively splits or not splits a transform tree node that is represented by the encoded video bitstream into a plurality of sub-transform tree nodes based at least in part on whether a depth prediction unit (DPU) that corresponds to the transform tree node is predicted according to a depth modeling mode (DMM) (208). Video decoder 30 decodes the transform tree node based at least in part on whether the transform tree node is split into the plurality of sub-transform tree nodes (210).

In some examples, to selectively split or not split the transform tree node, video decoder 30 may determine a value of a syntax element for the transform tree node based on the encoded video bitstream, selectively split or not split the transform tree node into the plurality of sub-transform tree nodes based on the value of the syntax element. The value of the syntax element may indicate whether the transform tree node is to be split into the plurality of sub-transform tree nodes. The value of the syntax element may be set based on whether the depth prediction unit that corresponds to the transform tree node is predicted according to the DMM. In some examples, the value of the syntax element may be determined by an encoder based on whether the depth prediction unit that corresponds to the transform tree node is predicted according to the DMM.

In such examples, video decoder 30 may, in some examples, split the transform tree node into the plurality of sub-transform tree if the value of the syntax element is equal to a first value, and not split the transform tree node into the plurality of sub-transform tree if the value of the syntax element is equal to a second value different than the first value. In some examples, the encoded video bitstream may be a 3D-HEVC encoded video bitstream, and the syntax element is a split_transform_flag syntax element.

In further examples, to determine the value of the syntax element, video decoder 30 may obtain a coded version of the syntax element from the encoded video bitstream. In such examples, video decoder 30 may decode the coded version of the syntax element to obtain the value of the syntax element.

In additional examples, the syntax element may be a second syntax element. In such examples, to determine the value of the syntax element, video decoder 30 may decode a first syntax element from the encoded video bitstream to obtain a value for the first syntax element. The value of the first syntax element may indicate whether the depth prediction unit is predicted according to the DMM. In such examples, video decoder 30 may determine whether to set the value of the second syntax element equal to an inferred value without obtaining and decoding the second syntax element from the encoded video bitstream based on the value of the first syntax element, and set the value of the second syntax element equal to the inferred value in response to determining that the value of the first syntax element indicates that the depth prediction unit is predicted according to the DMM. The inferred value may indicate that the transform tree node is not to be split into the plurality of sub-transform tree nodes. In some examples, the encoded video bitstream may be a 3D-HEVC encoded video bitstream, the first syntax element is a dim_not_present_flag syntax element, and the second syntax element is a split_transform_flag syntax element.

In some examples, the encoded video bitstream may satisfy a constraint that specifies that the syntax element must indicate that the transform tree node is not to be split into the plurality of sub-transform tree nodes when the depth prediction unit that corresponds to the transform tree node is predicted according to the DMM. In this way, having different sizes of transform units associated with a single depth prediction unit may be avoided when predicting depth prediction units according to a DMM prediction mode.

In some examples, to selectively split or not split the transform tree node, video decoder 30 may not split the transform tree node into the plurality of sub-transform tree nodes when the depth prediction unit is predicted according to the DMM. In such examples, video decoder 30 may, in some examples, split the transform tree node into the plurality of sub-transform tree nodes when the depth prediction unit is not predicted according to the DMM, or use some other technique to determine whether to split the transform tree node.

In some examples, to decode the transform tree node, video decoder 30 may decode a transform unit corresponding to the transform tree node if the transform tree node is not split into the plurality of sub-transform tree nodes. In such examples, video decoder 30 may not decode the transform unit corresponding to the transform tree node if the transform tree node is split into the plurality of sub-transform tree nodes, and decode transform units corresponding to respective leaf nodes of a transform tree structure that includes the transform tree node if the transform tree node is split into the plurality of sub-transform tree nodes.

Figure 13:
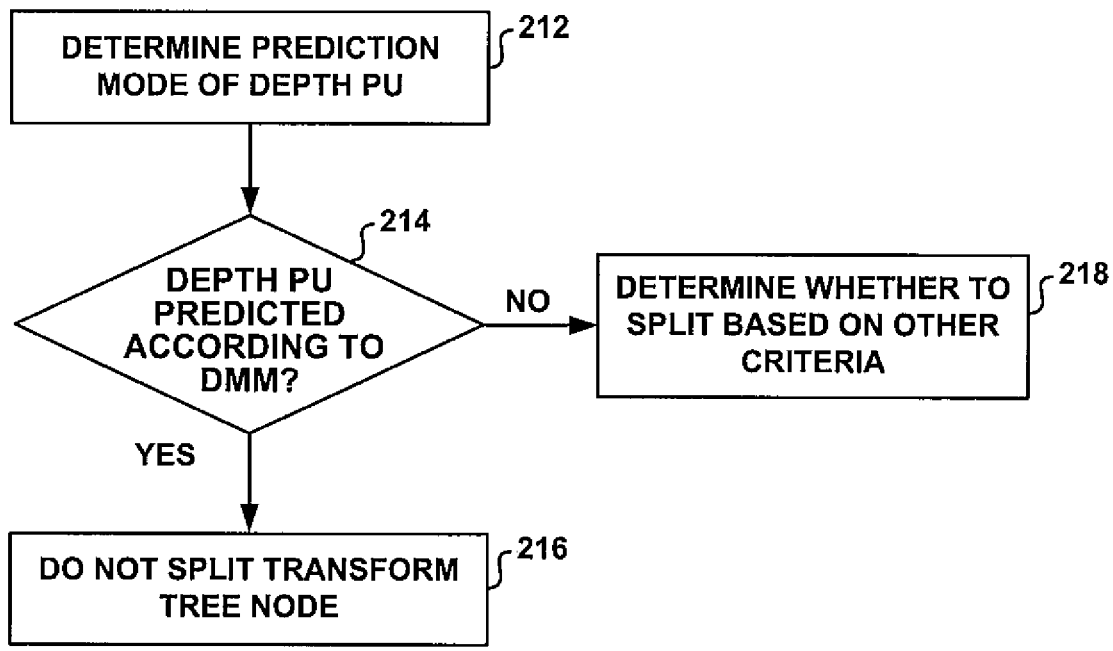
FIG. 13 is a flow diagram illustrating an example technique for performing constrained video encoding according to this disclosure.

FIG. 13 is a flow diagram illustrating an example technique for performing constrained video encoding according to this disclosure. In some examples, the technique shown in FIG. 13 may be used to implement process boxes 202 and/or 204 shown in FIG. 11.

As shown in FIG. 13, video encoder 20 determines a prediction mode of a depth prediction unit (PU) that corresponds to a transform tree node (212). Video encoder 20 determines whether the depth PU is predicted according to the DMM (214). In response to determining that the depth PU is predicted according to the DMM, video encoder 20 does not split the transform tree node into a plurality of sub-transform tree nodes (216). In response to determining that the depth PU is not predicted according to the DMM, video encoder 20 determines whether to split the transform tree node into a plurality of sub-transform tree nodes based on other criteria in addition to whether the depth PU is predicted according to the DMM (218).

In some examples, the other criteria may allow the transform tree node to be split into a plurality of sub-transform tree nodes in at least some circumstances. In further examples, in response to determining that the depth PU is not predicted according to the DMM, video encoder 20 may determine to split the transform tree node into a plurality of sub-transform tree nodes.

Figure 14:
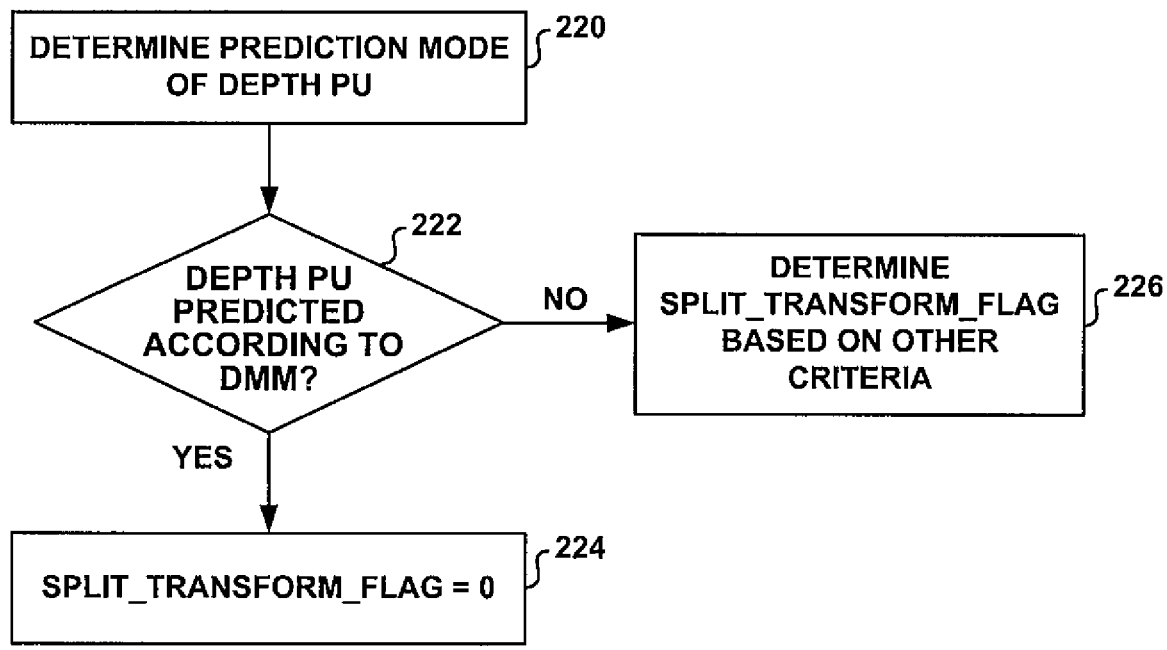
FIG. 14 is a flow diagram illustrating an example technique for performing constrained video encoding according to this disclosure.

FIG. 14 is a flow diagram illustrating an example technique for performing constrained video encoding according to this disclosure. In some examples, the technique shown in FIG. 14 may be used to implement process boxes 202 and/or 204 shown in FIG. 11.

As shown in FIG. 13, video encoder 20 determines a prediction mode of a depth prediction unit (PU) that corresponds to a transform tree node (220). Video encoder 20 determines whether the depth PU is predicted according to the DMM (222). In response to determining that the depth PU is predicted according to the DMM, video encoder 20 sets the split_transform_flag equal to 0 to indicate that the transform tree node is not to be split into a plurality of sub-transform tree nodes (224). In response to determining that the depth PU is not predicted according to the DMM, video encoder 20 determines the value of the split_transform_flag based on other criteria in addition to whether the depth PU is predicted according to the DMM (226).

In some examples, the other criteria may allow the value of the split_transform_flag to be equal to 1 in at least some circumstances. In further examples, in response to determining that the depth PU is not predicted according to the DMM, video encoder 20 may set the value of the split_transform_flag equal to 1 to indicate that the transform tree node is to be split into a plurality of sub-transform tree nodes.

Figure 15:
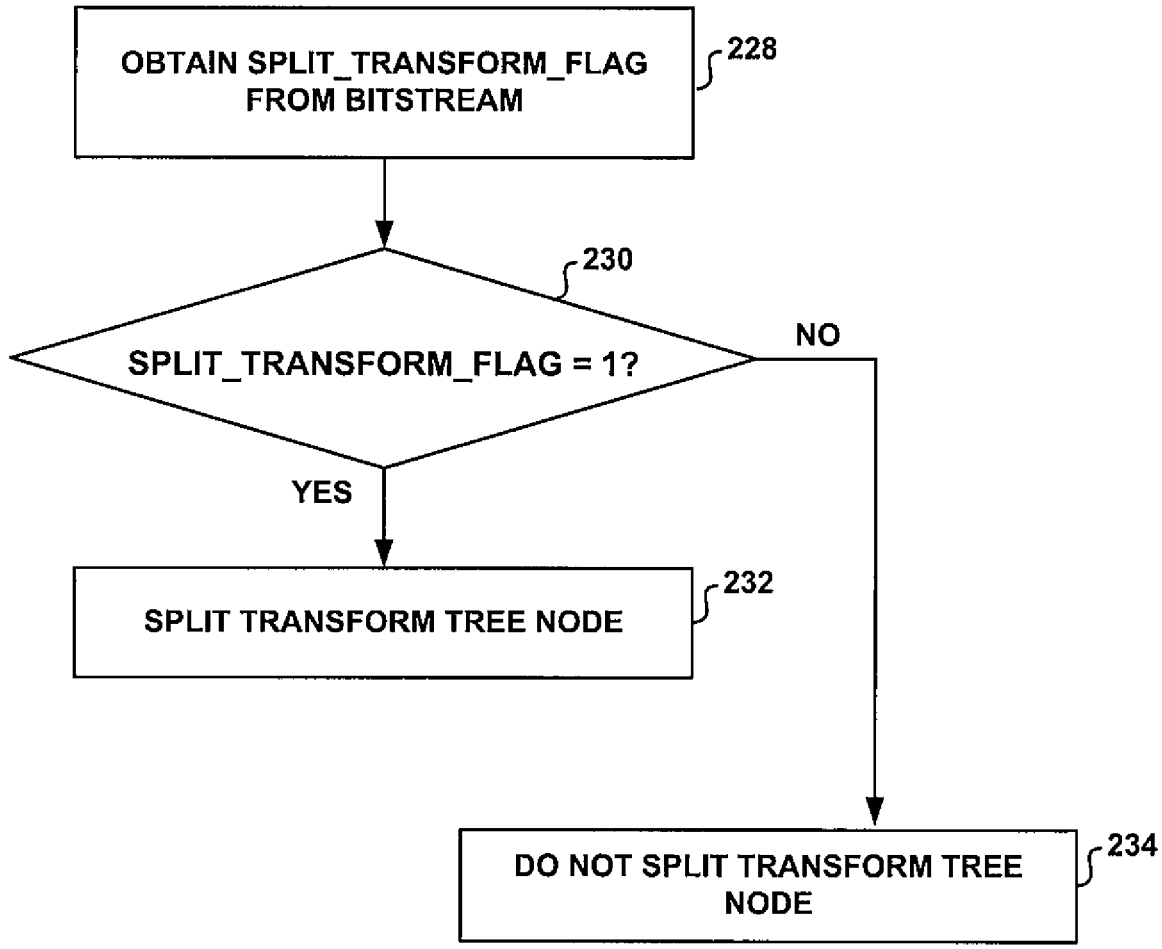
FIG. 15 is a flow diagram illustrating an example technique for performing constrained video decoding according to this disclosure.

FIG. 15 is a flow diagram illustrating an example technique for performing constrained video decoding according to this disclosure. In some examples, the technique shown in FIG. 15 may be used to implement process boxes 208 and/or 210 shown in FIG. 12.

As shown in FIG. 15, video decoder 30 obtains a split_transform_flag from an encoded video bitstream (228). The split_transform_flag may correspond to a transform tree node. The value for the split_transform_flag may be selected by a video encoder based on whether the whether a depth PU that corresponds to the transform tree node is predicted according to the DMM.

Video decoder 30 determines whether the split_transform_flag equals one (230). In other words, video decoder 30 determines whether a value of the split_transform_flag indicates that the transform tree node corresponding to the split_transform_flag is to be split into a plurality of sub-transform tree nodes.

In response to determining that the split_transform_flag equals one, video decoder 30 splits the transform tree node corresponding to the split_transform_flag into a plurality of sub-transform tree nodes (232). In response to determining that that the split_transform_flag is not equal to one, video decoder 30 does not split the transform tree node corresponding to the split_transform_flag into a plurality of sub-transform tree nodes (234).

Again, the value for the split_transform_flag may be selected by a video encoder based on whether the whether a depth PU that corresponds to the transform tree node is predicted according to the DMM. Therefore, by using the technique shown in FIG. 15 as one example, video decoder 30 may selectively split or not split a transform tree node that is represented by the encoded video bitstream into a plurality of sub-transform tree nodes based on whether a depth prediction unit that corresponds to the transform tree node is predicted according to a DMM.

Figure 16:
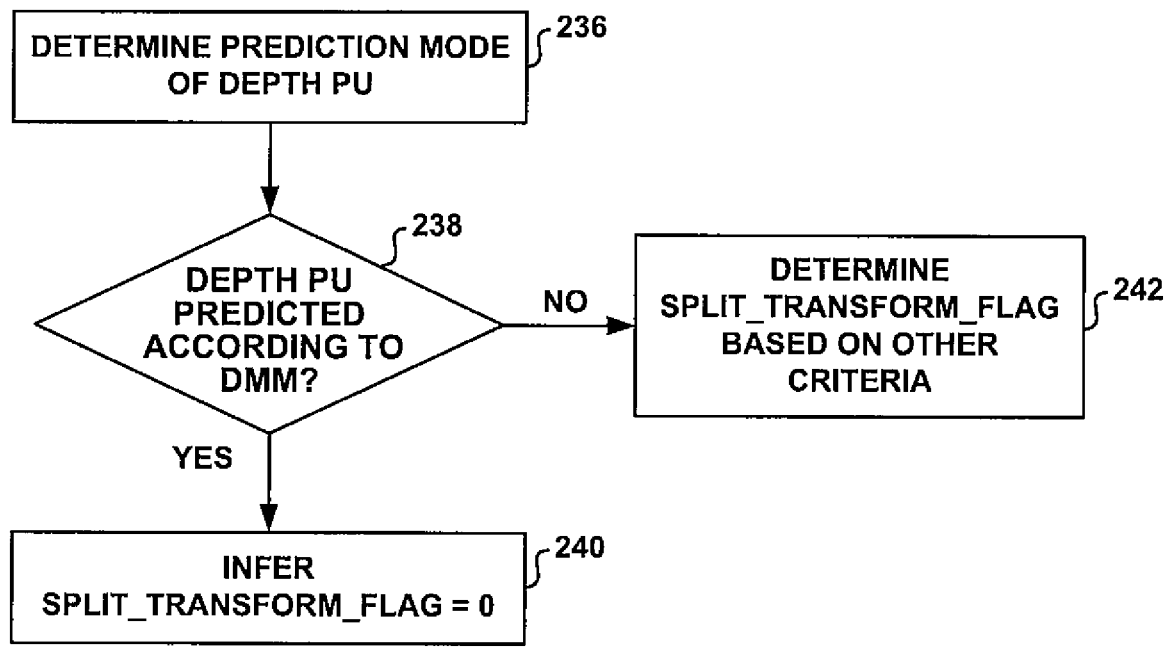
FIG. 16 is a flow diagram illustrating another example technique for performing constrained video decoding according to this disclosure.

FIG. 16 is a flow diagram illustrating another example technique for performing constrained video decoding according to this disclosure. In some examples, the technique shown in FIG. 16 may be used to implement process boxes 208 and/or 210 shown in FIG. 12.

As shown in FIG. 16, video decoder 30 determines a prediction mode of a depth prediction unit (PU) that corresponds to a transform tree node (236). For example, video decoder 30 may decode a syntax element from the encoded video bitstream to obtain a value for the syntax element where the value of the first syntax element indicates whether the depth prediction unit is predicted according to the DMM. In some examples, the syntax element may be a dim_not_present_flag syntax element.

Video decoder 30 determines whether the depth PU is predicted according to the DMM (238). In response to determining that the depth PU is predicted according to the DMM, video decoder 30 infers that the split_transform_flag is equal to zero without obtaining and decoding the split_transform_flag from the encoded video bitstream (240). Alternatively, video decoder 30 may infer that the transform unit corresponding to the depth PU is not split, without actually inferring a value for split_transform_flag. A split_transform_flag value of zero indicates that the transform tree node is not to be split into a plurality of sub-transform tree nodes. In response to determining that the depth PU is not predicted according to the DMM, video decoder 30 determines the value of the split_transform_flag based on other criteria in addition to whether the depth PU is predicted according to the DMM (242). In some examples, when the depth PU is not predicted according to the DMM, video decoder 30 may parse and decode the split_transform_flag from the encoded video bitstream to determine the value of the split_transform_flag.

Again, the value for the split_transform_flag may be selected by a video encoder based on whether the whether a depth PU that corresponds to the transform tree node is predicted according to the DMM. Therefore, by using the technique shown in FIG. 16 to infer/obtain the value of the split_transform_flag as one example, video decoder 30 may selectively split or not split a transform tree node that is represented by the encoded video bitstream into a plurality of sub-transform tree nodes based on whether a depth prediction unit that corresponds to the transform tree node is predicted according to a DMM.

Figure 17:
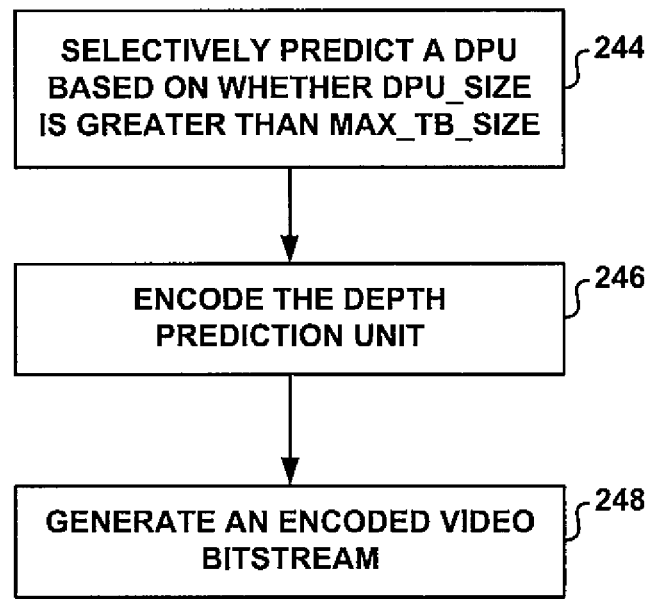
FIG. 17 is a flow diagram illustrating an example technique for performing constrained video encoding according to this disclosure.

FIG. 17 is a flow diagram illustrating an example technique for performing constrained video encoding according to this disclosure. As shown in FIG. 17, video encoder 20 selectively predicts a depth prediction unit (DPU) according to a depth modeling mode (DMM) prediction mode or a non-DMM prediction mode based at least in part on whether a size of the depth prediction unit (DPU_SIZE) is greater than a maximum transform block size (MAX_TB_SIZE) specified for the depth prediction unit (244). Video encoder 20 encodes the depth prediction unit based at least in part on the predicted depth prediction unit (246). Video encoder 20 generates the encoded video bitstream such that the encoded video bitstream includes the coded depth prediction unit (248).

In some examples, to selectively predict the depth prediction unit, video encoder 20 may determine whether the size of the depth prediction unit is greater than the maximum transform block size specified for the depth prediction unit, and predict the depth prediction unit according to a non-DMM prediction mode in response to determining that the size of the depth prediction unit is greater than the maximum transform block size specified for the depth prediction unit. In such examples, in response to determining that the size of the depth prediction unit is not greater than the maximum transform block size specified for the depth prediction unit, video encoder 20 may predict the depth prediction unit according to a DMM prediction mode and/or use another technique for determining whether to use a DMM prediction mode.

In further examples, to selectively predict the depth prediction unit, video encoder 20 may also determine whether the residuals of the depth prediction unit are coded according to the SDC mode. In other words, video encoder 20 may determine whether a transform tree structure is used to code residuals of the depth prediction unit. In such examples, video encoder 20 may selectively predict a depth prediction unit according to the DMM prediction mode or the non-DMM prediction mode based at least in part on whether a size of the depth prediction unit is greater than a maximum transform block size specified for the depth prediction unit and whether the residuals of the depth prediction unit are coded according to the SDC mode.

For example, video encoder 20 may predict the depth prediction unit according to a non-DMM prediction mode in response to determining that the size of the depth prediction unit is greater than the maximum transform block size specified for the depth prediction unit and that the residuals of the depth prediction unit are not coded according to the SDC mode. In such examples, in response to determining that the size of the depth prediction unit is not greater than the maximum transform block size specified for the depth prediction unit or that the residuals of the depth prediction unit are coded according to the SDC mode, video encoder 20 may predict the depth prediction unit according to a DMM prediction mode and/or use another technique for determining whether to use a DMM prediction mode.

In some examples, to generate the encoded video bitstream, video encoder 20 may select a value of a syntax element for the depth prediction unit based on whether the size of the depth prediction unit is greater than the maximum transform block size specified for the depth prediction unit, and generate the encoded video bitstream such that the encoded video bitstream signals the value of the syntax element. The value of the syntax element may indicate whether the depth prediction unit is to be predicted according to the DMM prediction mode. In some examples, the encoded video bitstream is a three-dimensional-High Efficiency Video Coding (32D-HEVC) encoded video bitstream, and the syntax element is a dim_not_present_flag syntax element.

In some examples, to select the value of the syntax element, video encoder 20 may select a value that indicates that the depth prediction unit is not to be predicted according to the DMM prediction mode when the size of the depth prediction unit is greater than the maximum transform block size specified for the depth prediction unit. In such examples, when the size of the depth prediction unit is not greater than the maximum transform block size specified for the depth prediction unit, video encoder 20 may select a value that indicates that the depth prediction unit is to be predicted according to the DMM prediction mode and/or use another technique for selecting a value for the syntax element that allows the depth prediction unit is to be predicted according to the DMM prediction mode in at least some circumstances.

In further examples, video encoder 20 may select a value of a syntax element for the depth prediction unit based at least in part on whether the size of the depth prediction unit is greater than the maximum transform block size specified for the depth prediction unit and whether the residuals of the depth prediction unit are coded according to the SDC mode. In such examples, video encoder 20 may select a value that indicates that the depth prediction unit is not to be predicted according to the DMM prediction mode when the size of the depth prediction unit is greater than the maximum transform block size specified for the depth prediction unit and the residuals of the depth prediction unit are not coded according to the SDC mode. In such examples, when the size of the depth prediction unit is not greater than the maximum transform block size specified for the depth prediction unit or the residuals of the depth prediction unit are coded according to the SDC mode, video encoder 20 may select a value that indicates that the depth prediction unit is to be predicted according to the DMM prediction mode and/or use another technique for selecting a value for the syntax element that allows the depth prediction unit is to be predicted according to the DMM prediction mode in at least some circumstances.

In some examples, to generate the encoded video bitstream, video encoder 20 may generate the encoded video bitstream such that the encoded video bitstream includes the syntax element. In further examples, to generate the encoded video bitstream, video encoder 20 may generate the encoded video bitstream such that the encoded video bitstream does not include the syntax element when the size of the depth prediction unit is greater than the maximum transform block size specified for the depth prediction unit. In such examples, video encoder 20 may generate the encoded video bitstream such that the encoded video bitstream does include the syntax element when the size of the depth prediction unit is not greater than the maximum transform block size specified for the depth prediction unit.

In additional examples, to generate the encoded video bitstream, video encoder 20 may generate the encoded video bitstream such that the encoded video bitstream does not include the syntax element when the size of the depth prediction unit is greater than the maximum transform block size specified for the depth prediction unit and the residuals of the depth prediction unit are not coded according to the SDC mode. In such examples, video encoder 20 may generate the encoded video bitstream such that the encoded video bitstream does include the syntax element when the size of the depth prediction unit is not greater than the maximum transform block size specified for the depth prediction unit or the residuals of the depth prediction unit are coded according to the SDC mode.

In some examples, the encoded video bitstream may satisfy a constraint that specifies that the syntax element must indicate that the depth prediction unit is not to be predicted according to the DMM mode when the size of the depth prediction unit is greater than the maximum transform block size that corresponds to the depth prediction unit. In this way, predicting a depth prediction unit according to a DMM may be avoided when transform units are smaller than the depth prediction unit.

In further examples, the encoded video bitstream may satisfy a constraint that specifies that the syntax element must indicate that the depth prediction unit is not to be predicted according to the DMM mode when both the size of the depth prediction unit is greater than the maximum transform block size that corresponds to the depth prediction unit and the residuals of the depth prediction unit are not coded according to the SDC mode.

In some examples, to encode the depth prediction unit, video encoder 20 may generate one or more residual transform units that correspond to the depth prediction unit based on the predicted depth prediction unit.

Figure 18:
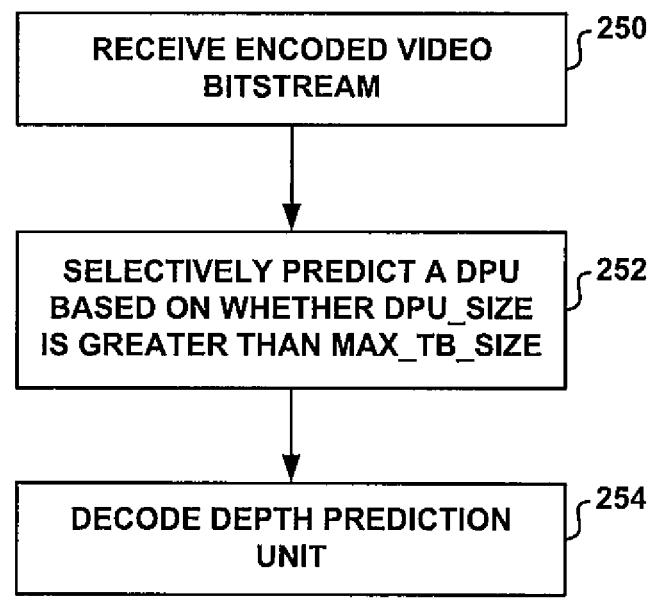
FIG. 18 is a flow diagram illustrating an example technique for performing constrained video decoding according to this disclosure.

FIG. 18 is a flow diagram illustrating an example technique for performing constrained video decoding according to this disclosure. As shown in FIG. 18, video decoder 30 receives an encoded video bitstream (250). Video decoder 30 selectively predicts a depth prediction unit (DPU) according to a depth modeling mode (DMM) prediction mode or a non-DMM prediction mode based on whether a size of the depth prediction unit (DPU_SIZE) is greater than a maximum transform block size (MAX_TB_SIZE) specified for the depth prediction unit (252). Video decoder 30 decodes the depth prediction unit based on the predicted depth prediction unit (254).

In some examples, to selectively predicting the depth prediction unit, video decoder 30 may determine a value of a syntax element for the depth prediction unit based on the encoded video bitstream, and selectively predict the depth prediction unit according to the DMM prediction mode or the non-DMM prediction mode based on the value of the syntax element. The value of the syntax element may indicate whether the depth prediction unit is to be predicted according to the DMM prediction mode.

The value of the syntax element may, in some examples, be set based on whether the size of the depth prediction unit is greater than the maximum transform block size specified for the depth prediction unit. In further examples, the value of the syntax element may be set based on whether the size of the depth prediction unit is greater than the maximum transform block size specified for the depth prediction unit and whether the residuals of the depth prediction unit are coded according to the SDC mode. In some examples, the value of the syntax element may be determined by an encoder based on whether the size of the depth prediction unit is greater than the maximum transform block size specified for the depth prediction unit and/or whether the residuals of the depth prediction unit are coded according to the SDC mode.

In some examples, video decoder 30 may, in some examples, predict the depth prediction unit according to a DMM prediction mode if the value of the syntax element is equal to a first value, and predict the depth prediction unit according to a non-DMM prediction mode. In some examples, the encoded video bitstream may be a 3D-HEVC encoded video bitstream, and the syntax element is a dim_not_present_flag syntax element.

In further examples, to selectively predict the depth prediction unit, video decoder 30 may also determine whether the residuals of the depth prediction unit are coded according to the SDC mode. In other words, video decoder 30 may determine whether a transform tree structure is used to code residuals of the depth prediction unit. In such examples, video decoder 30 may selectively predict the depth prediction unit according to the DMM prediction mode or the non-DMM prediction mode based at least in part on whether a size of the depth prediction unit is greater than a maximum transform block size specified for the depth prediction unit and whether residuals of the depth prediction unit are coded according to the SDC coding mode.

For example, video decoder 30 may predict the depth prediction unit according to a non-DMM prediction mode when the size of the depth prediction unit is greater than the maximum transform block size that corresponds to the depth prediction unit and the residuals of the depth prediction unit are not coded according to the SDC mode. In such examples, in response to determining that the size of the depth prediction unit is not greater than the maximum transform block size specified for the depth prediction unit or that the residuals of the depth prediction unit are coded according to the SDC mode, video decoder 30 may predict the depth prediction unit according to a DMM prediction mode and/or use another technique for determining whether to use a DMM prediction mode.

In some examples, the encoded video bitstream may satisfy a constraint that specifies that the syntax element must indicate that the depth prediction unit is not to be predicted according to the DMM mode when the size of the depth prediction unit is greater than the maximum transform block size that corresponds to the depth prediction unit. In this way, predicting a depth prediction unit according to a DMM may be avoided when transform units are smaller than the depth prediction unit.

In further examples, the encoded video bitstream may satisfy a constraint that specifies that the syntax element must indicate that the depth prediction unit is not to be predicted according to the DMM mode when the size of the depth prediction unit is greater than the maximum transform block size that corresponds to the depth prediction unit and when the residuals of the depth prediction unit are not coded according to the SDC mode.

In some examples, to determine the value of the syntax element, video decoder 30 may obtain a coded version of the syntax element from the encoded video bitstream. In such examples, video decoder 30 may decode the coded version of the syntax element to obtain the value of the syntax element.

In further examples, to determine the value of the syntax element, video decoder 30 may determine a size of a depth prediction unit and a maximum transform block size that corresponds to the depth prediction unit based on the encoded video bitstream, determine whether to set the value of the syntax element equal to an inferred value without obtaining and decoding the syntax element from the encoded video bitstream based on whether the size of the depth prediction unit is greater than the maximum transform block size that corresponds to the depth prediction unit, and set the value of the syntax element equal to the inferred value in response to determining that the size of the depth prediction unit is greater than the maximum transform block size that corresponds to the depth prediction unit. The inferred value may indicate that the depth prediction unit is not to be predicted according to the DMM prediction mode. In some examples, video decoder 30 may determine the size of a depth prediction unit and the maximum transform block size based on one or more syntax elements in the encoded video bitstream.

In some examples, video decoder 30 may also whether the residuals of the depth prediction unit are coded according to the SDC mode. In such examples, video decoder 30 may determining whether to set the value of the syntax element equal to an inferred value without obtaining and decoding the syntax element from the encoded video bitstream based at least in part on whether the size of the depth prediction unit is greater than the maximum transform block size that corresponds to the depth prediction unit and whether the residuals of the depth prediction unit are coded according to the SDC mode, and set the value of the syntax element equal to the inferred value in response to determining that the size of the depth prediction unit is greater than the maximum transform block size that corresponds to the depth prediction unit and determining that the residuals of the depth prediction unit are not coded according to the SDC mode. In such examples, when the size of the depth prediction unit is not greater than the maximum transform block size that corresponds to the depth prediction unit or the residuals of the depth prediction unit are coded according to the SDC mode, the video decoder 30 may not infer the value of the syntax element, obtain the value of the syntax element from the bitstream, and/or determine whether to infer the value of the syntax element based on other criteria.

In some examples, to selectively predict the depth prediction unit comprises, video decoder 30 may predict the depth prediction unit according to a non-DMM prediction mode when the size of the depth prediction unit is greater than the maximum transform block size that corresponds to the depth prediction unit. In such examples, when the size of the depth prediction unit is not greater than the maximum transform block size that corresponds to the depth prediction unit, video decoder 30 may predict the depth prediction unit according to a DMM prediction mode or use another prediction mode selection technique to determine whether to predict the depth prediction unit according to a DMM prediction mode.

In some examples, to decode the depth prediction unit, video decoder 30 may generate one or more reconstructed transform units that correspond to the depth prediction unit based on the predicted depth prediction unit and one or more residual transform units.

Figure 19:
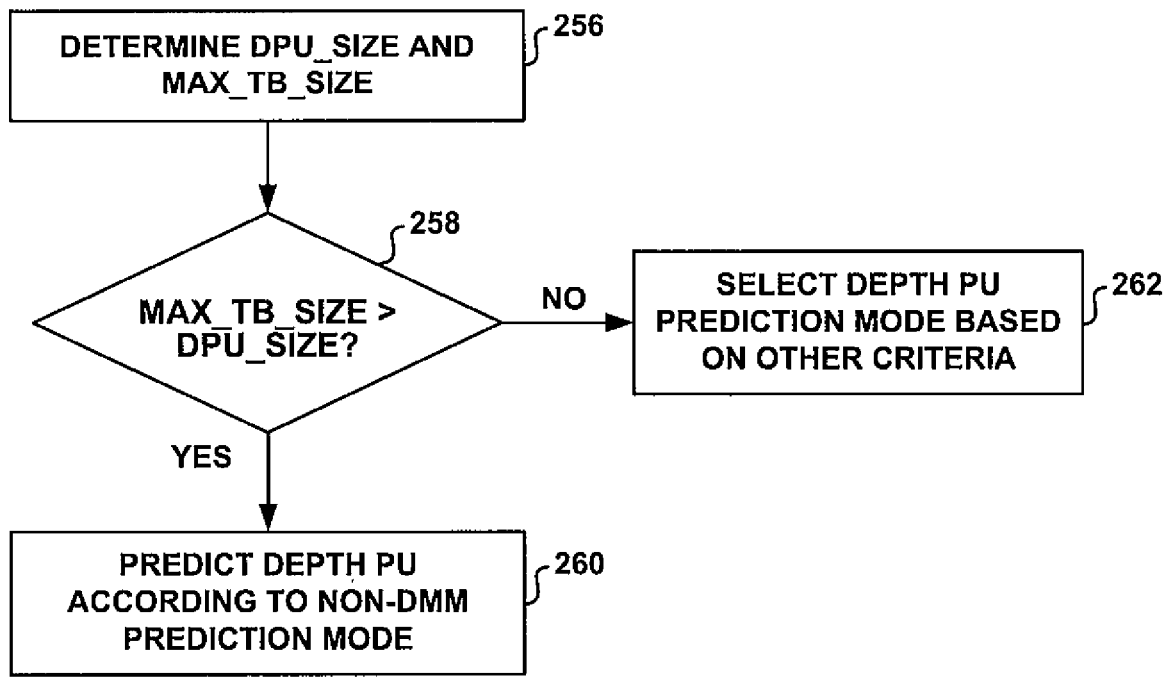
FIG. 19 is a flow diagram illustrating an example technique for performing constrained video encoding according to this disclosure.

FIG. 19 is a flow diagram illustrating an example technique for performing constrained video encoding according to this disclosure. In some examples, the technique shown in FIG. 19 may be used to implement process boxes 246 and/or 248 shown in FIG. 17.

As shown in FIG. 19, video encoder 20 determines a size of the depth prediction unit (DPU_SIZE) and a maximum transform block size (MAX_TB_SIZE) specified for the depth prediction unit (256). Video encoder 20 determines whether the size of the depth prediction unit (DPU_SIZE) is greater than the maximum transform block size (MAX_TB_SIZE) specified for the depth prediction unit (258). In response to determining that the DPU_SIZE is greater than the MAX_TB_SIZE, video encoder 20 predicts the depth PU according to a non-DMM prediction mode (260). In response to determining that the DPU_SIZE is not greater than the MAX_TB_SIZE, video encoder 20 selects the prediction mode for the depth PU (e.g., whether the prediction mode is a DMM prediction mode or a non-DMM prediction mode) based on other criteria in addition to whether the DPU_SIZE is greater than the MAX_TB_SIZE (262).

In some examples, the other criteria may allow the prediction mode for the depth PU to be a DMM prediction mode. In further examples, in response to determining that the DPU_SIZE is not greater than the MAX_TB_SIZE, video encoder 20 may select a DMM prediction mode for predicting the depth PU.

Figure 20:
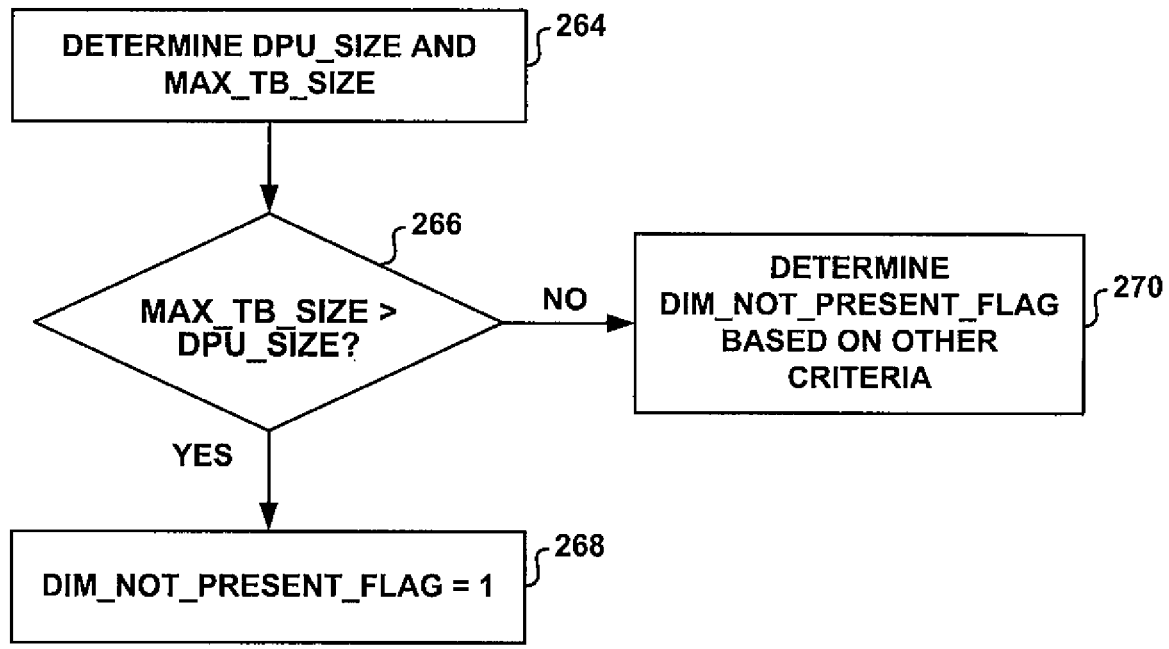
FIG. 20 is a flow diagram illustrating an example technique for performing constrained video encoding according to this disclosure.

FIG. 20 is a flow diagram illustrating an example technique for performing constrained video encoding according to this disclosure. In some examples, the technique shown in FIG. 20 may be used to implement process boxes 246 and/or 248 shown in FIG. 17.

As shown in FIG. 20, video encoder 20 determines a size of the depth prediction unit (DPU_SIZE) and a maximum transform block size (MAX_TB_SIZE) specified for the depth prediction unit (264). Video encoder 20 determines whether the size of the depth prediction unit (DPU_SIZE) is greater than the maximum transform block size (MAX_TB_SIZE) specified for the depth prediction unit (266). In response to determining that the DPU_SIZE is greater than the MAX_TB_SIZE, video encoder 20 sets the dim_not_present_flag equal to 1 to indicate that the DMM prediction modes are not sues for the corresponding depth PU (268). In response to determining that the DPU_SIZE is not greater than the MAX_TB_SIZE, video encoder 20 determines the value of the dim_not_present_flag based on other criteria in addition to whether the DPU_SIZE is greater than the MAX_TB_SIZE (270).

In some examples, the other criteria may allow the value of the dim_not_present_flag to be equal to 0 in at least some circumstances. In further examples, in response to determining that the depth PU is not predicted according to the DMM, video encoder 20 may set the value of the dim_not_present_flag equal to 0 to indicate that a DMM prediction mode is to be used for predicting the depth PU.

Figure 21:
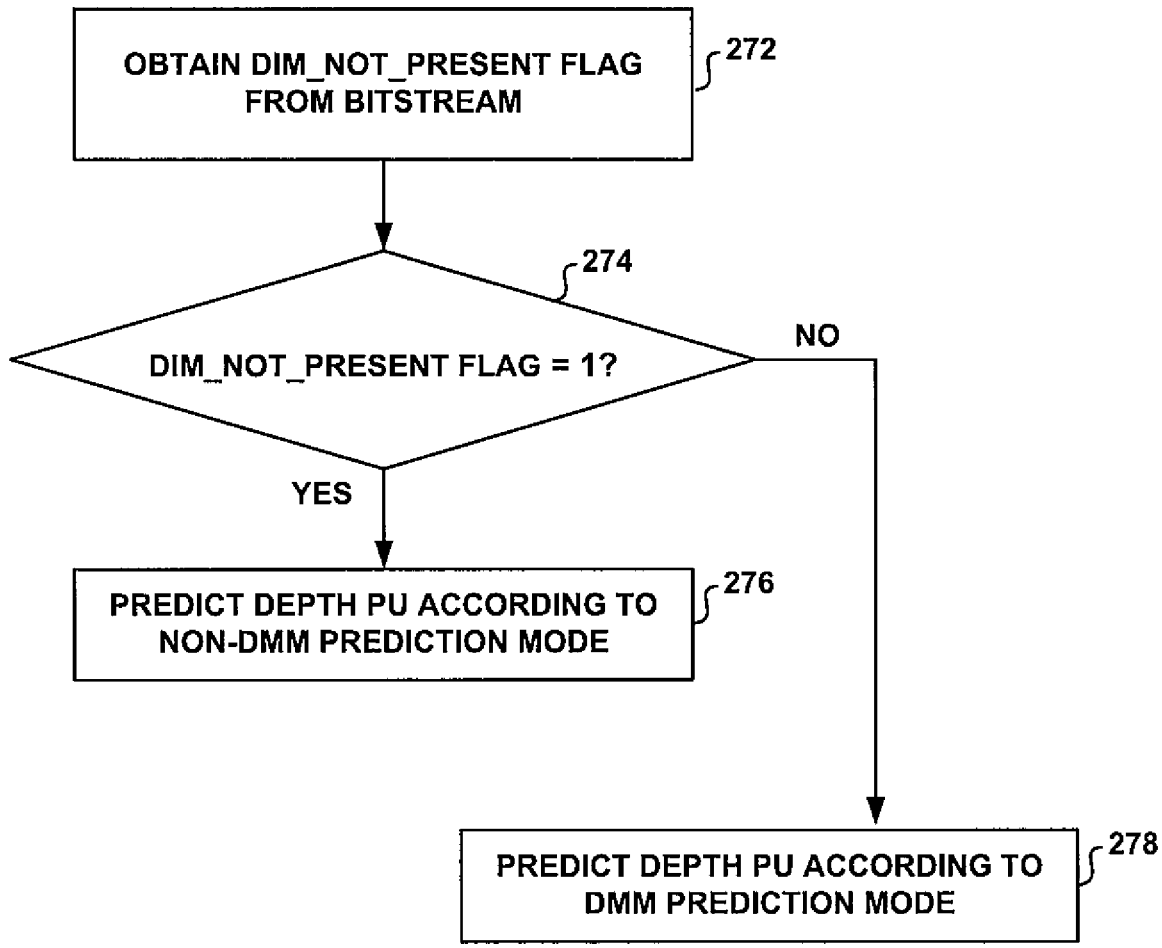
FIG. 21 is a flow diagram illustrating an example technique for performing constrained video decoding according to this disclosure.

FIG. 21 is a flow diagram illustrating an example technique for performing constrained video decoding according to this disclosure. In some examples, the technique shown in FIG. 21 may be used to implement process boxes 252 and/or 254 shown in FIG. 18.

As shown in FIG. 21, video decoder 30 obtains a dim_not_present_flag from an encoded video bitstream (272). The dim_not_present_flag may correspond to a depth prediction unit. The value for the dim_not_present_flag may be selected by a video encoder based on whether a size of the depth prediction unit (DPU_SIZE) is greater than a maximum transform block size (MAX_TB_SIZE) specified for the depth prediction unit.

Video decoder 30 determines whether the dim_not_present_flag equals one (274). In other words, video decoder 30 determines whether a value of the dim_not_present_flag indicates that a non-DMM mode is to be used for predicting the depth PU. In response to determining that the dim_not_present_flag equals one, video decoder 30 predicts the depth PU according to a non-DMM prediction mode (e.g., one of the regular HEVC prediction modes) (276). In response to determining that that the dim_not_present_flag is not equal to one, video decoder 30 predicts the depth PU according to a DMM prediction mode (278).

Again, the value for the dim_not_present_flag may be selected by a video encoder based on whether the size of the depth prediction unit (DPU_SIZE) is greater than the maximum transform block size (MAX_TB_SIZE) specified for the depth prediction unit. Therefore, by using the technique shown in FIG. 21 as one example, video decoder 30 may selectively predict a depth prediction unit according to a depth modeling mode (DMM) prediction mode or a non-DMM prediction mode based on whether a size of the depth prediction unit is greater than a maximum transform block size specified for the depth prediction unit.

Figure 22:
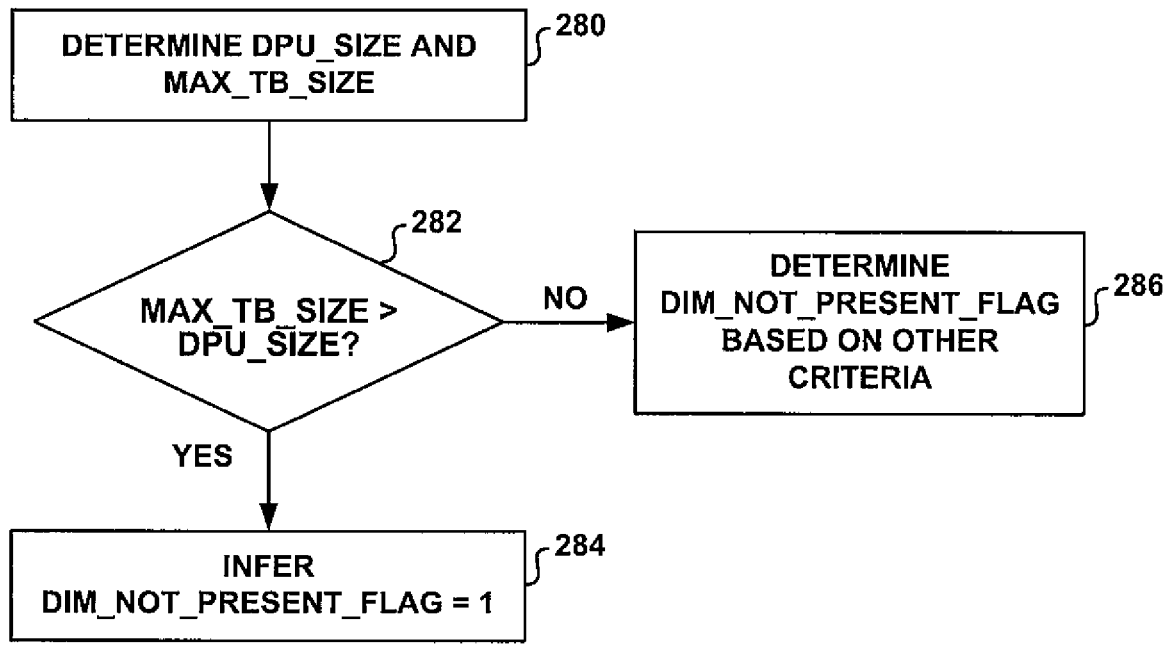
FIG. 22 is a flow diagram illustrating another example technique for performing constrained video decoding according to this disclosure.

FIG. 22 is a flow diagram illustrating another example technique for performing constrained video decoding according to this disclosure. In some examples, the technique shown in FIG. 22 may be used to implement process boxes 252 and/or 254 shown in FIG. 18.

As shown in FIG. 22, video decoder 30 determines a size of the depth prediction unit (DPU_SIZE) and a maximum transform block size (MAX_TB_SIZE) specified for the depth prediction unit (280). Video decoder 30 determines whether the size of the depth prediction unit (DPU_SIZE) is greater than the maximum transform block size (MAX_TB_SIZE) specified for the depth prediction unit (282). In response to determining that the DPU_SIZE is greater than the MAX_TB_SIZE, video decoder 30 infers that the dim_not_present_flag is equal to one without obtaining and decoding the dim_not_present_flag from the encoded video bitstream (284). A dim_not_present_flag value of one indicates that the depth prediction unit is to be predicted according to a non-DMM prediction mode. In response to determining that the DPU_SIZE is not greater than the MAX_TB_SIZE, video decoder 30 determines the value of the dim_not_present_flag based on other criteria in addition to whether the DPU_SIZE is greater than the MAX_TB_SIZE (286). In some examples, the DPU_SIZE is not greater than the MAX_TB_SIZE, video decoder 30 may parse and decode the dim_not_present_flag from the encoded video bitstream to determine the value of the dim_not_present_flag.

Again, the value for the dim_not_present_flag may be selected by a video encoder based on whether a size of the depth prediction unit (DPU_SIZE) is greater than the maximum transform block size (MAX_TB_SIZE) specified for the depth prediction unit. Therefore, by using the technique shown in FIG. 22 to infer/obtain the value of the dim_not_present_flag as one example, video decoder 30 may selectively predict a depth prediction unit according to a depth modeling mode (DMM) prediction mode or a non-DMM prediction mode based on whether a size of the depth prediction unit is greater than a maximum transform block size specified for the depth prediction unit.

Figure 23:
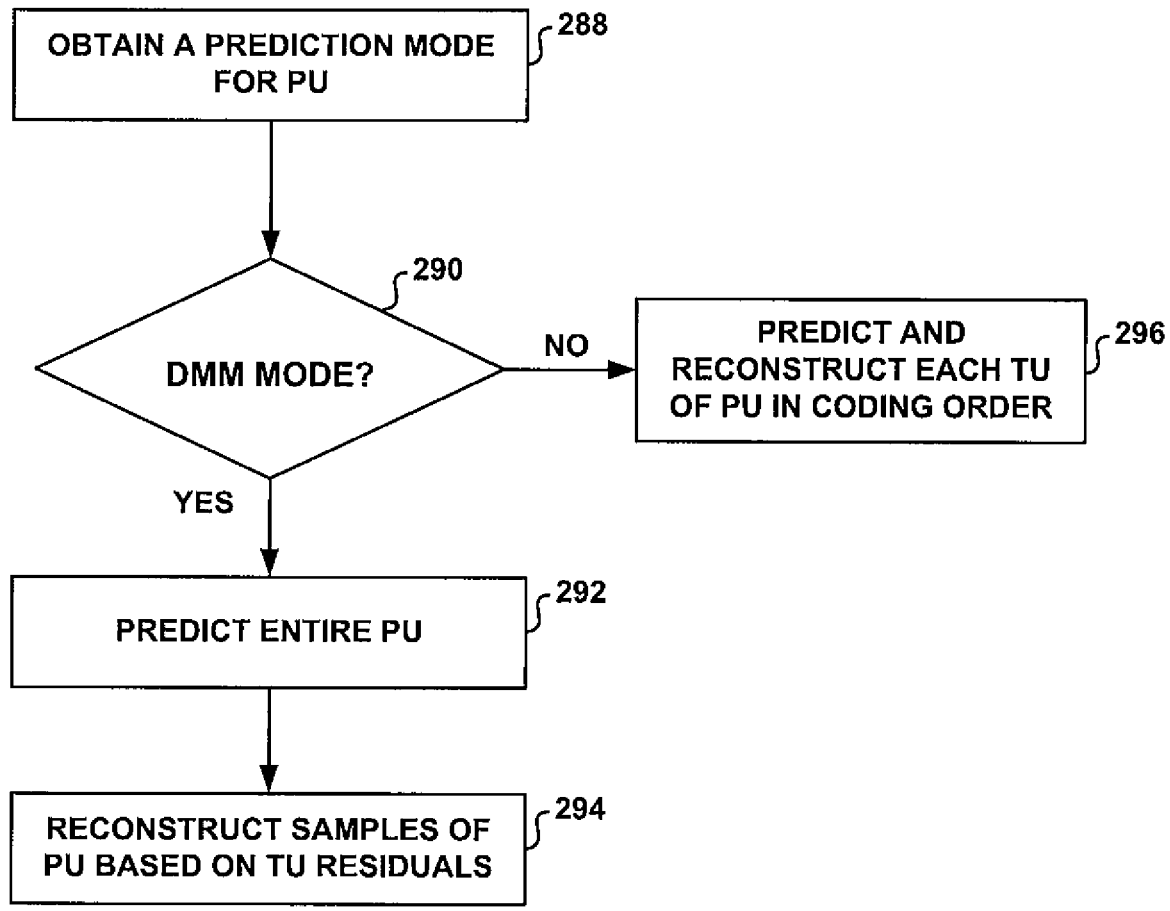
FIG. 23 is a flow diagram illustrating an example technique for coding video according to this disclosure.

FIG. 23 is a flow diagram illustrating an example technique for coding video according to this disclosure. Video encoder 20 and/or video decoder 30 obtains/determines a prediction mode for a depth prediction unit (288). Video encoder 20 and/or video decoder 30 further determines whether the prediction mode is a DMM prediction mode (e.g., DMM mode 1, DMM mode 4, a wedgelet DMM mode, or a contour DMM mode) (290).

In response to determining that the prediction mode is a DMM mode, video encoder 20 and/or video decoder 30 predicts the entire depth prediction unit at the PU level (292), and reconstructs samples of the PU based on residual sample values of the TUs that form the PU (294). Predicting a PU at a PU level may refer to applying a prediction operation to an entire PU such that a single prediction operation is performed for predicting the PU rather than applying a prediction operation separately to multiple TUs that may be included in the PU. In some examples, when the entire PU is predicted at the PU level, the predicted samples for the PU may not be dependent upon reconstructed sample values of any of the TUs of the PU.

In response to determining that the prediction mode is not a DMM mode, video encoder 20 and/or video decoder 30 may predict and reconstruct each of the TUs of the PU in a coding order (e.g., a decoding order). In other words, the PU may be predicted at the TU level. In some examples, video encoder 20 and/or video decoder 30 may separately predict and reconstruct each of the TUs. Predicting the PU at the TU level may refer to applying a prediction operation to each of the TUs of the PU such that one prediction operation is performed for each TU. In other words, different instances of the prediction operation are performed for each TU of the PU. In some examples, when the PU is predicted at the TU level, the predicted samples for the PU may be dependent upon reconstructed sample values of one or more TUs of the PU. In other words, when the PU is predicted at the TU level, the predicted samples for a TU of the PU may be dependent upon reconstructed sample values of one or more previously reconstructed TUs for the PU. Reconstructing the PU at the TU level may refer to applying a reconstruction operation to each of the TUs of the PU such that one reconstruction operation is performed for each TU.

In some examples, when the entire PU is predicted at the PU level, video encoder 20 and/or video decoder 30 may predict all samples of the depth prediction unit prior to determining any reconstructed sample values of the depth prediction unit. In such examples, when the PU is predicted at the TU level, video encoder 20 and/or video decoder 30 may determine one or more reconstructed sample values of the depth prediction unit prior to predicting one or more of the samples of the depth prediction unit.

In some examples, video encoder 20 and/or video decoder 30 may determine whether to predict a depth prediction unit (which may include (or correspond to) one or more transform units) according to a depth modeling mode (DMM) (290), predict and reconstruct each of the transform units of the depth prediction unit at a transform unit level and in a coding order when the depth prediction unit is not to be predicted according to the DMM (296), and predict all samples of the depth prediction unit at a prediction unit level when the depth prediction unit is to be predicted according to the DMM (292).

In some examples, predicting and reconstructing each of the transform units may include determining one or more reconstructed sample values of the depth prediction unit prior to predicting one or more of the samples of the depth prediction unit. In some examples, predicting all samples of the depth prediction unit may include predicting all samples of the depth prediction unit prior to determining any reconstructed sample values of the depth prediction unit.

In some examples, video encoder 20 and/or video decoder 30 may add residual samples of transform units of the depth prediction unit to prediction samples of the depth prediction unit to generate reconstructed samples of the depth prediction unit when the depth prediction unit is not to be predicted according to the DMM. In further examples, video encoder 20 may add samples of the transform units of the depth prediction unit to prediction samples of the depth prediction unit to generate residual samples of the depth prediction unit when the depth prediction unit is not to be predicted according to the DMM.

In some examples, when a DMM prediction mode is used, a PU (e.g., a depth PU) may be predicted and reconstructed at the PU level. For example, the PU may be predicted using neighboring samples, and then residuals decoded from transform tree may be added to the prediction samples to reconstruct the PU. In some examples, the transform tree associated with a PU (e.g., a depth PU) may be split into multiple sub-transform tree nodes (i.e., the PU corresponds to multiple Tus). In such examples, when a DMM prediction mode is not used, TUs may, in some examples, be predicted and reconstructed in a coding order (e.g., a Z order). That is, the PU is predicted and reconstructed at the TU level. A PU may refer to a region of a coding block. The region may include and/or correspond to one or more samples (e.g., pixels) of the coding block.

In some examples, the techniques of this disclosure may make a DMM prediction pattern known for a TU, thereby allowing DMM coded PUs to be decodable. In further examples, the techniques of this disclosure may keep the transform tree structure design in 3D-HEVC same with that in HEVC.

The various coding techniques described in this disclosure may be performed by video encoder 20 (FIGS. 2 and 9) and/or video decoder 30 (FIGS. 2 and 10), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards for 3D video coding. For example, the techniques described in this disclosure for entropy coding may also be applicable to other current or future standards involving coding of depth Intra modes for depth partitions, e.g., for 3D video coding or other applications.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of video decoding, the method comprising:
selectively splitting or not splitting a transform tree node of an encoded video bitstream into a plurality of sub-transform tree nodes based at least in part on whether a depth prediction unit that corresponds to the transform tree node is predicted according to a depth modeling mode (DMM); and
decoding the transform tree node based at least in part on whether the transform tree node is split into the plurality of sub-transform tree nodes.

2. The method of claim 1, wherein selectively splitting or not splitting the transform tree node comprises:
determining a value of a syntax element for the transform tree node based at least in part on the encoded video bitstream, wherein the value of the syntax element indicates whether the transform tree node is to be split into the plurality of sub-transform tree nodes, and wherein the value of the syntax element is set based at least in part on whether the depth prediction unit that corresponds to the transform tree node is predicted according to the DMM; and
selectively splitting or not splitting the transform tree node into the plurality of sub-transform tree nodes based at least in part on the value of the syntax element.

3. The method of claim 2, wherein the encoded video bitstream comprises a three-dimensional-High Efficiency Video Coding (3D-HEVC) encoded video bitstream, and the syntax element comprises a split_transform_flag syntax element.

4. The method of claim 2, wherein the encoded video bitstream satisfies a constraint that specifies that the syntax element must indicate that the transform tree node is not to be split into the plurality of sub-transform tree nodes when the depth prediction unit that corresponds to the transform tree node is predicted according to the DMM.

5. The method of claim 2, wherein determining the value of the syntax element comprises:
obtaining a coded version of the syntax element from the encoded video bitstream; and
decoding the coded version of the syntax element to obtain the value of the syntax element.

6. The method of claim 2, wherein the syntax element is a second syntax element, and wherein determining the value of the syntax element comprises:
decoding a first syntax element from the encoded video bitstream to obtain a value for the first syntax element, wherein the value of the first syntax element indicates whether the depth prediction unit is predicted according to the DMM;
determining whether to set the value of the second syntax element equal to an inferred value without obtaining and decoding the second syntax element from the encoded video bitstream based at least in part on the value of the first syntax element, wherein the inferred value indicates that the transform tree node is not to be split into the plurality of sub-transform tree nodes; and
setting the value of the second syntax element equal to the inferred value in response to determining that the value of the first syntax element indicates that the depth prediction unit is predicted according to the DMM.

7. The method of claim 6, wherein the first syntax element is a dim_not_present_flag syntax element.

8. The method of claim 1, wherein selectively splitting or not splitting the transform tree node comprises:
not splitting the transform tree node into the plurality of sub-transform tree nodes when the depth prediction unit is predicted according to the DMM.

9. The method of claim 1, wherein decoding the transform tree node comprises:
decoding a transform unit corresponding to the transform tree node if the transform tree node is not split into the plurality of sub-transform tree nodes; and
decoding transform units corresponding to respective leaf nodes of a transform tree structure that includes the transform tree node if the transform tree node is split into the plurality of sub-transform tree nodes.

10. A method of video encoding, the method comprising:
selectively splitting or not splitting a transform tree node into a plurality of sub-transform tree nodes based at least in part on whether a depth prediction unit that corresponds to the transform tree node is predicted according to a depth modeling mode (DMM);
encoding the transform tree node based at least in part on whether the transform tree node is split into the plurality of sub-transform tree nodes; and
generating the encoded video bitstream such that the encoded video bitstream includes the coded transform tree node.

11. The method of claim 10, wherein selectively splitting or not splitting the transform tree node comprises:
determining whether the depth prediction unit that corresponds to the transform tree node is predicted according to the DMM; and
not splitting the transform tree node into a plurality of sub-transform tree nodes in response to determining that the depth prediction unit is predicted according to the DMM.

12. The method of claim 10, wherein generating the encoded video bitstream comprises:
selecting a value of a syntax element for the transform tree node based at least in part on whether the depth prediction unit that corresponds to the transform tree node is predicted according to the DMM, wherein the value of the syntax element indicates whether the transform tree node is to be split into the plurality of sub-transform tree nodes; and
generating the encoded video bitstream such that the encoded video bitstream signals the value of the syntax element.

13. The method of claim 12, wherein selecting the value of the syntax element comprises:
selecting a value that indicates that the transform tree node is not to be split into the plurality of sub-transform tree nodes when the depth prediction unit that corresponds to the transform tree node is predicted according to the DMM.

14. The method of claim 12, wherein generating the encoded video bitstream comprises:
generating the encoded video bitstream such that the encoded video bitstream includes the syntax element.

15. The method of claim 12, wherein generating the encoded video bitstream comprises:
generating the encoded video bitstream such that the encoded video bitstream does not include the syntax element when the depth prediction unit that corresponds to the transform tree node is predicted according to the DMM.

16. The method of claim 12, wherein the encoded video bitstream comprises a three-dimensional-High Efficiency Video Coding (3D-HEVC) encoded video bitstream, and the syntax element comprises a split_transform_flag syntax element.

17. The method of claim 12, wherein the encoded video bitstream satisfies a constraint that specifies that the syntax element must indicate that the transform tree node is not to be split into a plurality of sub-transform tree nodes when the depth prediction unit that corresponds to the transform tree node is predicted according to the DMM.

18. The method of claim 10, wherein encoding the transform tree node comprises:
encoding a transform unit corresponding to the transform tree node if the transform tree node is not split into the plurality of sub-transform tree nodes; and
encoding transform units corresponding to respective leaf nodes of a transform tree structure that includes the transform tree node if the transform tree node is split into the plurality of sub-transform tree nodes.

19. A video decoding device comprising:
a memory storing video data; and
a video decoder comprising one or more processors configured to:
selectively split or not split a transform tree node of an encoded video bitstream including the video data into a plurality of sub-transform tree nodes based at least in part on whether a depth prediction unit that corresponds to the transform tree node is predicted according to a depth modeling mode (DMM); and decode the transform tree node based at least in part on whether the transform tree node is split into the plurality of sub-transform tree nodes.

20. The video decoding device of claim 19, wherein to selectively split or not split the transform tree node, the video decoder is configured to:
   determine a value of a syntax element for the transform tree node based at least in part on the encoded video bitstream, wherein the value of the syntax element indicates whether the transform tree node is to be split into the plurality of sub-transform tree nodes, and wherein the value of the syntax element is set based at least in part on whether the depth prediction unit that corresponds to the transform tree node is predicted according to the DMM; and
   selectively split or not split the transform tree node into the plurality of sub-transform tree nodes based at least in part on the value of the syntax element.

21. The video decoding device of claim 20, wherein the encoded video bitstream comprises a three-dimensional-High Efficiency Video Coding (3D-HEVC) encoded video bitstream, and the syntax element comprises a split_transform_flag syntax element.

22. The video decoding device of claim 20, wherein the encoded video bitstream satisfies a constraint that specifies that the syntax element must indicate that the transform tree node is not to be split into the plurality of sub-transform tree nodes when the depth prediction unit that corresponds to the transform tree node is predicted according to the DMM.

23. The video decoding device of claim 20, wherein to determine the value of the syntax element, the video decoder is configured to:
   obtain a coded version of the syntax element from the encoded video bitstream; and
   decode the coded version of the syntax element to obtain the value of the syntax element.

24. The video decoding device of claim 20, wherein the syntax element is a second syntax element, and wherein to determine the value of the syntax element, the video decoder is configured to:
   decode a first syntax element from the encoded video bitstream to obtain a value for the first syntax element, wherein the value of the first syntax element indicates whether the depth prediction unit is predicted according to the DMM;
   determine whether to set the value of the second syntax element equal to an inferred value without obtaining and decoding the second syntax element from the encoded video bitstream based at least in part on the value of the first syntax element, wherein the inferred value indicates that the transform tree node is not to be split into the plurality of sub-transform tree nodes; and
   set the value of the second syntax element equal to the inferred value in response to determining that the value of the first syntax element indicates that the depth prediction unit is predicted according to the DMM.

25. The video decoding device of claim 24, wherein the first syntax element is a dim_not_present_flag syntax element.

26. The video decoding device of claim 19, wherein the video decoder is configured not to split the transform tree node into the plurality of sub-transform tree nodes when the depth prediction unit is predicted according to the DMM.

27. The video decoding device of claim 19, wherein to decode the transform tree node, the video decoder is configured to:
   decode a transform unit corresponding to the transform tree node if the transform tree node is not split into the plurality of sub-transform tree nodes; and
   decode transform units corresponding to respective leaf nodes of a transform tree structure that includes the transform tree node if the transform tree node is split into the plurality of sub-transform tree nodes.

28. A non-transitory computer-readable storage medium having stored thereon instructions that, when executed, cause a processor to:
   selectively split or not splitting a transform tree node of an encoded video bitstream into a plurality of sub-transform tree nodes based at least in part on whether a depth prediction unit that corresponds to the transform tree node is predicted according to a depth modeling mode (DMM); and
   decode the transform tree node based at least in part on whether the transform tree node is split into the plurality of sub-transform tree nodes.

29. The non-transitory computer-readable storage medium of claim 28, wherein to selectively split or not split the transform tree node, the video decoder is configured to:
   determine a value of a syntax element for the transform tree node based at least in part on the encoded video bitstream, wherein the value of the syntax element indicates whether the transform tree node is to be split into the plurality of sub-transform tree nodes, and wherein the value of the syntax element is set based at least in part on whether the depth prediction unit that corresponds to the transform tree node is predicted according to the DMM; and
   selectively split or not split the transform tree node into the plurality of sub-transform tree nodes based at least in part on the value of the syntax element.

30. The non-transitory computer-readable storage medium of claim 29, wherein the encoded video bitstream comprises a three-dimensional-High Efficiency Video Coding (3D-HEVC) encoded video bitstream, and the syntax element comprises a split_transform_flag syntax element.

31. The non-transitory computer-readable storage medium of claim 29, wherein the encoded video bitstream satisfies a constraint that specifies that the syntax element must indicate that the transform tree node is not to be split into the plurality of sub-transform tree nodes when the depth prediction unit that corresponds to the transform tree node is predicted according to the DMM.

32. The non-transitory computer-readable storage medium of claim 29, wherein to determine the value of the syntax element, the video decoder is configured to:
   obtain a coded version of the syntax element from the encoded video bitstream; and
   decode the coded version of the syntax element to obtain the value of the syntax element.

33. The non-transitory computer-readable storage medium of claim 29, wherein the syntax element is a second syntax element, and wherein to determine the value of the syntax element, the video decoder is configured to:
   decode a first syntax element from the encoded video bitstream to obtain a value for the first syntax element, wherein the value of the first syntax element indicates whether the depth prediction unit is predicted according to the DMM;
   determine whether to set the value of the second syntax element equal to an inferred value without obtaining and decoding the second syntax element from the encoded video bitstream based at least in part on the value of the first syntax element, wherein the inferred value indicates that the transform tree node is not to be split into the plurality of sub-transform tree nodes; and set the value of the second syntax element equal to the inferred value in response to determining that the value of the first syntax element indicates that the depth prediction unit is predicted according to the DMM.

34. The non-transitory computer-readable storage medium of claim 24, wherein the first syntax element is a dim_not_present_flag syntax element.

35. The non-transitory computer-readable storage medium of claim 28, wherein the video decoder is configured not to split the transform tree node into the plurality of sub-transform tree nodes when the depth prediction unit is predicted according to the DMM.

36. The non-transitory computer-readable storage medium of claim 28, wherein to decode the transform tree node, the video decoder is configured to:

decode a transform unit corresponding to the transform tree node if the transform tree node is not split into the plurality of sub-transform tree nodes; and decode transform units corresponding to respective leaf nodes of a transform tree structure that includes the transform tree node if the transform tree node is split into the plurality of sub-transform tree nodes.

\* \* \* \* \*